United States Patent
Si

(10) Patent No.: US 12,382,477 B2
(45) Date of Patent: Aug. 5, 2025

(54) METHOD AND APPARATUS FOR PBCH PAYLOAD IN HIGHER FREQUENCY RANGES

(71) Applicant: Samsung Electronics Co., Ltd., Suwon-si (KR)

(72) Inventor: Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 18/366,543

(22) Filed: Aug. 7, 2023

(65) Prior Publication Data
US 2024/0073931 A1 Feb. 29, 2024

Related U.S. Application Data

(63) Continuation of application No. 17/248,175, filed on Jan. 12, 2021, now Pat. No. 11,723,047.
(Continued)

(51) Int. Cl.
*H04W 72/30* (2023.01)
*H04L 27/26* (2006.01)
(Continued)

(52) U.S. Cl.
CPC ....... *H04W 72/30* (2023.01); *H04L 27/26025* (2021.01); *H04W 16/14* (2013.01); *H04W 56/001* (2013.01); *H04W 72/53* (2023.01)

(58) Field of Classification Search
CPC ... H04W 72/30; H04W 16/14; H04W 56/001; H04W 72/53; H04W 48/12; H04W 72/23; H04L 27/26025; H04L 5/0048
See application file for complete search history.

(56) References Cited

U.S. PATENT DOCUMENTS

| | | |
|---|---|---|
| 2018/0167946 A1 | 6/2018 | Si et al. |
| 2019/0045488 A1 | 2/2019 | Park et al. |

(Continued)

FOREIGN PATENT DOCUMENTS

| | | |
|---|---|---|
| CN | 110050420 A | 7/2019 |
| WO | 2019125063 A1 | 6/2019 |
| WO | 2021063774 A1 | 4/2021 |

OTHER PUBLICATIONS

Chinese National Intellectual Property Administration, First Office Action issued Nov. 27, 2023 regarding Application No. 202180010253.5, 17 pages.

(Continued)

*Primary Examiner* — Chae S Lee

(57) ABSTRACT

Apparatuses and methods for transmitting or receiving a synchronization signals and physical broadcast channel (SS/PBCH) block in a wireless communication system. A method of operating a user equipment (UE) includes receiving a SS/PBCH block, decoding a content of a PBCH in the SS/PBCH block, and determining whether the wireless communication system operates with shared spectrum channel access based on the content of the PBCH. The method further includes determining the content of the PBCH in a first manner based on determining that the wireless communication system operates with shared spectrum channel access or determining the content of the PBCH in a second manner based on determining that the wireless communication system operates without shared spectrum channel access.

9 Claims, 16 Drawing Sheets

Related U.S. Application Data

(60) Provisional application No. 63/122,242, filed on Dec. 7, 2020, provisional application No. 63/118,508, filed on Nov. 25, 2020, provisional application No. 63/079,247, filed on Sep. 16, 2020, provisional application No. 63/076,613, filed on Sep. 10, 2020, provisional application No. 62/964,819, filed on Jan. 23, 2020, provisional application No. 62/964,209, filed on Jan. 22, 2020.

(51) Int. Cl.
*H04W 16/14* (2009.01)
*H04W 56/00* (2009.01)
*H04W 72/53* (2023.01)

(56) References Cited

U.S. PATENT DOCUMENTS

| | | | |
|---|---|---|---|
| 2019/0200307 | A1 | 6/2019 | Si |
| 2020/0053670 | A1 | 2/2020 | Jung |
| 2020/0280940 | A1 | 9/2020 | Kim |
| 2020/0344792 | A1 | 10/2020 | Liu |
| 2021/0022096 | A1* | 1/2021 | Rane ............... H04W 16/28 |
| 2021/0051485 | A1 | 2/2021 | Lin |
| 2021/0321349 | A1 | 10/2021 | Tang |
| 2022/0104157 | A1* | 3/2022 | He ............... H04L 27/26025 |
| 2022/0304064 | A1* | 9/2022 | Yoshimura ........ H04W 74/0833 |
| 2024/0049228 | A1* | 2/2024 | Li ............... H04L 5/0094 |
| 2024/0090035 | A1* | 3/2024 | Moon ............... H04L 5/0092 |

OTHER PUBLICATIONS

"3rd Generation Partnership Project; Technical Specification Group Radio Access Network; NR; Physical layer procedures for control (Release 16)", 3GPP TS 38.213 V16.0.0 (Dec. 2019), 146 pages.
Ericsson, "Enhancements to initial access procedure", 3GPP TSG-RAN WG1 Meeting #99, Nov. 18-22, 2019, R1-1912710, 23 pages.
Samsung, "Introduction of shared spectrum channel access", Draft Change Request, 3GPP TSG-RAN WG1 Meeting #99, Nov. 18-22, 2019, R1-1913180, 26 pages.
"3rd Generation Partnership Project; Technical Specification Group Radio Access Network; NR; User Equipment (UE) procedures in Idle mode and RRC Inactive state (Release 15)", 3GPP TS 38.304 V15.6.0 (Dec. 2019), 30 pages.
International Search Report dated Apr. 19, 2021 in connection with International Patent Application No. PCT/KR2021/000778, 4 pages.
Written Opinion of the International Searching Authority dated Apr. 19, 2021 in connection with International Patent Application No. PCT/KR2021/000778, 4 pages.
"5G; NR; Physical channels and modulation (3GPP TS 38.211 version 15.7.0 Release 15)", ETSI TS 138 211 V15.7.0, Oct. 2019, 100 pages.
"5G; NR; Multiplexing and channel coding (3GPP TS 38.212 version 15.7.0 Release 15)", ETSI TS 138 212 V15.7.0, Oct. 2019, 106 pages.
"5G; NR; Physical layer procedures for control (3GPP TS 38.213 version 15.7.0 Release 15)", ETSI TS 138 213 V15.7.0, Oct. 2019, 112 pages.
"5G; NR; Physical layer procedures for data (3GPP TS 38.214 version 15.7.0 Release 15)", ETSI TS 138 214 V15.7.0, Oct. 2019, 108 pages.
"5G; NR; Radio Resource Control (RRC); Protocol specification (3GPP TS 38.331 version 15.7.0 Release 15)", ETSI TS 138 331 V15.7.0, Oct. 2019, 523 pages.
Extended European Search Report dated May 15, 2023 regarding Application No. 21743903.3, 19 pages.
Samsung, "Introduction of shared spectrum channel access", 3GPP TSG RAN Meeting #86, RP-193122, Dec. 2019, 44 pages.
Charter Communications, "Feature lead summary 2 of Enhancements to initial access procedure", 3GPP TSG RAN WG1 Meeting #99, R1-1913429, Nov. 2019, 18 pages.
Ericsson, On initial access, RRM, mobility and RLM, 3GPP TSG-RAN WG1 Meeting #95, R1-1813459, Nov. 2018, 15 pages.
Xiaomi, "SSB transmission in NRU initial access", 3GPP TSG RAN WG1 Meeting #95, R1-1813363, Nov. 2018, 3 pages.
Sharp, "Initial access procedure for NR-U", 3GPP TSG RAN WG1 #99, R1-1912765, Nov. 2019, 8 pages.
Chinese National Intellectual Property Administration, Second Office Action issued Jul. 19, 2024 regarding Application No. 202180010253.5, 16 pages.
Chinese National Intellectual Property Administration, Decision to Grant issued Feb. 14, 2025 regarding Application No. 202180010253.5, 7 pages.

\* cited by examiner

METHOD AND APPARATUS FOR PBCH PAYLOAD IN HIGHER FREQUENCY RANGES

CROSS-REFERENCE TO RELATED APPLICATIONS AND CLAIM OF PRIORITY

This application is a continuation of U.S. patent application Ser. No. 17/248,175, filed on Jan. 12, 2021, which claims priority to: U.S. Provisional Patent Application No. 62/964,209, filed on Jan. 22, 2020; U.S. Provisional Patent Application No. 62/964,819, filed on Jan. 23, 2020; U.S. Provisional Patent Application No. 63/076,613, filed on Sep. 10, 2020; U.S. Provisional Patent Application No. 63/079,247, filed on Sep. 16, 2020; U.S. Provisional Patent Application No. 63/118,508, filed on Nov. 25, 2020; and U.S. Provisional Patent Application No. 63/122,242, filed on Dec. 7, 2020. The content of the above-identified patent document is incorporated herein by reference.

TECHNICAL FIELD

The present disclosure relates generally to wireless communication systems and, more specifically, the present disclosure relates to a physical broadcast channel (PBCH) payload design in a higher frequency range in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a PBCH payload design in a higher frequency range in a wireless communication system.

In one embodiment, a user equipment (UE) in a wireless communication system is provided. The UE includes a transceiver configured to receive a synchronization signals and physical broadcast channel (SS/PBCH) block and a processor operably connected to the transceiver. The processor is configured to decode content of a PBCH in the SS/PBCH block; determine whether the wireless communication system operates with shared spectrum channel access based on the content of the PBCH; determine the content of the PBCH in a first manner, if the wireless communication system operates with shared spectrum channel access; and determine the content of the PBCH in a second manner, if the wireless communication system operates without shared spectrum channel access.

In another embodiment, a base station (BS) in a wireless communication system is provided. The BS includes a processor configured to determine whether the wireless communication system operates with shared spectrum channel access; configure content of a physical broadcast channel (PBCH) according to a first manner, if the wireless communication system operates with shared spectrum channel access; configure the content of the PBCH according to a second manner, if the wireless communication system operates without shared spectrum channel access; and encode the configured content of the PBCH in a synchronization signals and physical broadcast channel (SS/PBCH) block. The BS also includes a transceiver operably connected to the processor. The transceiver is configured to transmit the SS/PBCH block over downlink channels.

In yet another embodiment, a method of a UE in a wireless communication system is provided. The method includes receiving a SS/PBCH block, decoding a content of a PBCH in the SS/PBCH block, and determining whether the wireless communication system operates with shared spectrum channel access based on the content of the PBCH. The method further includes determining the content of the PBCH in a first manner based on determining that the wireless communication system operates with shared spectrum channel access or determining the content of the PBCH in a second manner based on determining that the wireless communication system operates without shared spectrum channel access.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.7.0, "NR; Physical channels and modulation"; 3GPP TS 38.212 v15.7.0, "NR; Multiplexing and Channel coding"; 3GPP TS 38.213 v15.7.0, "NR; Physical Layer Procedures for Control"; 3GPP TS 38.214 v15.7.0, "NR; Physical Layer Procedures for Data"; and 3GPP TS 38.331 v15.7.0, "NR; Radio Resource Control (RRC) protocol specification."

Figure 1:
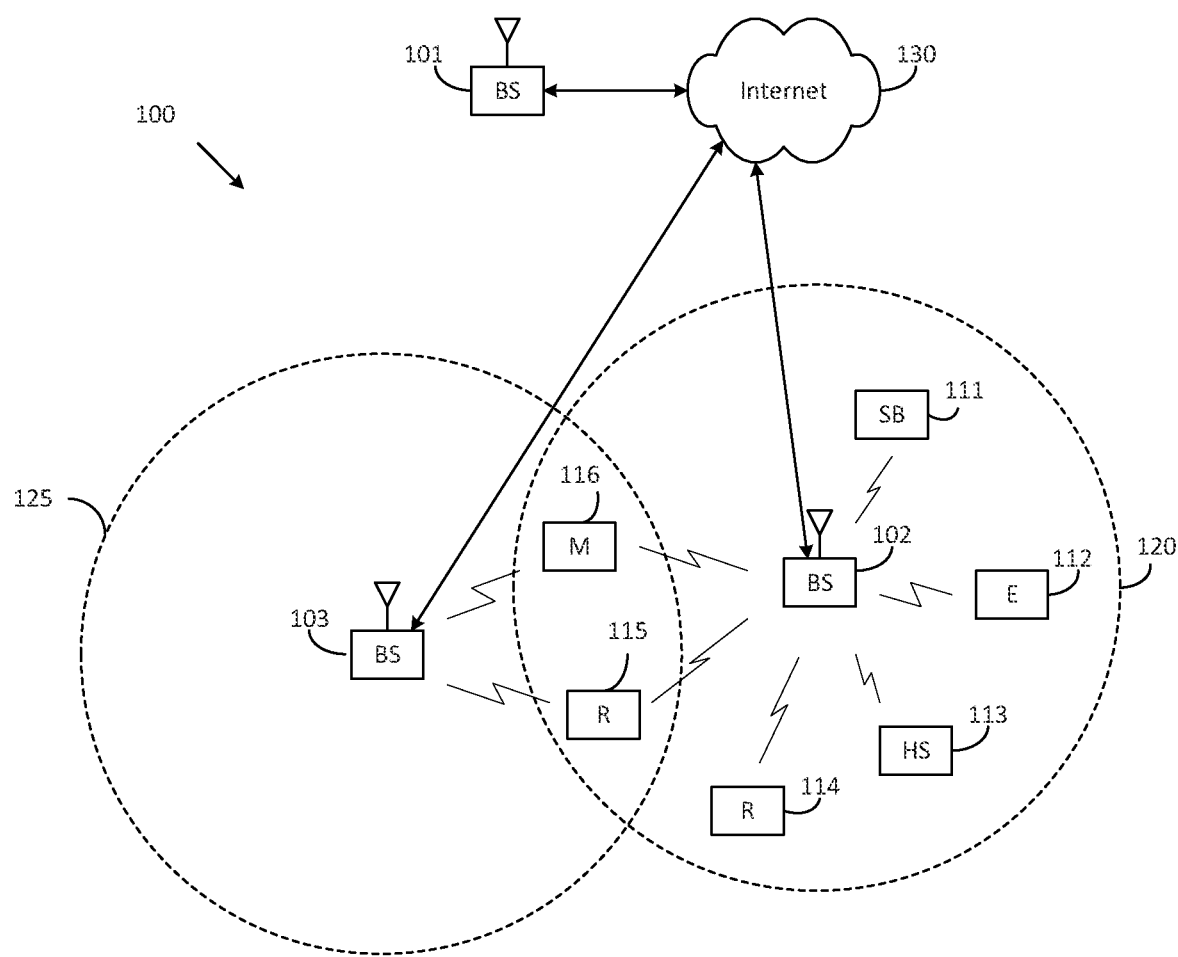
FIG. 1 illustrates an example wireless network according to embodiments of the present disclosure.
Figure 2:
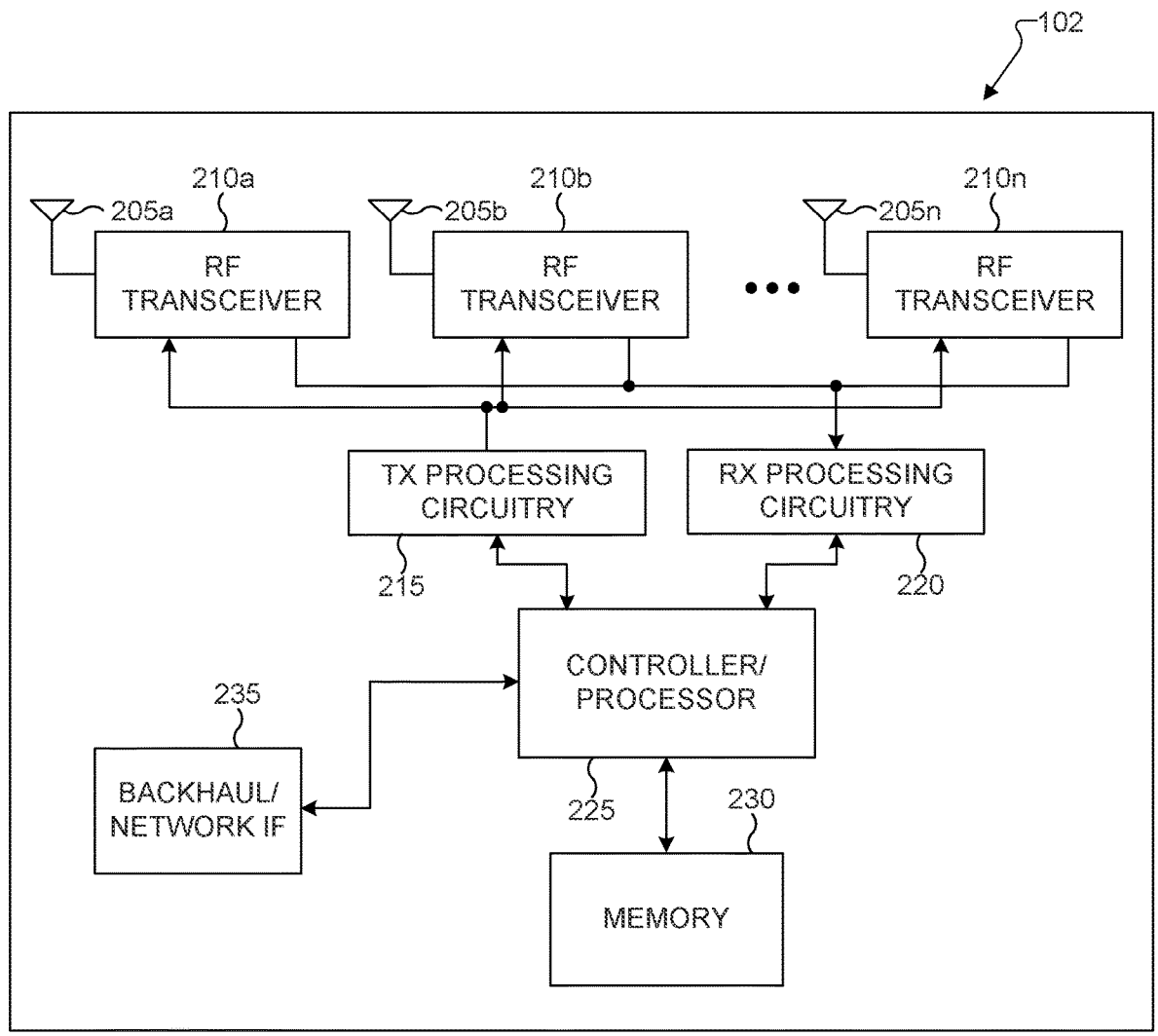
FIG. 2 illustrates an example gNB according to embodiments of the present disclosure.
Figure 3:
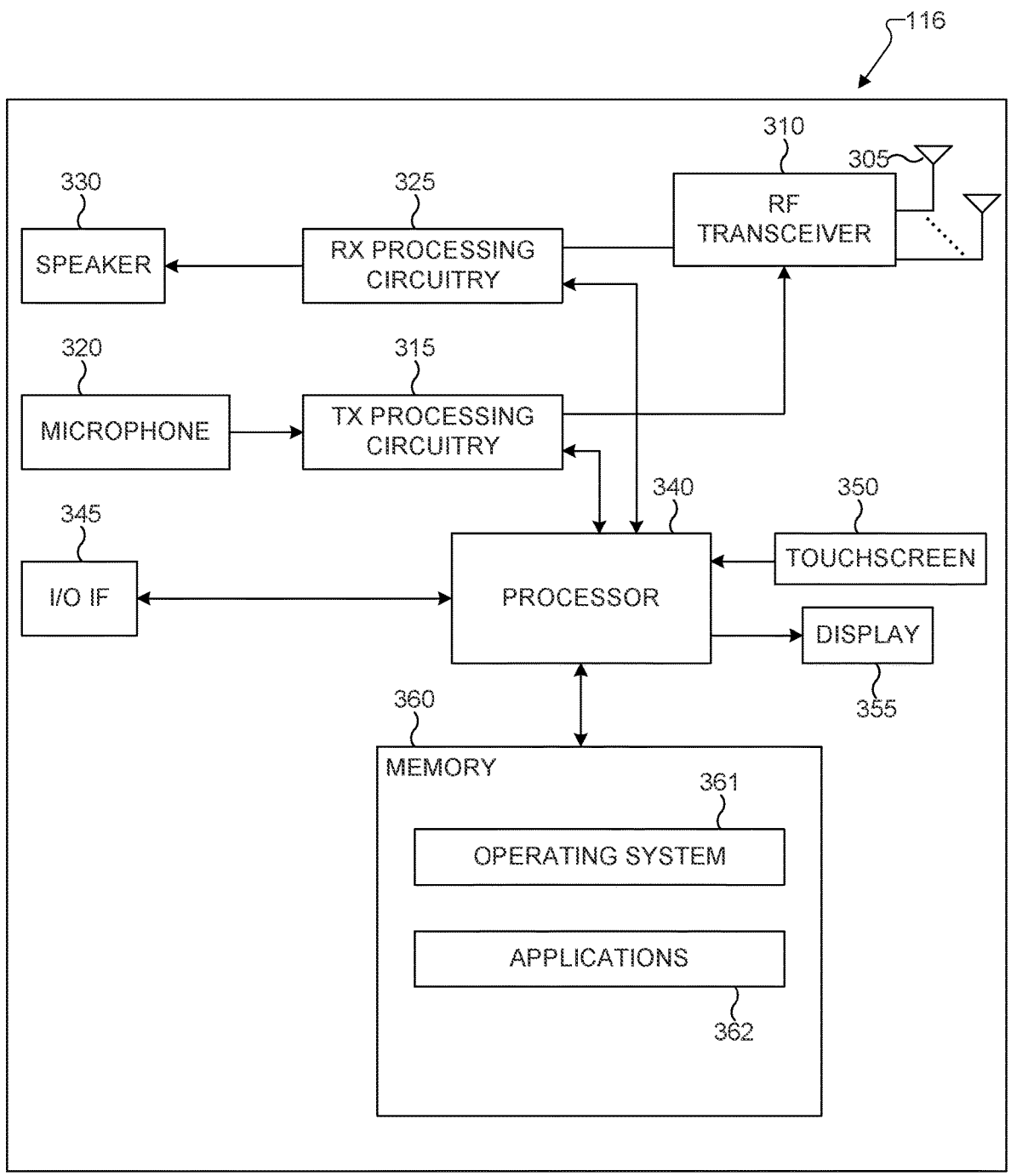
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for beam management and coverage enhancements for semi-persistent and configured grant transmission. In certain embodiments, and one or more of the gNBs 101-103 includes circuitry, programing, or a combination thereof, for beam management and coverage enhancements for semi-persistent and configured grant transmission.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/ processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Examples of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
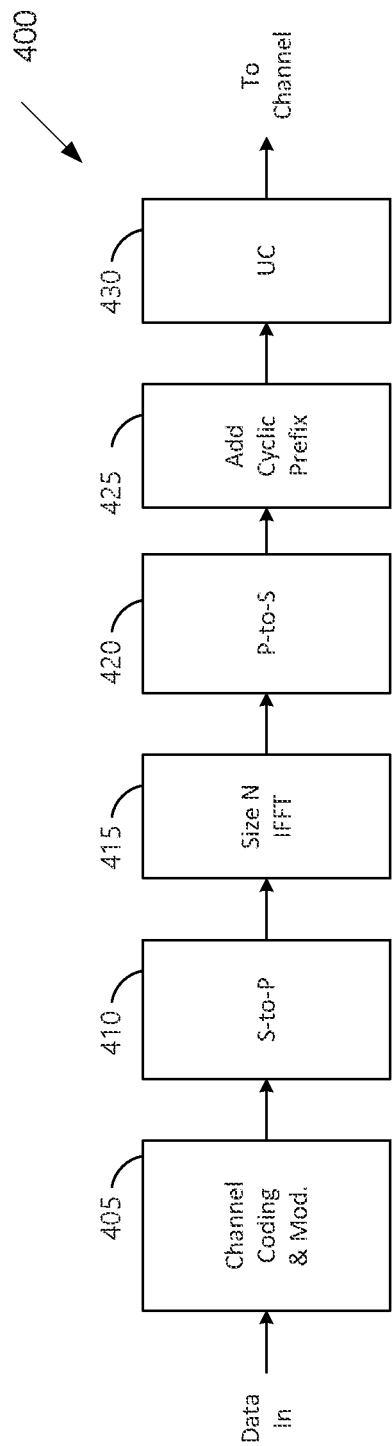
FIGS. 4 and 5 illustrate example wireless transmit and receive paths according to this disclosure.
Figure 5:
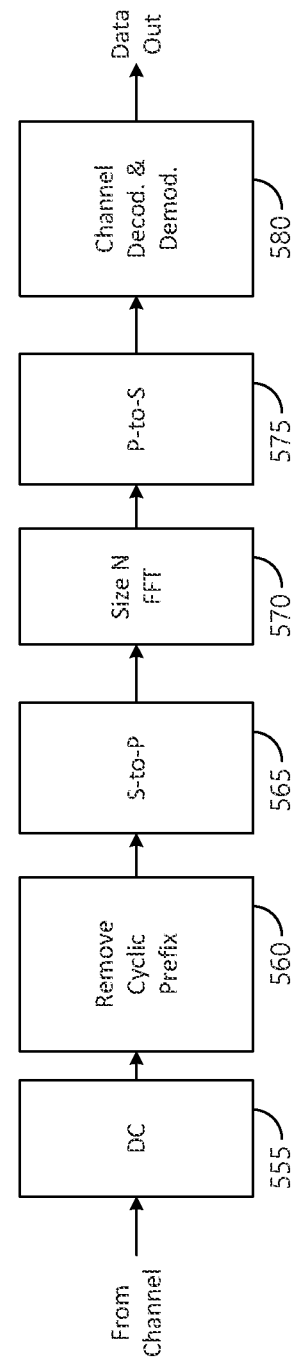

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure focuses on the PBCH payload design for higher frequency range, in order to support potentially larger number of candidate synchronization signal/physical broadcasting channel (SS/PBCH) blocks. Related required changes for the interleaving of PBCH payload, the scrambling of PBCH payload, and the demodulation-reference signal (DM-RS) sequence of PBCH are also specified in this disclosure.

The present disclosure includes the following components and examples: indication using bits generated from physical layer, including examples of increasing the PHY bits, re-interpret the PHY bits, and restructure master information block (MIB) and PHY bits; an indication of a quasi co-locate (QCL) parameter in PBCH payload; an indication of operation with or without shared spectrum channel access in PBCH payload; and indication of k_SSB; an indication of the 4th least significant bits (LSB) of system frame number (SFN) in MIB of the PBCH payload; corresponding changes to the interleaving of PBCH payload; corresponding changes to the scrambling of PBCH payload; and corresponding changes to the DM-RS sequences of PBCH payload.

In NR Rel-15 and Rel-16, PBCH payload comprises 24 bits from higher layer, and 8 bits from physical layer, wherein the 24 bits from higher layer include MIB of 23 bits (as summarized in TABLE 1) and one MIB extension bit. The 8 bits from physical layer, denoted by $\bar{a}A$, $\bar{a}_{\bar{A}+1}$, $\bar{a}_{\bar{A}+2}$, $\bar{a}_{\bar{A}+3}$, $\bar{a}_{\bar{A}+4}$, $\bar{a}_{\bar{A}+5}$, $\bar{a}_{\bar{A}+6}$, and $\bar{a}_{\bar{A}+7}$ refer to the timing information within 16 radio frames, as summarized in TABLE 2.

TABLE 1

MIB of NR Rel-15 and Rel-16

| Field | Value | Number of bits |
| --- | --- | --- |
| systemFrameNumber | BIT STRING (SIZE (6)) | 6 |
| subCarrierSpacingCommon | ENUMERATED {scs15or60, scs30or120} | 1 |
| ssb-SubcarrierOffset | INTEGER (0 . . . 15) | 4 |
| dmrs-TypeA-Position | ENUMERATED {pos2, pos3} | 1 |
| pdcch-ConfigSIB1 | PDCCH-ConfigSIB1 | 8 |
| cellBarred | ENUMERATED {barred, notBarred} | 1 |
| intraFreqReselection | ENUMERATED {allowed, notAllowed} | 1 |
| spare | BIT STRING (SIZE (1)) | 1 |

For a new carrier frequency range between 52.6 GHz and 71 GHz, a new numerology at least with a larger subcarrier spacing could be supported, to accommodate the larger phase noise and larger carrier bandwidth. When a new numerology (e.g., including a new subcarrier spacing) is supported in NR, the timing indication and the corresponding PBCH payload design may need to be enhanced in order to support such new numerology. This disclosure specifies the details of PBCH payload for higher frequency range, wherein the higher frequency range at least includes the carrier frequency range between 52.6 GHz and 71 GHz, and can be applicable to both licensed (e.g., operated without shared spectrum channel access) and unlicensed bands (e.g., operated with shared spectrum channel access) in the frequency range.

Although exemplary descriptions and embodiments to follow assume OFDM or OFDMA, this disclosure can be extended to other OFDM-based transmission waveforms or multiple access schemes such as filtered OFDM (F-OFDM).

In one embodiment, there can be more than 64 candidate SS/PBCH blocks within a predefined time period (e.g., half frame), e.g., $L_{max}>64$, and there is a need to indicate the 7th LSB of the candidate SS/PBCH block index in the payload of PBCH. In one example, the supporting of $L_{max}>64$ is only applicable to a subcarrier spacing (SCS) of the SS/PBCH block larger than 120 kHz (e.g., 480 kHz and/or 960 kHz), such that example on indicating the 7th LSB of the candidate SS/PBCH block index in the payload of PBCH as described in this disclosure is only applicable to the corresponding SCS.

In one embodiment, the PHY bits are increased. In one embodiment, for the higher carrier frequency range considered in this disclosure, the number of bits in the PBCH payload provided by higher layer maintains the same as NR Rel-15 and Rel-16, and the number of bits in the PBCH payload generated by the physical layer increases from 8 to 8+X (e.g., increased from NR Rel-15 and Rel-16), where X is a positive integer.

In one example, the extra X bits corresponding to the timing information related to enlarged maximum number of candidate SS/PBCH block locations within a half frame, e.g., the extra most significant bits (MSBs) of the candidate synchronization signal block (SSB, SS/PBCH block) index. For one instance, if $L_{max}>64$, then $X=\lceil \log_2 L_{max} \rceil - 6$. Examples are shown in TABLE 3.

TABLE 2

Physical layer parameters in PBCH payload of NR Rel-15 and Rel-16

| Bit | $L_{max}$ = 4 or 8 (Rel-15) | $L_{max}$ = 10 (Rel-16) | $L_{max}$ = 20 (Rel-16) | $L_{max}$ = 64 (Rel-15) |
| --- | --- | --- | --- | --- |
| $\bar{a}_{\bar{A}}$ | 4th LSB of SFN | 4th LSB of SFN | 4th LSB of SFN | 4th LSB of SFN |
| $\bar{a}_{\bar{A}+1}$ | 3rd LSB of SFN | 3rd LSB of SFN | 3rd LSB of SFN | 3rd LSB of SFN |
| $\bar{a}_{\bar{A}+2}$ | 2nd LSB of SFN | 2nd LSB of SFN | 2nd LSB of SFN | 2nd LSB of SFN |
| $\bar{a}_{\bar{A}+3}$ | 1st LSB of SFN | 1st LSB of SFN | 1st LSB of SFN | 1st LSB of SFN |
| $\bar{a}_{\bar{A}+4}$ | Half frame bit | Half frame bit | Half frame bit | Half frame bit |
| $\bar{a}_{\bar{A}+5}$ | MSB of $k_{SSB}$ | MSB of $k_{SSB}$ | MSB of $k_{SSB}$ | 6th LSB of candidate SSB index |
| $\bar{a}_{\bar{A}+6}$ | reserved | reserved | 5th LSB of candidate SSB index | 5th LSB of candidate SSB index |
| $\bar{a}_{\bar{A}+7}$ | reserved | 4th LSB of candidate SSB index | 4th LSB of candidate SSB index | 4th LSB of candidate SSB index |

TABLE 3

Example increased number of bits in PBCH.

| $L_{max}$ | X | Example bits |
|---|---|---|
| 80 | 1 | $\bar{a}_{\bar{A}+8}$ |
| 128 | 1 | $\bar{a}_{\bar{A}+8}$ |
| 160 | 2 | $\bar{a}_{\bar{A}+8}, \bar{a}_{\bar{A}+9}$ |
| 256 | 2 | $\bar{a}_{\bar{A}+8}, \bar{a}_{\bar{A}+9}$ |
| 320 | 3 | $\bar{a}_{\bar{A}+8}, \bar{a}_{\bar{A}+9}, \bar{a}_{\bar{A}+10}$ |
| 512 | 3 | $\bar{a}_{\bar{A}+8}, \bar{a}_{\bar{A}+9}, \bar{a}_{\bar{A}+10}$ |

In one example, the extra X bits corresponding to the timing information related to enlarged maximum number of candidate SS/PBCH block locations within a half frame, e.g., the extra MSBs of the candidate SSB index, and the indication of parameter for QCL information. For one instance, if $L_{max} > 64$, then $X = \lceil \log_2 L_{max} \rceil - 3$. Examples are shown in TABLE 4.

TABLE 4

Example increased number of bits in PBCH.

| $L_{max}$ | X | Example bits |
|---|---|---|
| 80 | 4 | $\bar{a}_{\bar{A}+8}, N_{SSB}^{QCL}$ |
| 128 | 4 | $\bar{a}_{\bar{A}+8}, N_{SSB}^{QCL}$ |
| 160 | 5 | $\bar{a}_{\bar{A}+8}, \bar{a}_{\bar{A}+9}, N_{SSB}^{QCL}$ |
| 256 | 5 | $\bar{a}_{\bar{A}+8}, \bar{a}_{\bar{A}+9}, N_{SSB}^{QCL}$ |
| 320 | 6 | $\bar{a}_{\bar{A}+8}, \bar{a}_{\bar{A}+9}, \bar{a}_{\bar{A}+10}, N_{SSB}^{QCL}$ |
| 512 | 6 | $\bar{a}_{\bar{A}+8}, \bar{a}_{\bar{A}+9}, \bar{a}_{\bar{A}+10}, N_{SSB}^{QCL}$ |

In one example, $\bar{a}_{\bar{A}+5}$, $\bar{a}_{\bar{A}+6}$, and $\bar{a}_{\bar{A}+7}$ are 6th, 5th, and 4th LSB of candidate SSB index, respectively, and $\bar{a}_{\bar{A}+8}$ is the 7th bit of candidate SSB index.

In another example, $\bar{a}_{\bar{A}+5}$, $\bar{a}_{\bar{A}+6}$, $\bar{a}_{\bar{A}+7}$, and $\bar{a}_{\bar{A}+8}$ are 7th, 6th, 5th, and 4th LSB of candidate SSB index, respectively.

In yet another example, $\bar{a}_{\bar{A}+5}$, $\bar{a}_{\bar{A}+6}$, and $\bar{a}_{\bar{A}+7}$ are 6th, 5th, and 4th LSB of candidate SSB index, respectively, and $\bar{a}_{\bar{A}+8}$ and $\bar{a}_{\bar{A}+9}$ are the 7th and 8th bit of candidate SSB index, respectively.

In yet another example, $\bar{a}_{\bar{A}+5}$, $\bar{a}_{\bar{A}+6}$, $\bar{a}_{\bar{A}+7}$, $\bar{a}_{\bar{A}+8}$ and $\bar{a}_{\bar{A}+9}$ are 8th, 7th, 6th, 5th, and 4th LSB of candidate SSB index, respectively.

In yet another example, $\bar{a}_{\bar{A}+5}$, $\bar{a}_{\bar{A}+6}$, and $\bar{a}_{\bar{A}+7}$ are 6th, 5th, and 4th LSB of candidate SSB index, respectively, and $\bar{a}_{\bar{A}+8}$, $\bar{a}_{\bar{A}+9}$ and $\bar{a}_{\bar{A}+10}$ are the 7th, 8th, and 9th bit of candidate SSB index, respectively.

In yet another example, $\bar{a}_{\bar{A}+5}$, $\bar{a}_{\bar{A}+6}$, $\bar{a}_{\bar{A}+7}$, $\bar{a}_{\bar{A}+8}$, $\bar{a}_{\bar{A}+9}$, and $\bar{a}_{\bar{A}+10}$ are 9th, 8th, 7th, 6th, 5th, and 4th LSB of candidate SSB index, respectively.

In yet another example, $N_{SSB}^{QCL}$ is a 3-bit field taking values from (1, 2, 4, 8, 16, 32, 64).

In yet another example, $N_{SSB}^{QCL}$ is a 3-bit field taking values from {1, 2, 4, 8, 16, 32, 64, "not applicable"}, wherein the numerical values are applicable to channel occupancy with channel sensing (e.g., listen before talk (LBT)), and the non-numerical values are applicable to channel occupancy without channel sensing (e.g., LBT).

In example, X can be rounded up to the nearest integer as an integer multiple of 8, to make the total number bits generated by the physical layer an octet, and bits not carrying information are reserved.

In another embodiment, for the higher carrier frequency range considered in this disclosure, the number of bits in the PBCH payload provided by higher layer maintains the same as NR Rel-15 and Rel-16, and the number of bits in the PBCH payload generated by the physical layer also maintains the same as NR Rel-15 and Rel-16, but some of the bits generated by the physical layer can be reinterpreted.

In one example, the burst of SS/PBCH blocks within a periodically transmitted period is restricted to be confined within the first half frame in a frame, such that there is no need for indicating the half frame timing. In this example, the bit $\bar{a}_{\bar{A}+4}$ can be used for other purpose, wherein $\bar{a}_{\bar{A}+4}$ was used for indicating half frame in Rel-15 and Rel-16. For one instance, the bit $\bar{a}_{\bar{A}+4}$ can be used to indicate the 7th bit of candidate SSB index, if the number of candidate SS/PBCH blocks is greater than 64. For another instance, the bit $\bar{a}_{\bar{A}+4}$ can be used, potentially combined with other bits in PBCH payload, to indicate the QCL parameter $N_{SSB}^{QCL}$. Examples are shown in TABLE 5A.

In another example, the burst of SS/PBCH blocks within a periodically transmitted period is restricted to be confined within the second half frame in a frame, such that there is no need for indicating the half frame timing. In this example, the bit $\bar{a}_{\bar{A}+4}$ can be used for other purpose. For one instance, the bit $\bar{a}_{\bar{A}+4}$ can be used to indicate the 7th LSB of candidate SSB index, if the number of candidate SS/PBCH blocks is greater than 64. For another instance, the bit $\bar{a}_{\bar{A}+4}$ can be used, potentially combined with other bits in PBCH payload, to indicate the QCL parameter $N_{SSB}^{QCL}$. Examples are shown in TABLE 5A.

TABLE 5A

Example PHY bits for higher carrier frequency range

| Bit | Example 1 | Example 2 |
|---|---|---|
| $\bar{a}_{\bar{A}}$ | 4th LSB of SFN | 4th LSB of SFN |
| $\bar{a}_{\bar{A}+1}$ | 3rd LSB of SFN | 3rd LSB of SFN |
| $\bar{a}_{\bar{A}+2}$ | 2nd LSB of SFN | 2nd LSB of SFN |
| $\bar{a}_{\bar{A}+3}$ | 1st LSB of SFN | 1st LSB of SFN |
| $\bar{a}_{\bar{A}+4}$ | 7th LSB of candidate SSB index | Indicating $N_{SSB}^{QCL}$ |
| $\bar{a}_{\bar{A}+5}$ | 6th LSB of candidate SSB index | 6th LSB of candidate SSB index |
| $\bar{a}_{\bar{A}+6}$ | 5th LSB of candidate SSB index | 5th LSB of candidate SSB index |
| $\bar{a}_{\bar{A}+7}$ | 4th LSB of candidate SSB index | 4th LSB of candidate SSB index |

For yet another example, if the maximum number of candidate SS/PBCH block locations within a half frame is larger than 64 (e.g., $L_{max} > 64$), and more DM-RS sequences (e.g., more than 8 per cell) are supported, more LSBs of the candidate SS/PBCH block index can be carried by the DM-RS sequences, and the bits generated by physical layer can have different interpretation. Examples are shown in TABLE 5B.

TABLE 5B

Example PHY bits for higher carrier frequency range

| Bit | Example 1 (16 DM-RS sequences per cell) | Example 2 (32 DM-RS sequences per cell) | Example 3 (64 DM-RS sequences per cell) |
|---|---|---|---|
| $\bar{a}_{\bar{j}}$ | 4th LSB of SFN | 4th LSB of SFN | 4th LSB of SFN |
| $\bar{a}_{\bar{j}+1}$ | 3rd LSB of SFN | 3rd LSB of SFN | 3rd LSB of SFN |
| $\bar{a}_{\bar{j}+2}$ | 2nd LSB of SFN | 2nd LSB of SFN | 2nd LSB of SFN |
| $\bar{a}_{\bar{j}+3}$ | 1st LSB of SFN | 1st LSB of SFN | 1st LSB of SFN |
| $\bar{a}_{\bar{j}+4}$ | Half frame bit | Half frame bit | Half frame bit |
| $\bar{a}_{\bar{j}+5}$ | 7th LSB of candidate SSB index | 8th LSB of candidate SSB index | 9th LSB of candidate SSB index |
| $\bar{a}_{\bar{j}+6}$ | 6th LSB of candidate SSB index | 7th LSB of candidate SSB index | 8th LSB of candidate SSB index |
| $\bar{a}_{\bar{j}+7}$ | 5th LSB of candidate SSB index | 6th LSB of candidate SSB index | 7th LSB of candidate SSB index |

In yet another embodiment, for the higher carrier frequency range considered in this disclosure, the number of bits in the PBCH payload provided by higher layer maintains the same as NR Rel-15 and Rel-16, and the number of bits in the PBCH payload generated by the physical layer also maintains the same as NR Rel-15 and Rel-16, but the fields provided by higher layer and bits generated by the physical layer can have different size and meaning.

In one example, the MIB in the PBCH payload contains 7 MSBs of SFN (e.g., the 4th LSB of SFN is also contained in MIB), and one bit (e.g., a field with 1 bit or 1 bit from a field with multiple bits in Rel-15 and Rel-16) is removed from MIB.

In one example, the one bit removed from MIB can be the field of subCarrierSpacingCommon, and the corresponding example MIB is shown in TABLE 6A.

TABLE 6A

Example MIB for higher carrier frequency range

| Field | Value | Number of bits |
|---|---|---|
| systemFrameNumber-new | BIT STRING (SIZE (7)) | 7 |
| ssb-SubcarrierOffset | INTEGER (0 . . . 15) | 4 |
| dmrs-TypeA-Position | ENUMERATED {pos2, pos3} | 1 |
| pdcch-ConfigSIB1 | PDCCH-ConfigSIB1 | 8 |
| cellBarred | ENUMERATED {barred, notBarred} | 1 |
| intraFreqReselection | ENUMERATED {allowed, notAllowed} | 1 |
| spare | BIT STRING (SIZE (1)) | 1 |

In another example, the one bit removed from MIB can be 1 bit from the field of pdcch-ConfigSIB1 (e.g., from 8 bits to 7 bits), and the corresponding example MIB is shown in TABLE 6B.

TABLE 6B

Example MIB for higher carrier frequency range

| Field | Value | Number of bits |
|---|---|---|
| systemFrameNumber-new | BIT STRING (SIZE (7)) | 7 |
| subCarrierSpacingCommon-new | ENUMERATED {scs1-new, scs2-new} | 1 |
| ssb-SubcarrierOffset | INTEGER (0 . . . 15) | 4 |
| dmrs-TypeA-Position | ENUMERATED {pos2, pos3} | 1 |
| pdcch-ConfigSIB1-new | PDCCH-ConfigSIB1-new | 7 |
| cellBarred | ENUMERATED {barred, notBarred} | 1 |
| intraFreqReselection | ENUMERATED {allowed, notAllowed} | 1 |
| spare | BIT STRING (SIZE (1)) | 1 |

In yet another example, the one bit removed from MIB can be the field of spare, and the corresponding example MIB is shown in TABLE 6C.

TABLE 6C

Example MIB for higher carrier frequency range

| Field | Value | Number of bits |
|---|---|---|
| systemFrameNumber-new | BIT STRING (SIZE (7)) | 7 |
| subCarrierSpacingCommon-new | ENUMERATED {scs1-new, scs2-new} | 1 |
| ssb-SubcarrierOffset | INTEGER (0 . . . 15) | 4 |
| dmrs-TypeA-Position | ENUMERATED {pos2, pos3} | 1 |
| pdcch-ConfigSIB1 | PDCCH-ConfigSIB1 | 8 |
| cellBarred | ENUMERATED {barred, notBarred} | 1 |
| intraFreqReselection | ENUMERATED {allowed, notAllowed} | 1 |

In yet another example, the fields in the MIB can maintain their name and bitwidth, but the fields can be re-interpreted for indicating other information, as described in examples of this disclosure. For this example, some of the PHY bits can be re-interpreted, and examples are shown in TABLE 7.

TABLE 7

Example PHY bits for higher carrier frequency range

| Bit | Example 1 | Example 2 |
|---|---|---|
| $\bar{a}_{\bar{A}}$ | 7th LSB of candidate SSB index | 3rd LSB of SFN |
| $\bar{a}_{\bar{A}+1}$ | 3rd LSB of SFN | 2nd LSB of SFN |
| $\bar{a}_{\bar{A}+2}$ | 2nd LSB of SFN | 1st LSB of SFN |
| $\bar{a}_{\bar{A}+3}$ | 1st LSB of SFN | Half frame bit |
| $\bar{a}_{\bar{A}+4}$ | Half frame bit | 7th LSB of candidate SSB index |
| $\bar{a}_{\bar{A}+5}$ | 6th LSB of candidate SSB index | 6th LSB of candidate SSB index |
| $\bar{a}_{\bar{A}+6}$ | 5th LSB of candidate SSB index | 5th LSB of candidate SSB index |
| $\bar{a}_{\bar{A}+7}$ | 4th LSB of candidate SSB index | 4th LSB of candidate SSB index |

In one embodiment, for the higher carrier frequency range considered in this disclosure, there is an indication of a parameter for QCL assumption in PBCH payload, such that a UE determines SS/PBCH blocks are QCLed within or across transmission windows for SS/PBCH blocks if the value of ($\bar{i}$ mod $N_{SSB}^{QCL}$) for the corresponding SS/PBCH blocks is the same, wherein $\bar{i}$ is the candidate SS/PBCH block index, and $N_{SSB}^{QCL}$ is the indicated parameter for QCL assumption.

In one example, for the higher carrier frequency range considered in this disclosure, $N_{SSB}^{QCL}$ is taking values from {1, 4, 16, 64}, and 2 bits in PBCH payload are used for the indication of $N_{SSB}^{QCL}$.

In another example, for the higher carrier frequency range considered in this disclosure, $N_{SSB}^{QCL}$ is taking values from {1, 2, 4, 8, 16, 32, 64}, and 3 bits in PBCH payload are used for the indication of $N_{SSB}^{QCL}$.

In yet another example, for the higher carrier frequency range considered in this disclosure, $N_{SSB}^{QCL}$ is taking values from {1, 2, 4, 8, 16, 32, 48, 64}, and 3 bits in PBCH payload are used for the indication of $N_{SSB}^{QCL}$.

In yet another example, for the higher carrier frequency range considered in this disclosure, $N_{SSB}^{QCL}$ is taking values from {1, 2, 4, 8, 16, 24, 32, 40, 48, 56, 64}, and 4 bits in PBCH payload are used for the indication of $N_{SSB}^{QCL}$.

One example for using 2 bits in PBCH payload to indicate $N_{SSB}^{QCL}$ can be 2 LSBs of ssb-SubcarrierOffset.

Another example for using 2 bits in PBCH payload to indicate $N_{SSB}^{QCL}$ can be 2 LSBs of controlResourceSetZero in pdcch-ConfigSIB1.

Yet another example for using 2 bits in PBCH payload to indicate $N_{SSB}^{QCL}$ can be 2 MSBs of controlResourceSetZero in pdcch-ConfigSIB1.

Yet another example for using 2 bits in PBCH payload to indicate $N_{SSB}^{QCL}$ can be 2 LSBs of searchSpaceZero in pdcch-ConfigSIB1.

Yet another example for using 2 bits in PBCH payload to indicate $N_{SSB}^{QCL}$ can be 2 MSBs of searchSpaceZero in pdcch-ConfigSIB1.

Yet another example for using 2 bits in PBCH payload to indicate $N_{SSB}^{QCL}$ can be the combination of 1 LSB of ssb-SubcarrierOffset and 1 bit of subCarrierSpacingCommon.

Yet another example for using 2 bits in PBCH payload to indicate $N_{SSB}^{QCL}$ can be the combination of 1 bit of spare and 1 bit of subCarrierSpacingCommon.

Yet another example for using 2 bits in PBCH payload to indicate $N_{SSB}^{QCL}$ can be the combination of 1 bit of spare and 1 LSB of ssb-SubcarrierOffset.

Yet another example for using 2 bits in PBCH payload to indicate $N_{SSB}^{QCL}$ can be the combination of 1 LSB of controlResourceSetZero in pdcch-ConfigSIB1 and 1 LSB of ssb-SubcarrierOffset.

Yet another example for using 2 bits in PBCH payload to indicate $N_{SSB}^{QCL}$ can be the combination of 1 MSB of controlResourceSetZero in pdcch-ConfigSIB1 and 1 LSB of ssb-SubcarrierOffset.

Yet another example for using 2 bits in PBCH payload to indicate $N_{SSB}^{QCL}$ can be the combination of 1 LSB of searchSpaceZero in pdcch-ConfigSIB1 and 1 LSB of ssb-SubcarrierOffset.

Yet another example for using 2 bits in PBCH payload to indicate $N_{SSB}^{QCL}$ can be the combination of 1 MSB of searchSpaceZero in pdcch-ConfigSIB1 and 1 LSB of ssb-SubcarrierOffset.

Yet another example for using 2 bits in PBCH payload to indicate $N_{SSB}^{QCL}$ can be the combination of 1 LSB of controlResourceSetZero in pdcch-ConfigSIB1 and 1 bit of subCarrierSpacingCommon.

Yet another example for using 2 bits in PBCH payload to indicate $N_{SSB}^{QCL}$ can be the combination of 1 MSB of controlResourceSetZero in pdcch-ConfigSIB1 and 1 bit of subCarrierSpacingCommon.

Yet another example for using 2 bits in PBCH payload to indicate $N_{SSB}^{QCL}$ can be the combination of 1 LSB of searchSpaceZero in pdcch-ConfigSIB1 and 1 bit of subCarrierSpacingCommon.

Yet another example for using 2 bits in PBCH payload to indicate $N_{SSB}^{QCL}$ can be the combination of 1 MSB of searchSpaceZero in pdcch-ConfigSIB1 and 1 bit of subCarrierSpacingCommon.

Yet another example for using 2 bits in PBCH payload to indicate $N_{SSB}^{QCL}$ can be the combination of 1 LSB of controlResourceSetZero in pdcch-ConfigSIB1 and 1 bit of spare.

Yet another example for using 2 bits in PBCH payload to indicate $N_{SSB}^{QCL}$ can be the combination of 1 MSB of controlResourceSetZero in pdcch-ConfigSIB1 and 1 bit of spare.

Yet another example for using 2 bits in PBCH payload to indicate $N_{SSB}^{QCL}$ can be the combination of 1 LSB of searchSpaceZero in pdcch-ConfigSIB1 and 1 bit of spare.

Yet another example for using 2 bits in PBCH payload to indicate $N_{SSB}^{QCL}$ can be the combination of 1 MSB of searchSpaceZero in pdcch-ConfigSIB1 and 1 bit of spare.

Yet another example for using 2 bits in PBCH payload to indicate $N_{SSB}^{QCL}$ can be the combination of 1 LSB of searchSpaceZero in pdcch-ConfigSIB1 and 1 LSB of controlResourceSetZero in pdcch-ConfigSIB1.

Yet another example for using 2 bits in PBCH payload to indicate $N_{SSB}^{QCL}$ can be the combination of 1 MSB of searchSpaceZero in pdcch-ConfigSIB1 and 1 MSB of controlResourceSetZero in pdcch-ConfigSIB1.

One example for using 3 bits in PBCH payload to indicate $N_{SSB}^{QCL}$ can be the 3 LSBs of controlResourceSetZero in pdcch-ConfigSIB1.

Another example for using 3 bits in PBCH payload to indicate $N_{SSB}^{QCL}$ can be the 3 MSBs of controlResourceSetZero in pdcch-ConfigSIB1.

Yet another example for using 3 bits in PBCH payload to indicate $N_{SSB}^{QCL}$ can be the 3 LSBs of searchSpaceZero in pdcch-ConfigSIB1.

Yet another example for using 3 bits in PBCH payload to indicate $N_{SSB}^{QCL}$ can be the 3 MSBs of searchSpaceZero in pdcch-ConfigSIB1.

Yet another example for using 3 bits in PBCH payload to indicate $N_{SSB}^{QCL}$ can be the 3 MSBs of ssb-SubcarrierOffset.

Yet another example for using 3 bits in PBCH payload to indicate $N_{SSB}^{QCL}$ can be the 3 LSBs of ssb-SubcarrierOffset.

Yet another example for using 3 bits in PBCH payload to indicate $N_{SSB}^{QCL}$ can be the combination of 2 LSBs of controlResourceSetZero in pdcch-ConfigSIB1 and 1 bit of subCarrierSpacingCommon.

Yet another example for using 3 bits in PBCH payload to indicate $N_{SSB}^{QCL}$ can be the combination of 2 MSBs of controlResourceSetZero in pdcch-ConfigSIB1 and 1 bit of subCarrierSpacingCommon.

Yet another example for using 3 bits in PBCH payload to indicate $N_{SSB}^{QCL}$ can be the combination of 2 MSBs of searchSpaceZero in pdcch-ConfigSIB1 and 1 bit of subCarrierSpacingCommon.

Yet another example for using 3 bits in PBCH payload to indicate $N_{SSB}^{QCL}$ can be the combination of 2 LSBs of searchSpaceZero in pdcch-ConfigSIB1 and 1 bit of subCarrierSpacingCommon.

Yet another example for using 3 bits in PBCH payload to indicate $N_{SSB}^{QCL}$ can be the combination of 2 LSBs of ssb-SubcarrierOffset and 1 bit of subCarrierSpacingCommon.

Yet another example for using 3 bits in PBCH payload to indicate $N_{SSB}^{QCL}$ can be the combination of 2 MSBs of ssb-SubcarrierOffset and 1 bit of subCarrierSpacingCommon.

Yet another example for using 3 bits in PBCH payload to indicate $N_{SSB}^{QCL}$ can be the combination of 2 LSBs of controlResourceSetZero in pdcch-ConfigSIB1 and 1 bit of spare.

Yet another example for using 3 bits in PBCH payload to indicate $N_{SSB}^{QCL}$ can be the combination of 2 MSBs of controlResourceSetZero in pdcch-ConfigSIB1 and 1 bit of spare.

Yet another example for using 3 bits in PBCH payload to indicate $N_{SSB}^{QCL}$ can be the combination of 2 MSBs of searchSpaceZero in pdcch-ConfigSIB1 and 1 bit of spare.

Yet another example for using 3 bits in PBCH payload to indicate $N_{SSB}^{QCL}$ can be the combination of 2 LSBs of searchSpaceZero in pdcch-ConfigSIB1 and 1 bit of spare.

Yet another example for using 3 bits in PBCH payload to indicate $N_{SSB}^{QCL}$ can be the combination of 2 LSBs of ssb-SubcarrierOffset and 1 bit of spare.

Yet another example for using 3 bits in PBCH payload to indicate $N_{SSB}^{QCL}$ can be the combination of 2 MSBs of ssb-SubcarrierOffset and 1 bit of spare.

Yet another example for using 3 bits in PBCH payload to indicate $N_{SSB}^{QCL}$ can be the combination of 2 MSBs of searchSpaceZero in pdcch-ConfigSIB1 and 1 MSB of controlResourceSetZero in pdcch-ConfigSIB1.

Yet another example for using 3 bits in PBCH payload to indicate $N_{SSB}^{QCL}$ can be the combination of 2 LSBs of searchSpaceZero in pdcch-ConfigSIB1 and 1 LSB of controlResourceSetZero in pdcch-ConfigSIB1.

Yet another example for using 3 bits in PBCH payload to indicate $N_{SSB}^{QCL}$ can be the combination of 1 MSB of searchSpaceZero in pdcch-ConfigSIB1 and 2 MSBs of controlResourceSetZero in pdcch-ConfigSIB1.

Yet another example for using 3 bits in PBCH payload to indicate $N_{SSB}^{QCL}$ can be the combination of 1 LSB of searchSpaceZero in pdcch-ConfigSIB1 and 2 LSBs of controlResourceSetZero in pdcch-ConfigSIB1.

Yet another example for using 3 bits in PBCH payload to indicate $N_{SSB}^{QCL}$ can be the combination of 2 MSBs of searchSpaceZero in pdcch-ConfigSIB1 and 1 LSB of ssb-SubcarrierOffset.

Yet another example for using 3 bits in PBCH payload to indicate $N_{SSB}^{QCL}$ can be the combination of 2 LSBs of searchSpaceZero in pdcch-ConfigSIB1 and 1 LSB of ssb-SubcarrierOffset.

Yet another example for using 3 bits in PBCH payload to indicate $N_{SSB}^{QCL}$ can be the combination of 1 MSB of searchSpaceZero in pdcch-ConfigSIB1 and 2 LSBs of ssb-SubcarrierOffset.

Yet another example for using 3 bits in PBCH payload to indicate $N_{SSB}^{QCL}$ can be the combination of 1 LSB of searchSpaceZero in pdcch-ConfigSIB1 and 2 LSBs of ssb-SubcarrierOffset.

Yet another example for using 3 bits in PBCH payload to indicate $N_{SSB}^{QCL}$ can be the combination of 2 MSBs of controlResourceSetZero in pdcch-ConfigSIB1 and 1 LSB of ssb-SubcarrierOffset.

Yet another example for using 3 bits in PBCH payload to indicate $N_{SSB}^{QCL}$ can be the combination of 2 LSBs of controlResourceSetZero in pdcch-ConfigSIB1 and 1 LSB of ssb-SubcarrierOffset.

Yet another example for using 3 bits in PBCH payload to indicate $N_{SSB}^{QCL}$ can be the combination of 1 MSB of controlResourceSetZero in pdcch-ConfigSIB1 and 2 LSBs of ssb-SubcarrierOffset.

Yet another example for using 3 bits in PBCH payload to indicate $N_{SSB}^{QCL}$ can be the combination of 1 LSB of controlResourceSetZero in pdcch-ConfigSIB1 and 2 LSBs of ssb-SubcarrierOffset.

Yet another example for using 3 bits in PBCH payload to indicate $N_{SSB}^{QCL}$ can be the combination of 1 LSB of ssb-SubcarrierOffset, 1 bit of subCarrierSpacingCommon, and 1 bit of spare.

Yet another example for using 3 bits in PBCH payload to indicate $N_{SSB}^{QCL}$ can be the combination of 1 LSB of controlResourceSetZero in pdcch-ConfigSIB1, 1 bit of subCarrierSpacingCommon, and 1 bit of spare.

Yet another example for using 3 bits in PBCH payload to indicate $N_{SSB}^{QCL}$ can be the combination of 1 MSB of controlResourceSetZero in pdcch-ConfigSIB1, 1 bit of subCarrierSpacingCommon, and 1 bit of spare.

Yet another example for using 3 bits in PBCH payload to indicate $N_{SSB}^{QCL}$ can be the combination of 1 LSB of searchSpaceZero in pdcch-ConfigSIB1, 1 bit of subCarrierSpacingCommon, and 1 bit of spare.

Yet another example for using 3 bits in PBCH payload to indicate $N_{SSB}^{QCL}$ can be the combination of 1 MSB of searchSpaceZero in pdcch-ConfigSIB1, 1 bit of subCarrierSpacingCommon, and 1 bit of spare.

Yet another example for using 3 bits in PBCH payload to indicate $N_{SSB}^{QCL}$ can be the combination of 1 LSB of ssb-SubcarrierOffset, 1 bit of spare, and 1 LSB of searchSpaceZero in pdcch-ConfigSIB1.

Yet another example for using 3 bits in PBCH payload to indicate $N_{SSB}^{QCL}$ can be the combination of 1 LSB of ssb-SubcarrierOffset, 1 bit of spare, and 1 MSB of searchSpaceZero in pdcch-ConfigSIB1.

Yet another example for using 3 bits in PBCH payload to indicate $N_{SSB}^{QCL}$ can be the combination of 1 LSB of ssb-SubcarrierOffset, 1 bit of spare, and 1 LSB of controlResourceSetZero in pdcch-ConfigSIB1.

Yet another example for using 3 bits in PBCH payload to indicate $N_{SSB}^{QCL}$ can be the combination of 1 LSB of ssb-SubcarrierOffset, 1 bit of spare, and 1 MSB of controlResourceSetZero in pdcch-ConfigSIB1.

Yet another example for using 3 bits in PBCH payload to indicate $N_{SSB}^{QCL}$ can be the combination of 1 MSB of searchSpaceZero in pdcch-ConfigSIB1, 1 MSB of controlResourceSetZero in pdcch-ConfigSIB1, and 1 bit of spare.

Yet another example for using 3 bits in PBCH payload to indicate $N_{SSB}^{QCL}$ can be the combination of 1 LSB of searchSpaceZero in pdcch-ConfigSIB1, 1 LSB of controlResourceSetZero in pdcch-ConfigSIB1, and 1 bit of spare.

Yet another example for using 3 bits in PBCH payload to indicate $N_{SSB}^{QCL}$ can be the combination of 1 MSB of searchSpaceZero in pdcch-ConfigSIB1, 1 MSB of controlResourceSetZero in pdcch-ConfigSIB1, and 1 bit of subCarrierSpacingCommon.

Yet another example for using 3 bits in PBCH payload to indicate $N_{SSB}^{QCL}$ can be the combination of 1 LSB of searchSpaceZero in pdcch-ConfigSIB1, 1 LSB of controlResourceSetZero in pdcch-ConfigSIB1, and 1 bit of subCarrierSpacingCommon.

Yet another example for using 3 bits in PBCH payload to indicate $N_{SSB}^{QCL}$ can be the combination of 1 LSB of ssb-SubcarrierOffset, 1 bit of subCarrierSpacingCommon, and 1 LSB of searchSpaceZero in pdcch-ConfigSIB1.

Yet another example for using 3 bits in PBCH payload to indicate $N_{SSB}^{QCL}$ can be the combination of 1 LSB of ssb-SubcarrierOffset, 1 bit of subCarrierSpacingCommon, and 1 MSB of searchSpaceZero in pdcch-ConfigSIB1.

Yet another example for using 3 bits in PBCH payload to indicate $N_{SSB}^{QCL}$ can be the combination of 1 LSB of ssb-SubcarrierOffset, 1 bit of subCarrierSpacingCommon, and 1 LSB of controlResourceSetZero in pdcch-ConfigSIB1.

Yet another example for using 3 bits in PBCH payload to indicate $N_{SSB}^{QCL}$ can be the combination of 1 LSB of ssb-SubcarrierOffset, 1 bit of subCarrierSpacingCommon, and 1 MSB of controlResourceSetZero in pdcch-ConfigSIB1.

Yet another example for using 3 bits in PBCH payload to indicate $N_{SSB}^{QCL}$ can be the combination of 1 LSB of ssb-SubcarrierOffset, 1 MSB of searchSpaceZero in pdcch-ConfigSIB1, and 1 MSB of controlResourceSetZero in pdcch-ConfigSIB1.

Yet another example for using 3 bits in PBCH payload to indicate $N_{SSB}^{QCL}$ can be the combination of 1 LSB of ssb-SubcarrierOffset, 1 LSB of searchSpaceZero in pdcch-ConfigSIB1, and 1 LSB of controlResourceSetZero in pdcch-ConfigSIB1.

One example for using 4 bits in PBCH payload to indicate $N_{SSB}^{QCL}$ can be the combination of 3 LSBs of controlResourceSetZero in pdcch-ConfigSIB1 and 1 bit of subCarrierSpacingCommon.

Another example for using 4 bits in PBCH payload to indicate $N_{SSB}^{QCL}$ can be the combination of 3 MSBs of controlResourceSetZero in pdcch-ConfigSIB1 and 1 bit of subCarrierSpacingCommon.

Yet another example for using 4 bits in PBCH payload to indicate $N_{SSB}^{QCL}$ can be the combination of 3 MSBs of searchSpaceZero in pdcch-ConfigSIB1 and 1 bit of subCarrierSpacingCommon.

Yet another example for using 4 bits in PBCH payload to indicate $N_{SSB}^{QCL}$ can be the combination of 3 LSBs of searchSpaceZero in pdcch-ConfigSIB1 and 1 bit of subCarrierSpacingCommon.

Yet another example for using 4 bits in PBCH payload to indicate $N_{SSB}^{QCL}$ can be the combination of 3 LSBs of ssb-SubcarrierOffset and 1 bit of subCarrierSpacingCommon.

Yet another example for using 4 bits in PBCH payload to indicate $N_{SSB}^{QCL}$ can be the combination of 3 MSBs of ssb-SubcarrierOffset and 1 bit of subCarrierSpacingCommon.

Yet another example for using 4 bits in PBCH payload to indicate $N_{SSB}^{QCL}$ can be the combination of 3 LSBs of controlResourceSetZero in pdcch-ConfigSIB1 and 1 bit of spare.

Yet another example for using 4 bits in PBCH payload to indicate $N_{SSB}^{QCL}$ can be the combination of 3 MSBs of controlResourceSetZero in pdcch-ConfigSIB1 and 1 bit of spare.

Yet another example for using 4 bits in PBCH payload to indicate $N_{SSB}^{QCL}$ can be the combination of 3 MSBs of searchSpaceZero in pdcch-ConfigSIB1 and 1 bit of spare.

Yet another example for using 4 bits in PBCH payload to indicate $N_{SSB}^{QCL}$ can be the combination of 3 LSBs of searchSpaceZero in pdcch-ConfigSIB1 and 1 bit of spare.

Yet another example for using 4 bits in PBCH payload to indicate $N_{SSB}^{QCL}$ can be the combination of 3 LSBs of ssb-SubcarrierOffset and 1 bit of spare.

Yet another example for using 4 bits in PBCH payload to indicate $N_{SSB}^{QCL}$ can be the combination of 3 MSBs of ssb-SubcarrierOffset and 1 bit of spare.

Yet another example for using 4 bits in PBCH payload to indicate $N_{SSB}^{QCL}$ can be the combination of 3 MSBs of searchSpaceZero in pdcch-ConfigSIB1 and 1 MSB of controlResourceSetZero in pdcch-ConfigSIB1.

Yet another example for using 4 bits in PBCH payload to indicate $N_{SSB}^{QCL}$ can be the combination of 3 LSBs of searchSpaceZero in pdcch-ConfigSIB1 and 1 LSB of controlResourceSetZero in pdcch-ConfigSIB1.

Yet another example for using 4 bits in PBCH payload to indicate $N_{SSB}^{QCL}$ can be the combination of 2 MSBs of searchSpaceZero in pdcch-ConfigSIB1 and 2 MSBs of controlResourceSetZero in pdcch-ConfigSIB1.

Yet another example for using 4 bits in PBCH payload to indicate $N_{SSB}^{QCL}$ can be the combination of 2 LSBs of searchSpaceZero in pdcch-ConfigSIB1 and 2 LSBs of controlResourceSetZero in pdcch-ConfigSIB1.

Yet another example for using 4 bits in PBCH payload to indicate $N_{SSB}^{QCL}$ can be the combination of 1 MSB of searchSpaceZero in pdcch-ConfigSIB1 and 3 MSBs of controlResourceSetZero in pdcch-ConfigSIB1.

Yet another example for using 4 bits in PBCH payload to indicate $N_{SSB}^{QCL}$ can be the combination of 1 LSB of searchSpaceZero in pdcch-ConfigSIB1 and 3 LSBs of controlResourceSetZero in pdcch-ConfigSIB1.

Yet another example for using 4 bits in PBCH payload to indicate $N_{SSB}^{QCL}$ can be the combination of 3 MSBs of searchSpaceZero in pdcch-ConfigSIB1 and 1 LSB of ssb-SubcarrierOffset.

Yet another example for using 4 bits in PBCH payload to indicate $N_{SSB}^{QCL}$ can be the combination of 3 LSBs of searchSpaceZero in pdcch-ConfigSIB1 and 1 LSB of ssb-SubcarrierOffset.

Yet another example for using 4 bits in PBCH payload to indicate $N_{SSB}^{QCL}$ can be the combination of 2 MSBs of searchSpaceZero in pdcch-ConfigSIB1 and 2 LSBs of ssb-SubcarrierOffset.

Yet another example for using 4 bits in PBCH payload to indicate $N_{SSB}^{QCL}$ can be the combination of 2 LSBs of searchSpaceZero in pdcch-ConfigSIB1 and 2 LSBs of ssb-SubcarrierOffset.

Yet another example for using 4 bits in PBCH payload to indicate $N_{SSB}^{QCL}$ can be the combination of 1 MSB of searchSpaceZero in pdcch-ConfigSIB1 and 3 LSBs of ssb-SubcarrierOffset.

Yet another example for using 4 bits in PBCH payload to indicate $N_{SSB}^{QCL}$ can be the combination of 1 LSB of searchSpaceZero in pdcch-ConfigSIB1 and 3 LSBs of ssb-SubcarrierOffset.

Yet another example for using 4 bits in PBCH payload to indicate $N_{SSB}^{QCL}$ can be the combination of 3 MSBs of controlResourceSetZero in pdcch-ConfigSIB1 and 1 LSB of ssb-SubcarrierOffset.

Yet another example for using 4 bits in PBCH payload to indicate $N_{SSB}^{QCL}$ can be the combination of 3 LSBs of controlResourceSetZero in pdcch-ConfigSIB1 and 1 LSB of ssb-SubcarrierOffset.

Yet another example for using 4 bits in PBCH payload to indicate $N_{SSB}^{QCL}$ can be the combination of 2 MSBs of controlResourceSetZero in pdcch-ConfigSIB1 and 2 LSBs of ssb-SubcarrierOffset.

Yet another example for using 4 bits in PBCH payload to indicate $N_{SSB}^{QCL}$ can be the combination of 2 LSBs of controlResourceSetZero in pdcch-ConfigSIB1 and 2 LSBs of ssb-SubcarrierOffset.

Yet another example for using 4 bits in PBCH payload to indicate $N_{SSB}^{QCL}$ can be the combination of 1 MSB of controlResourceSetZero in pdcch-ConfigSIB1 and 3 LSBs of ssb-SubcarrierOffset.

Yet another example for using 4 bits in PBCH payload to indicate $N_{SSB}^{QCL}$ can be the combination of 1 LSB of controlResourceSetZero in pdcch-ConfigSIB1 and 3 LSBs of ssb-SubcarrierOffset.

Yet another example for using 4 bits in PBCH payload to indicate $N_{SSB}^{QCL}$ can be the combination of 2 LSBs of ssb-SubcarrierOffset, 1 bit of subCarrierSpacingCommon, and 1 bit of spare.

Yet another example for using 4 bits in PBCH payload to indicate $N_{SSB}^{QCL}$ can be the combination of 2 LSBs of controlResourceSetZero in pdcch-ConfigSIB1, 1 bit of subCarrierSpacingCommon, and 1 bit of spare.

Yet another example for using 4 bits in PBCH payload to indicate $N_{SSB}^{QCL}$ can be the combination of 2 MSBs of controlResourceSetZero in pdcch-ConfigSIB1, 1 bit of subCarrierSpacingCommon, and 1 bit of spare.

Yet another example for using 4 bits in PBCH payload to indicate $N_{SSB}^{QCL}$ can be the combination of 2 LSBs of searchSpaceZero in pdcch-ConfigSIB1, 1 bit of subCarrierSpacingCommon, and 1 bit of spare.

Yet another example for using 4 bits in PBCH payload to indicate $N_{SSB}^{QCL}$ can be the combination of 2 MSBs of searchSpaceZero in pdcch-ConfigSIB1, 1 bit of subCarrierSpacingCommon, and 1 bit of spare.

Yet another example for using 4 bits in PBCH payload to indicate $N_{SSB}^{QCL}$ can be the combination of 2 LSBs of ssb-SubcarrierOffset, 1 bit of spare, and 1 LSB of searchSpaceZero in pdcch-ConfigSIB1.

Yet another example for using 4 bits in PBCH payload to indicate $N_{SSB}^{QCL}$ can be the combination of 2 LSBs of ssb-SubcarrierOffset, 1 bit of spare, and 1 MSB of searchSpaceZero in pdcch-ConfigSIB1.

Yet another example for using 4 bits in PBCH payload to indicate $N_{SSB}^{QCL}$ can be the combination of 1 LSB of ssb-SubcarrierOffset, 1 bit of spare, and 2 LSBs of searchSpaceZero in pdcch-ConfigSIB1.

Yet another example for using 4 bits in PBCH payload to indicate $N_{SSB}^{QCL}$ can be the combination of 1 LSB of ssb-SubcarrierOffset, 1 bit of spare, and 2 MSBs of searchSpaceZero in pdcch-ConfigSIB1.

Yet another example for using 4 bits in PBCH payload to indicate $N_{SSB}^{QCL}$ can be the combination of 2 LSBs of ssb-SubcarrierOffset, 1 bit of spare, and 1 LSB of controlResourceSetZero in pdcch-ConfigSIB1.

Yet another example for using 4 bits in PBCH payload to indicate $N_{SSB}^{QCL}$ can be the combination of 2 LSBs of ssb-SubcarrierOffset, 1 bit of spare, and 1 MSB of controlResourceSetZero in pdcch-ConfigSIB1.

Yet another example for using 4 bits in PBCH payload to indicate $N_{SSB}^{QCL}$ can be the combination of 1 LSB of ssb-SubcarrierOffset, 1 bit of spare, and 2 LSBs of controlResourceSetZero in pdcch-ConfigSIB1.

Yet another example for using 4 bits in PBCH payload to indicate $N_{SSB}^{QCL}$ can be the combination of 1 LSB of ssb-SubcarrierOffset, 1 bit of spare, and 2 MSBs of controlResourceSetZero in pdcch-ConfigSIB1.

Yet another example for using 4 bits in PBCH payload to indicate $N_{SSB}^{QCL}$ can be the combination of 2 MSBs of searchSpaceZero in pdcch-ConfigSIB1, 1 MSB of controlResourceSetZero in pdcch-ConfigSIB1, and 1 bit of spare.

Yet another example for using 4 bits in PBCH payload to indicate $N_{SSB}^{QCL}$ can be the combination of 2 LSBs of searchSpaceZero in pdcch-ConfigSIB1, 1 LSB of controlResourceSetZero in pdcch-ConfigSIB1, and 1 bit of spare.

Yet another example for using 4 bits in PBCH payload to indicate $N_{SSB}^{QCL}$ can be the combination of 1 MSB of searchSpaceZero in pdcch-ConfigSIB1, 2 MSBs of controlResourceSetZero in pdcch-ConfigSIB1, and 1 bit of spare.

Yet another example for using 4 bits in PBCH payload to indicate $N_{SSB}^{QCL}$ can be the combination of 1 LSB of searchSpaceZero in pdcch-ConfigSIB1, 2 LSBs of controlResourceSetZero in pdcch-ConfigSIB1, and 1 bit of spare.

Yet another example for using 4 bits in PBCH payload to indicate $N_{SSB}^{QCL}$ can be the combination of 2 MSBs of searchSpaceZero in pdcch-ConfigSIB1, 1 MSB of controlResourceSetZero in pdcch-ConfigSIB1, and 1 bit of subCarrierSpacingCommon.

Yet another example for using 4 bits in PBCH payload to indicate $N_{SSB}^{QCL}$ can be the combination of 2 LSBs of searchSpaceZero in pdcch-ConfigSIB1, 1 LSB of controlResourceSetZero in pdcch-ConfigSIB1, and 1 bit of subCarrierSpacingCommon.

Yet another example for using 4 bits in PBCH payload to indicate $N_{SSB}^{QCL}$ can be the combination of 1 MSB of searchSpaceZero in pdcch-ConfigSIB1, 2 MSBs of controlResourceSetZero in pdcch-ConfigSIB1, and 1 bit of subCarrierSpacingCommon.

Yet another example for using 4 bits in PBCH payload to indicate $N_{SSB}^{QCL}$ can be the combination of 1 LSB of searchSpaceZero in pdcch-ConfigSIB1, 2 LSBs of controlResourceSetZero in pdcch-ConfigSIB1, and 1 bit of subCarrierSpacingCommon.

Yet another example for using 4 bits in PBCH payload to indicate $N_{SSB}^{QCL}$ can be the combination of 2 LSBs of ssb-SubcarrierOffset, 1 bit of subCarrierSpacingCommon, and 1 LSB of searchSpaceZero in pdcch-ConfigSIB1.

Yet another example for using 4 bits in PBCH payload to indicate $N_{SSB}^{QCL}$ can be the combination of 2 LSBs of ssb-SubcarrierOffset, 1 bit of subCarrierSpacingCommon, and 1 MSB of searchSpaceZero in pdcch-ConfigSIB1.

Yet another example for using 4 bits in PBCH payload to indicate $N_{SSB}^{QCL}$ can be the combination of 1 LSB of ssb-SubcarrierOffset, 1 bit of subCarrierSpacingCommon, and 2 LSBs of searchSpaceZero in pdcch-ConfigSIB1.

Yet another example for using 4 bits in PBCH payload to indicate $N_{SSB}^{QCL}$ can be the combination of 1 LSB of ssb-SubcarrierOffset, 1 bit of subCarrierSpacingCommon, and 2 MSBs of searchSpaceZero in pdcch-ConfigSIB1.

Yet another example for using 4 bits in PBCH payload to indicate $N_{SSB}^{QCL}$ can be the combination of 1 LSB of ssb-SubcarrierOffset, 1 bit of subCarrierSpacingCommon, and 1 LSB of controlResourceSetZero in pdcch-ConfigSIB1.

Yet another example for using 4 bits in PBCH payload to indicate $N_{SSB}^{QCL}$ can be the combination of 1 LSB of ssb-SubcarrierOffset, 1 bit of subCarrierSpacingCommon, and 1 MSB of controlResourceSetZero in pdcch-ConfigSIB1.

Yet another example for using 4 bits in PBCH payload to indicate $N_{SSB}^{QCL}$ can be the combination of 2 LSBs of ssb-SubcarrierOffset, 1 bit of subCarrierSpacingCommon, and 1 LSB of controlResourceSetZero in pdcch-ConfigSIB1.

Yet another example for using 4 bits in PBCH payload to indicate $N_{SSB}^{QCL}$ can be the combination of 2 LSBs of ssb-SubcarrierOffset, 1 bit of subCarrierSpacingCommon, and 1 MSB of controlResourceSetZero in pdcch-ConfigSIB1.

Yet another example for using 4 bits in PBCH payload to indicate $N_{SSB}^{QCL}$ can be the combination of 1 LSB of ssb-SubcarrierOffset, 1 MSB of searchSpaceZero in pdcch-ConfigSIB1, and 2 MSBs of controlResourceSetZero in pdcch-ConfigSIB1.

Yet another example for using 4 bits in PBCH payload to indicate $N_{SSB}^{QCL}$ can be the combination of 1 LSB of ssb-SubcarrierOffset, 1 LSB of searchSpaceZero in pdcch-ConfigSIB1, and 2 LSBs of controlResourceSetZero in pdcch-ConfigSIB1.

Yet another example for using 4 bits in PBCH payload to indicate $N_{SSB}^{QCL}$ can be the combination of 1 LSB of ssb-SubcarrierOffset, 1 LSB of searchSpaceZero in pdcch-ConfigSIB1, 1 LSB of controlResourceSetZero in pdcch-ConfigSIB1, and 1 bit of subCarrierSpacingCommon.

Yet another example for using 4 bits in PBCH payload to indicate $N_{SSB}^{QCL}$ can be the combination of 1 LSB of ssb-SubcarrierOffset, 1 MSB of searchSpaceZero in pdcch-ConfigSIB1, 1 MSB of controlResourceSetZero in pdcch-ConfigSIB1, and 1 bit of subCarrierSpacingCommon.

Yet another example for using 4 bits in PBCH payload to indicate $N_{SSB}^{QCL}$ can be the combination of 1 LSB of ssb-SubcarrierOffset, 1 LSB of searchSpaceZero in pdcch-ConfigSIB1, 1 LSB of controlResourceSetZero in pdcch-ConfigSIB1, and 1 bit of spare.

Yet another example for using 4 bits in PBCH payload to indicate $N_{SSB}^{QCL}$ can be the combination of 1 LSB of ssb-SubcarrierOffset, 1 MSB of searchSpaceZero in pdcch-ConfigSIB1, 1 MSB of controlResourceSetZero in pdcch-ConfigSIB1, and 1 bit of spare.

Yet another example for using 4 bits in PBCH payload to indicate $N_{SSB}^{QCL}$ can be the combination of 1 bit of spare, 1 LSB of searchSpaceZero in pdcch-ConfigSIB1, 1 LSB of controlResourceSetZero in pdcch-ConfigSIB1, and 1 bit of subCarrierSpacingCommon.

Yet another example for using 4 bits in PBCH payload to indicate $N_{SSB}^{QCL}$ can be the combination of 1 bit of spare, 1 MSB of searchSpaceZero in pdcch-ConfigSIB1, 1 MSB of controlResourceSetZero in pdcch-ConfigSIB1, and 1 bit of subCarrierSpacingCommon.

Yet another example for using 4 bits in PBCH payload to indicate $N_{SSB}^{QCL}$ can be the combination of 1 LSB of ssb-SubcarrierOffset, 1 bit of spare, 1 LSB of controlResourceSetZero in pdcch-ConfigSIB1, and 1 bit of spare.

Yet another example for using 4 bits in PBCH payload to indicate $N_{SSB}^{QCL}$ can be the combination of 1 LSB of ssb-SubcarrierOffset, 1 bit of spare, 1 MSB of controlResourceSetZero in pdcch-ConfigSIB1, and 1 bit of spare.

Yet another example for using 4 bits in PBCH payload to indicate $N_{SSB}^{QCL}$ can be the combination of 1 LSB of ssb-SubcarrierOffset, 1 LSB of searchSpaceZero in pdcch-ConfigSIB1, 1 bit of spare, and 1 bit of spare.

Yet another example for using 4 bits in PBCH payload to indicate $N_{SSB}^{QCL}$ can be the combination of 1 LSB of ssb-SubcarrierOffset, 1 MSB of searchSpaceZero in pdcch-ConfigSIB1, 1 bit of spare, and 1 bit of spare.

In another embodiment, for the higher carrier frequency range considered in this disclosure, $N_{SSB}^{QCL}$ is indicated in SIB (e.g., SIB1). In one further example, $N_{SSB}^{QCL}$ is indicated in both PBCH payload and SIB, wherein the value for $N_{SSB}^{QCL}$ in PBCH is a subset of the value for $N_{SSB}^{QCL}$ in SIB. For example, the bitwidth of the field(s) for indicating $N_{SSB}^{QCL}$ in PBCH is smaller than the bitwidth of the field for indicating $N_{SSB}^{QCL}$ in SIB. The example value of $N_{SSB}^{QCL}$ indicated in SIB can refer to an example value of $N_{SSB}^{QCL}$ indicated in PBCH payload.

In one embodiment, for the higher carrier frequency range considered in this disclosure, there is an indication, in PBCH payload, on whether the frequency layer, where the corresponding SS/PBCH block is located, operates with shared spectrum channel access or not (e.g., whether or not a LBT procedure is needed when initializing a channel occupancy). For example, as illustrated in FIG. 6, a first band can be operated with shared spectrum channel access (e.g., requiring LBT procedure when initializing a channel occupancy), and a second band can be operated without shared spectrum channel access (e.g., not requiring LBT procedure when initializing a channel occupancy), wherein the first band and the second band overlap in frequency domain.

If an SS/PBCH block is located on the overlapped bandwidth, then an indication in PBCH payload can help the UE to distinguish whether the corresponding SS/PBCH block is operated with shared spectrum channel access or not. For another example, one band can be operated with shared spectrum channel access in a first geography region (e.g., requiring LBT procedure when initializing a channel occupancy), and can be operated without shared spectrum channel access in a second geography region (e.g., not requiring LBT procedure when initializing a channel occupancy), then an indication in PBCH payload can help the UE to distinguish whether the corresponding SS/PBCH block is operated with shared spectrum channel access or not.

Figure 6:
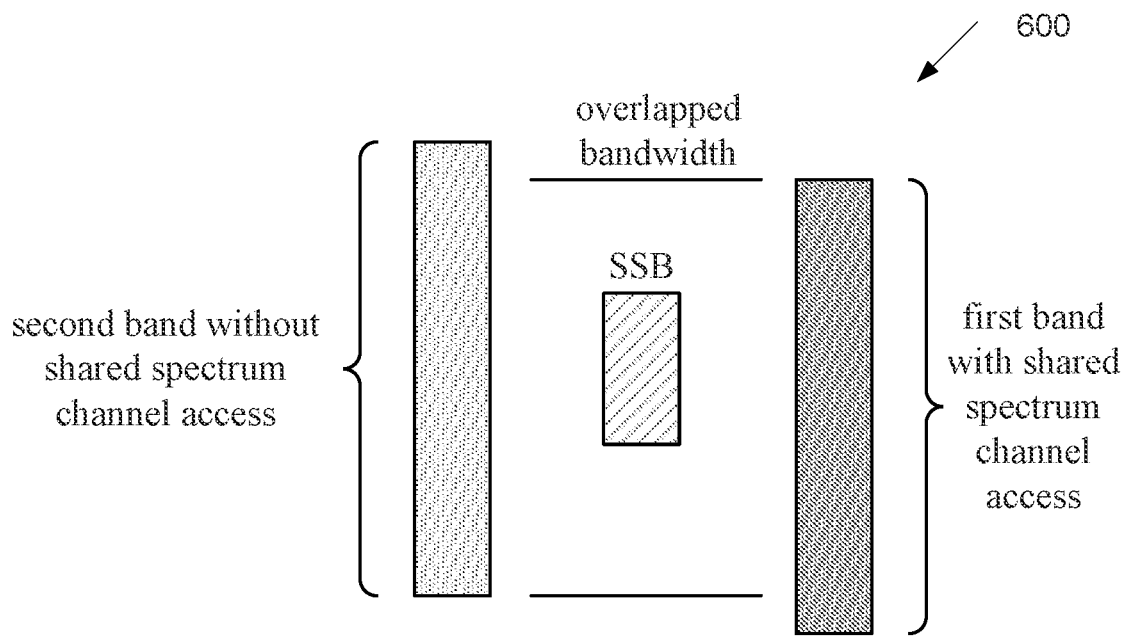
FIG. 6 illustrates an example overlapping band with and without shared spectrum channel access according to embodiments of the present disclosure.

FIG. 6 illustrates an example overlapping band 600 with and without shared spectrum channel access according to embodiments of the present disclosure. An embodiment of the overlapping band 600 shown in FIG. 6 is for illustration only.

In one embodiment, based on this indication, a UE can interpret at least part of the PBCH content differently for operation with shared spectrum channel access and operation without shared spectrum channel access. An example UE procedure for determining the payload of PBCH based on the indication of operation with shared spectrum channel access or not is shown in FIG. 7.

Figure 7:
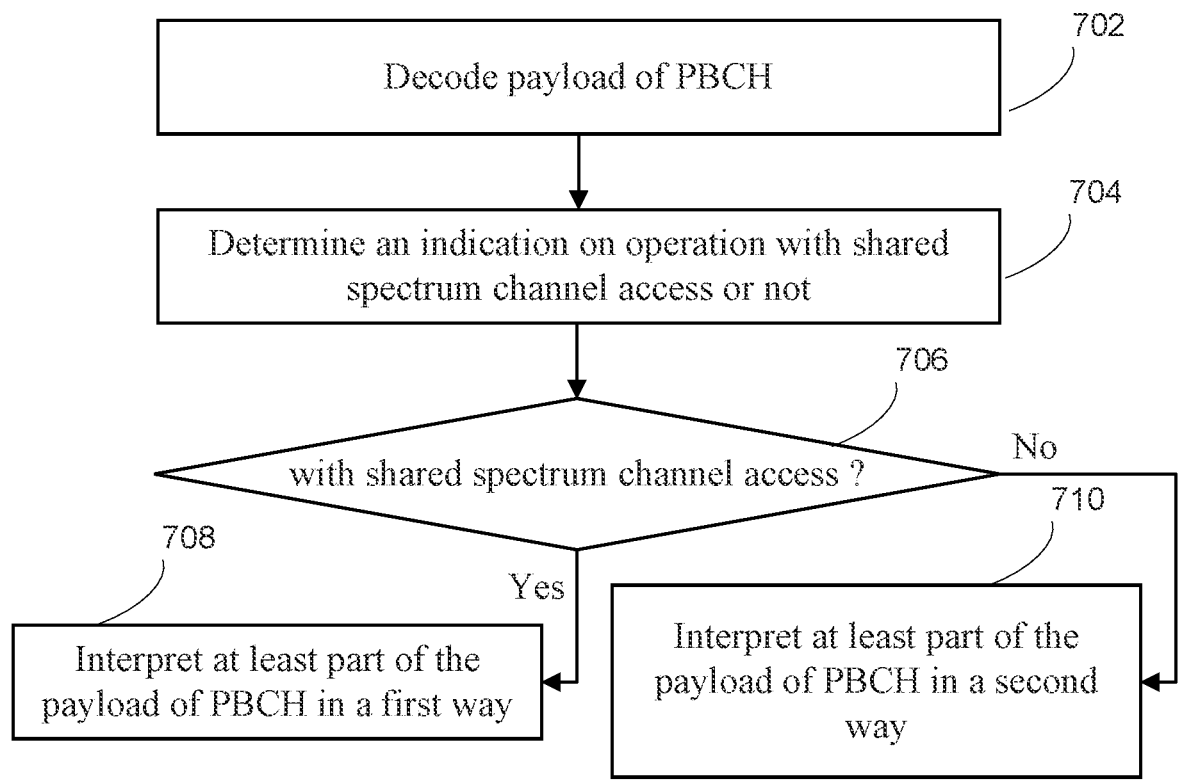
FIG. 7 illustrates a flowchart of a method for an indication of operation with shared spectrum channel access or not according to embodiments of the present disclosure.

FIG. 7 illustrates a flowchart of a method 700 for an indication of operation with shared spectrum channel access or not according to embodiments of the present disclosure. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As illustrated in FIG. 7, the method 700 begins at step 702. In step 702, a UE (e.g., 111-116 as illustrated in FIG. 1) decode payload of PBCH. Subsequently, the UE in step 704 determines in indication on operation with shared spectrum channel access or not. Next, the UE in step 706 determines whether a shared spectrum channel access is achieved. In step 706, if yes, the UE in step 708 interprets at least part of the payload of PBCH in a first way. In step 706, if no, the UE in step 710 interprets at least part of the payload of PBCH in a second way.

In one example, the indication of operation with shared spectrum channel access or not can be with 1 bit in the payload of PBCH, wherein the 1-bit indication can be a re-interpretation of one bit in the payload of PBCH.

For a first example, the 1-bit indication can re-interpret 1 bit of ssb-SubcarrierOffset, e.g., the 1 LSB or MSB.

For a second example, the 1-bit indication can re-interpret 1 bit of controlResourceSetZero in pdcch-ConfigSIB1, e.g., the 1 LSB or MSB.

For a third example, the 1-bit indication can re-interpret 1 bit of searchSpaceZero in pdcch-ConfigSIB1, e.g., the 1 LSB or MSB.

For a fourth example, the 1-bit indication can re-interpret the 1 bit of subCarrierSpacingCommon.

For a fifth example, the 1-bit indication can re-interpret the 1 bit of spare.

For a sixth example, the 1-bit indication can re-interpret the 1 bit of $\bar{a}_{\bar{A}+4}$.

For a seventh example, the 1-bit indication can re-interpret the 1 bit of $\bar{a}_{\bar{A}}$.

In another example, the indication of operation with shared spectrum channel access or not can be using the non-used combination of fields in the payload of PBCH.

For example, when cellBarred is provided as "notBarred," a UE determines the frequency layer operates with shared spectrum channel access if intraFreqReselection is provided as "allowed"; and the UE determines the frequency layer operates without shared spectrum channel access if intraFreqReselection is provided as "notAllowed."

In another example, when cellBarred is provided as "notBarred," a UE determines the frequency layer operates without shared spectrum channel access if intraFreqReselection is provided as "allowed"; and the UE determines the frequency layer operates with shared spectrum channel access if intraFreqReselection is provided as "notAllowed."

In yet another example, the indication of operation with shared spectrum channel access or not is jointly coded with the QCL parameter $N_{SSB}^{QCL}$.

For one example, a non-numerical value for the QCL parameter $N_{SSB}^{QCL}$ can be utilized to indicate operation without shared spectrum channel access. In one instance, $N_{SSB}^{QCL}$ is a 3-bit field taking values from {1, 2, 4, 8, 16, 32, 64, "not applicable" }, wherein the numerical values indicate channel occupancy with channel sensing (e.g., LBT), and the non-numerical values indicates channel occupancy without channel sensing (e.g., LBT).

For another example, a value for the QCL parameter $N_{SSB}^{QCL}$ same as the maximum number of candidate SS/PBCH blocks can be utilized to indicate operation without shared spectrum channel access.

In another embodiment, there can be an indication on whether the frequency layer operates with shared spectrum channel access or not using a RRC parameter. For example, the indication can be in a cell specific configuration, e.g., SIB1 and/or ServingCellConfigCommon. For another example, the indication can be in a UE-specific configuration.

In one embodiment, for the higher carrier frequency range considered in this disclosure, there can be an indication in MIB on the 4th LSB of SFN, using 1 bit reinterpreted from Rel-15 or Rel-16.

For a first example, the 1-bit indication can re-interpret 1 bit of ssb-SubcarrierOffset, e.g., the 1 LSB or MSB.

For a second example, the 1-bit indication can re-interpret 1 bit of controlResourceSetZero in pdcch-ConfigSIB1, e.g., the 1 LSB or MSB.

For a third example, the 1-bit indication can re-interpret 1 bit of searchSpaceZero in pdcch-ConfigSIB1, e.g., the 1 LSB or MSB.

For a fourth example, the 1-bit indication can re-interpret the 1 bit of subCarrierSpacingCommon.

For a fifth example, the 1-bit indication can re-interpret the 1 bit of spare.

For this embodiment, the indication of $\bar{a}_{\bar{A}}$ in the PHY bits, which is the 4th LSB of SFN in Rel-15 and Rel-16, can be re-interpreted, and examples are shown in TABLE 7.

In one embodiment, for the higher carrier frequency range considered in this disclosure, the quantity $k_{SSB}$ is the subcarrier offset from subcarrier 0 in common resource block $N_{CRB}^{SSB}$ to subcarrier 0 of the SS/PBCH block, or for providing information on another cell-defining SS/PBCH block, based on a value range.

In one example, for the higher carrier frequency range considered in this disclosure, the quantity $k_{SSB}$ is expressed in terms of the subcarrier spacing of CORESET #0. For one example, the subcarrier spacing of CORESET #0 is the same as the subcarrier spacing of the SS/PBCH block. For another example, the subcarrier spacing of CORESET #0 is provided by higher layer parameter subCarrierSpacingCommon.

In one example, if the LSB of ssb-SubcarrierOffset is utilized for indicating other information (e.g., QCL parameter $N_{SSB}^{QCL}$, or operation with shared spectrum channel access or not, or 4th LSB of SFN, or etc.), as described in an example of this disclosure, then $\bar{k}_{SSB}$ (or equivalently the 4 LSBs of $\bar{k}_{SSB}$) is given by the higher-layer parameter ssb-SubcarrierOffset. If $\bar{k}_{SSB} \geq 12$, $k_{SSB} = \bar{k}_{SSB}$; otherwise, $k_{SSB} = 2\lfloor \bar{k}_{SSB}/2 \rfloor$.

In another example, if the 2 LSBs of ssb-SubcarrierOffset is utilized for indicating other information (e.g., QCL parameter $N_{SSB}^{QCL}$, or operation with shared spectrum channel access or not, or 4th LSB of SFN, or etc.), as described in an example of this disclosure, then $\bar{k}_{SSB}$ (or equivalently the 4 LSBs of $\bar{k}_{SSB}$) is given by the higher-layer parameter ssb-SubcarrierOffset. If $\bar{k}_{SSB} \geq 12$, $k_{SSB} = \bar{k}_{SSB}$; otherwise, $k_{SSB} = 4\lfloor \bar{k}_{SSB}/4 \rfloor$.

In yet another example, if the 3 LSBs of ssb-SubcarrierOffset is utilized for indicating other information (e.g., QCL parameter $N_{SSB}^{QCL}$, or operation with shared spectrum channel access or not, or 4th LSB of SFN, or etc.), as described in an example of this disclosure, then $\bar{k}_{SSB}$ (or equivalently the 4 LSBs of $\bar{k}_{SSB}$) is given by the higher-layer parameter ssb-SubcarrierOffset. If $\bar{k}_{SSB} \geq 12$, $k_{SSB} = \bar{k}_{SSB}$; otherwise, $k_{SSB} = 8\lfloor \bar{k}_{SSB}/8 \rfloor$.

In another example, if the field ssb-SubcarrierOffset is utilized for indicating other information (e.g., QCL parameter $N_{SSB}^{QCL}$, or operation with shared spectrum channel access or not, or 4th LSB of SFN, or etc.), as described in an example of this disclosure, then $\overline{k}_{SSB}$ (or equivalently the 4 LSBs of $\overline{k}_{SSB}$) is given by the higher-layer parameter ssb-SubcarrierOffset. If $\overline{k}_{SSB} \geq 12$, $k_{SSB} = \overline{k}_{SSB}$; otherwise, $k_{SSB} = 0$.

In one embodiment, for the higher carrier frequency range considered in this disclosure, the interleaving PBCH payload can have corresponding changes when the bits in PBCH payloads are re-interpreted.

In one example, the interleaving of bits generated by physical layer in PBCH payload can be according to the following. For one example, this example can be at least applicable to Example 1 in TABLE 5A.

TABLE 8

The interleaving of bits generated
by physical layer in PBCH payload

Let $A = \overline{A} + 8$; $j_{SFN} = 0$; $j_{SSB} = 10$; $j_{other} = 14$;
for i = 0 to A − 1
  if $\overline{a}_i$ is an SFN bit
    $a_{G(j_{SFN})} = \overline{a}_i$;
    $j_{SFN} = j_{SFN} + 1$;
  elseif $\overline{a}_i$ is a candidate SS/PBCH block index bit
    $a_{G(j_{SSB})} = \overline{a}_i$;
    $j_{SSB} = j_{SSB} + 1$;
  else
    $a_{G(j_{other})} = \overline{a}_i$;
    $j_{other} = j_{other} + 1$;
  end if
end for For another example, the interleaving of bits generated by physical layer in PBCH payload can be according to the following. For one example, this example can be at least applicable to Example 2 in TABLE 5A.

TABLE 9

The interleaving of bits generated
by physical layer in PBCH payload

Let $A = \overline{A} + 8$; $j_{SFN} = 0$; $j_{QCL} = 10$; $j_{SSB} = 11$; $j_{other} = 14$;
for i = 0 to A − 1
  if $\overline{a}_i$ is an SFN bit
    $a_{G(j_{SFN})} = \overline{a}_i$;
    $j_{SFN} = j_{SFN} + 1$;
  elseif $\overline{a}_i$ is a bit for indicating $N_{SSB}^{QCL}$
    $a_{G(j_{QCL})} = \overline{a}_i$;
  elseif $\overline{a}_i$ is a candidate SS/PBCH block index bit
    $a_{G(j_{SSB})} = \overline{a}_i$;
    $j_{SSB} = j_{SSB} + 1$;
  else
    $a_{G(j_{other})} = \overline{a}_i$;
    $j_{other} = j_{other} + 1$;
  end if
end for For yet another example, the interleaving of bits generated by physical layer in PBCH payload can be according to the following. For one example, this example can be at least applicable to Example 1 in TABLE 7.

TABLE 10

The interleaving of bits generated
by physical layer in PBCH payload

Let $A = \overline{A} + 8$; $j_{SFN} = 1$; $j_{HRF} = 10$; $j_{SSB} = 0$; $j_{other} = 14$;
for i = 0 to A − 1
  if $\overline{a}_i$ is an SFN bit
    $a_{G(j_{SFN})} = \overline{a}_i$;
    $j_{SFN} = j_{SFN} + 1$;
  elseif $\overline{a}_i$ is the half radio frame bit
    $a_{G(j_{HRF})} = \overline{a}_i$;
  elseif $\overline{a}_i$ is a candidate SS/PBCH block index bit
    $a_{G(j_{SSB})} = \overline{a}_i$;
    if $i = \overline{A}$
      $j_{SSB} = j_{SSB} + 11$;
    else
      $j_{SSB} = j_{SSB} + 1$;
    end if
  else
    $a_{G(j_{other})} = \overline{a}_i$;
    $j_{other} = j_{other} + 1$;
  end if
end for For yet another example, the interleaving of bits generated by physical layer in PBCH payload can be according to the following. For one example, this example can be at least applicable to Example 2 in TABLE 7.

TABLE 11

The interleaving of bits generated
by physical layer in PBCH payload

Let $A = \overline{A} + 8$; $j_{SFN} = 0$; $j_{HRF} = 9$; $j_{SSB} = 10$; $j_{other} = 14$;
for i = 0 to A − 1
  if $\overline{a}_i$ is an SFN bit
    $a_{G(j_{SFN})} = \overline{a}_i$;
    $j_{SFN} = j_{SFN} + 1$;
  elseif $\overline{a}_i$ is the half radio frame bit
    $a_{G(j_{HRF})} = \overline{a}_i$;
  elseif $\overline{a}_i$ is a candidate SS/PBCH block index bit
    $a_{G(j_{SSB})} = \overline{a}_i$;
    $j_{SSB} = j_{SSB} + 1$;
  else
    $a_{G(j_{other})} = \overline{a}_i$;
    $j_{other} = j_{other} + 1$;
  end if
end for In one embodiment, for the higher carrier frequency range considered in this disclosure, the scrambling of PBCH payload can have corresponding changes when the bits in PBCH payloads are re-interpreted.

In one example, for the Example 1 and Example 2 in TABLE 5A, the length of the segments of the scrambling sequence (e.g., M) is determined as M=A−6.

In another example, for the Example 1 and Example 2 in TABLE 7, the length of the segments of the scrambling sequence (e.g., M) is determined as M=A−7.

In one embodiment, for the higher carrier frequency range considered in this disclosure, the number of DM-RS sequences for PBCH per cell can be increased (e.g., larger than 8).

In one example, the generation of DM-RS sequences for PBCH is based on the pseudo-random sequence c(i) with changes to the initial condition of the generator to support larger number of sequences per cell, wherein the initial condition is according to: $c_{init} = c_1(\overline{i}_{SSB}+1)(\lfloor N_{ID}^{cell}/4 \rfloor + 1) + c_2(\overline{i}_{SSB}+1) + (N_{ID}^{cell} \mod 4)$, where $\overline{i}_{SSB}$ is LSBs of candidate SS/PBCH block index with $0 \leq \overline{i}_{SSB} \leq \overline{N}_{DM-RS}^{PBCH} - 1$, and $\overline{N}_{DM-RS}^{PBCH}$ is the number of DM-RS sequences per cell.

In one example, $\overline{N}_{DM-RS}^{PBCH}=16$ such that $\bar{i}_{SSB}$ is the 4 LSBs of candidate SS/PBCH block index, and $c_1=2^{11}$, $c_2=2^6$.

In another example, $N_{DM-RS}^{PBCH}=16$ such that $\bar{i}_{SSB}$ is the 4 LSBs of candidate SS/PBCH block index, and $c_1=2^0$, $c_2=2^{14}$.

In yet another example, $N_{DM-RS}^{PBCH}=16$ such that $\bar{i}_{SSB}$ is the 4 LSBs of candidate SS/PBCH block index, and $c_1=2^{16}$, $c_2=2^3$.

In yet another example, $N_{DM-RS}^{PBCH}=32$ such that $\bar{i}_{SSB}$ is the 5 LSBs of candidate SS/PBCH block index, and $c_1=2^{11}$, $c_2=2^6$.

In yet another example, $N_{DM-RS}^{PBCH}=32$ such that $\bar{i}_{SSB}$ is the 5 LSBs of candidate SS/PBCH block index, and $c_1=2^{16}$, $c_2=2^3$.

In yet another example, $N_{DM-RS}^{PBCH}=32$ such that $\bar{i}_{SSB}$ is the 5 LSBs of candidate SS/PBCH block index, and $c_1=2^{12}$, $c_2=2^4$.

In yet another example, $N_{DM-RS}^{PBCH}=64$ such that $\bar{i}_{SSB}$ is the 6 LSBs of candidate SS/PBCH block index, and $c_1=2^{11}$, $c_2=2^6$.

In yet another example, $N_{DM-RS}^{PBCH}=64$ such that $\bar{i}_{SSB}$ is the 6 LSBs of candidate SS/PBCH block index, and $c_1=2^{16}$, $c_2=2^3$.

The present disclosure focuses on the CORESET #0 configuration. In particular, the embodiments of this disclosure are at least applicable to operation with shared spectrum channel access. The embodiments on the configuration design are based on the multiplexing pattern between SS/PBCH block and CORESET #0. The details of this disclosure include: (1) CORESET #0 configuration for Pattern 1; (2) CORESET #0 configuration for Pattern 2; and (3) CORESET #0 configuration for Pattern 3.

In NR Rel-15 and Rel-16, MIB in the payload of PBCH includes a field containing the configuration of CORESET for monitoring Type0-PDCCH common search space (CSS), which is denoted as CORESET #0. In NR Rel-15 and Rel-16, the multiplexing pattern between SS/PBCH block (SSB) and CORESET #0, the BW of CORESET #0, the number of symbols for CORESET #0, and the RB offset from a smallest RB index of the CORESET for Type0-PDCCH CSS set to a smallest RB index of the common RB overlapping with a first RB of the SS/PBCH block, are jointly coded using 4 bits, i.e., the field of controlResourceSetZero in pdcch-ConfigSIB1.

In NR Rel-15 and Rel-16, three multiplexing patterns between SS/PBCH block and CORESET #0 have been supported. In Pattern 1, the bandwidth of SS/PBCH block and the bandwidth of CORESET #0 overlap, and the instance of SS/PBCH block and instance of CORESET #0 do not take place at the same time; in Pattern 2, the bandwidth of SS/PBCH block and the bandwidth of CORESET #0 do not overlap, and the instance of SS/PBCH block and instance of CORESET #0 do not take place at the same time; in Pattern 3, the bandwidth of SS/PBCH block and the bandwidth of CORESET #0 do not overlap, and the instance of SS/PBCH block and instance of CORESET #0 take place at the same time. An illustration of the multiplexing patterns is shown in FIG. 8.

Figure 8:
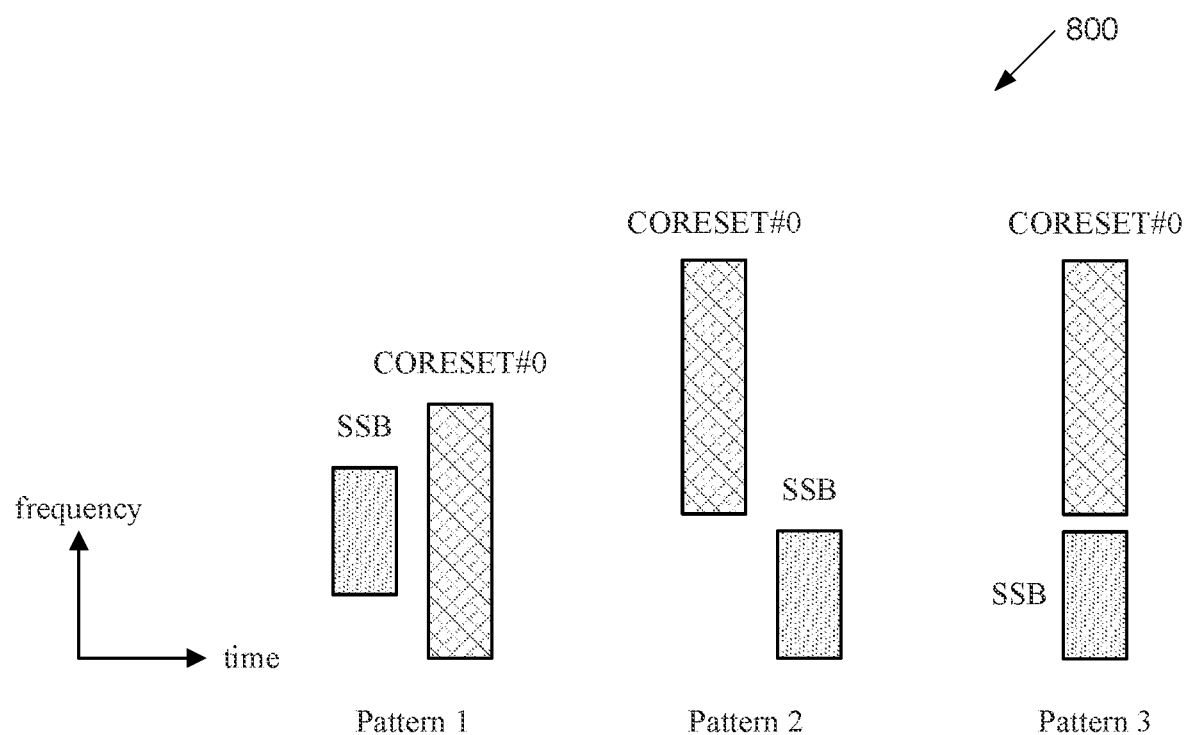
FIG. 8 illustrates example multiplexing patterns between SSB and CORESET #0 according to embodiments of the present disclosure.

FIG. 8 illustrates example multiplexing patterns 800 between SSB and CORESET #0 according to embodiments of the present disclosure. An embodiment of the multiplexing patterns 800 shown in FIG. 8 is for illustration only.

For a new carrier frequency range between 52.6 GHz and 71 GHz, a new numerology at least with a larger subcarrier spacing could be supported, to accommodate the larger phase noise and larger carrier bandwidth. When a new numerology (e.g., including a new subcarrier spacing) is supported in NR, the CORESET #0 configuration can be enhanced in order to support such new numerology. This disclosure specifies the details of CORESET #0 configuration for higher frequency range, wherein the higher frequency range at least includes the carrier frequency range between 52.6 GHz and 71 GHz, and can be applicable to both licensed (e.g., operated without shared spectrum channel access) and unlicensed bands (e.g., operated with shared spectrum channel access) in the frequency range.

In the present disclosure, CORESET #0 refers to the control resource set (CORESET) of the Type0-PDCCH common search space set.

In one embodiment, a common configuration table can be utilized for both operations with and without shared spectrum channel access, for a given supported combination of SCS of SS/PBCH block and CORESET #0. For this example, an example in this disclosure can be utilized for both operations with and without shared spectrum channel access, for a given supported combination of SCS of SS/PBCH block and CORESET #0.

In another embodiment, a separate configuration table can be utilized for operation with or without shared spectrum channel access, for a given supported combination of SCS of SS/PBCH block and CORESET #0. For this example, one example in this disclosure can be utilized for operation with shared spectrum channel access, and another example in this disclosure can be utilized for operation without shared spectrum channel access, for a given supported combination of SCS of SS/PBCH block and CORESET #0.

In one embodiment, there can be a large granularity of channel raster interval (e.g., as large as one nominal channel BW) and a large granularity of synchronization raster interval (e.g., e.g., as large as one nominal channel BW), such that there is only one synchronization raster entry within a nominal channel BW. For instance, the channelization and synchronization raster design can be applicable to operation with shared spectrum channel access, and the example CORESET #0 configuration in this disclosure is applicable to operation with shared spectrum channel access.

In one example, within a nominal channel BW (e.g., BW can be 2.16 GHz), there is one synchronization raster entry within a nominal channel, and one channel raster entry within the nominal channel. An illustration of this example is shown in FIG. 8.

Figure 9:
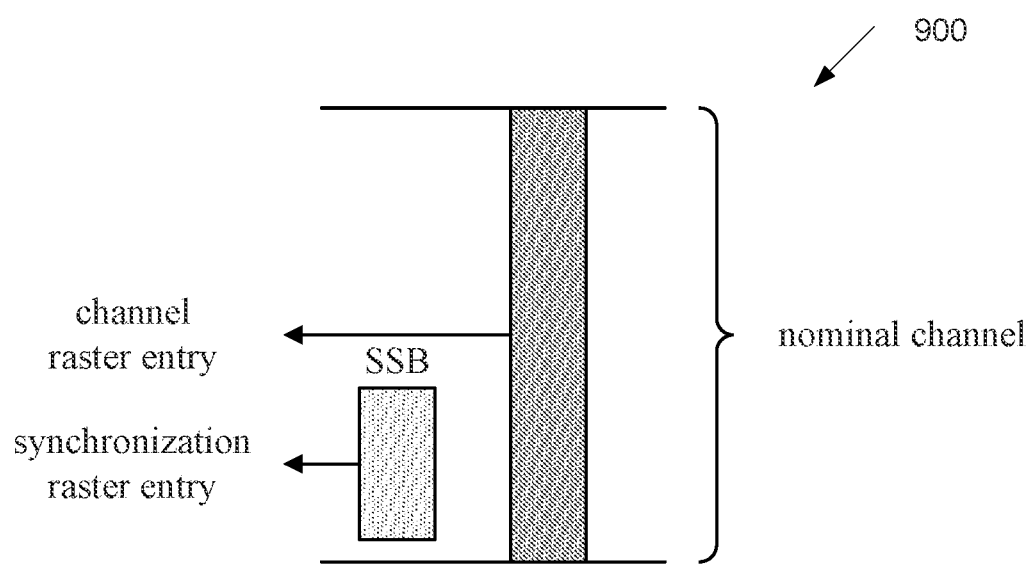
FIG. 9 illustrates an example second type of channelization and synchronization raster according to embodiments of the present disclosure.

FIG. 9 illustrates an example second type of channelization and synchronization raster 900 according to embodiments of the present disclosure. An embodiment of the second type of channelization and synchronization raster 900 shown in FIG. 9 is for illustration only.

In one embodiment, a supported SCS for a nominal channel can be 960 kHz, and the corresponding available number of RBs (e.g., not including the guard band) can be $N_{RB}^{960}$. For example, $N_{RB}^{960}=178$ for nominal BW around 2 GHz. For another example, $N_{RB}^{960}=180$ for nominal BW around 2 GHz.

In another embodiment, a supported SCS for a nominal channel can be 480 kHz, and the corresponding available number of RBs (e.g., not including the guard band) can be $N_{RB}^{480}$. For example, $N_{RB}^{480}=275$ for nominal BW around 2 GHz, if the maximum FFT size is considered as 4096.

In yet another embodiment, as least one of Pattern 2 and/or Pattern 3, in addition to Pattern 1, can be supported as the multiplexing pattern between SS/PBCH block and Type0-PDCCH within the CORESET #0. For example, both Pattern 2 and Pattern 3 are supported, in addition to Pattern 1.

In one embodiment, at least Pattern 1 can be supported and configured as the multiplexing pattern between SS/PBCH block and associated CORESET #0.

In one example, Pattern 1 can be configured for all the supported combinations of SCSs of SS/PBCH block and CORESET #0.

In another embodiment, the BW of CORESET #0 in term of RBs and with respect to the SCS of Type0-PDCCH within the CORESET #0 (e.g., denoted as $N_{RB}^{CORESET\ \#0}$) can be configured to be no smaller than the minimum requirement from regulation for operation with shared spectrum channel access.

For one example, the at least one configurable $N_{RB}^{CORESET\ \#0}$ is quantized to an integer as a multiple of six, e.g., $N_{RB}^{CORESET\ \#0} \geq 6 \cdot \lceil (BW_{carrier} \cdot \rho)/(SCS_{CORESET} \cdot 12 \cdot 6) \rceil$, wherein $\rho$ is the required ratio of bandwidth occupancy in regulation, and $BW_{carrier}$ is the nominal carrier bandwidth. For one example, at least one configurable $N_{RB}^{CORESET\ \#0} \geq 132$ RB, for $SCS_{CORESET} = 960$ kHz, $BW_{carrier} = 2$ GHz, and $\rho = 70\%$. For another example, at least one configurable $N_{RB}^{CORESET\ \#0} \geq 264$ RB, for $SCS_{CORESET} = 480$ kHz, $BW_{carrier} = 2$ GHz, and $\rho = 70\%$.

For another example, the at least one configurable $N_{RB}^{CORESET\ \#0}$ is quantized to an integer as a multiple of twelve, e.g., $N_{RB}^{CORESET\ \#0} \geq 12 \cdot \lceil (BW_{carrier} \cdot \rho)/(SCS_{CORESET} \cdot 12 \cdot 12) \rceil$, wherein $\rho$ is the required ratio of bandwidth occupancy in regulation, and $BW_{carrier}$ is the nominal carrier bandwidth. For one example, at least one configurable $N_{RB}^{CORESET\ \#0} \geq 132$ RB, for $SCS_{CORESET} = 960$ kHz, $BW_{carrier} = 2$ GHz, and $\rho = 70\%$. For another example, at least one configurable $N_{RB}^{CORESET\ \#0} \geq 264$ RB, for $SCS_{CORESET} = 480$ kHz, $BW_{carrier} = 2$ GHz, and $\rho = 70\%$.

In another embodiment, the BW of CORESET #0 in term of RBs and with respect to the SCS of Type0-PDCCH within the CORESET #0 (e.g., denoted as $N_{RB}^{CORESET\ \#0}$) can be configured to be no larger than the maximum number of RBs from channelization of all supported carriers overlapping with a nominal channel.

For one example, the at least one configurable $N_{RB}^{CORESET\ \#0}$ is quantized to an integer as a multiple of six. For example, $N_{RB}^{CORESET\ \#0} \leq 6 \cdot \lfloor N_{RB}^{960}/6 \rfloor$ for $SCS_{CORESET} = 960$ kHz, e.g., $N_{RB}^{CORESET\ \#0} \leq 174$ RB for $SCS_{CORESET} = 960$ kHz. For another example, $N_{RB}^{CORESET\ \#0} \leq 6 \lfloor N_{RB}^{480}/6 \rfloor$ for $SCS_{CORESET} = 480$ kHz, e.g., $N_{RB}^{CORESET\ \#0} \leq 270$ RB for $SCS_{CORESET} = 480$ kHz.

For another example, the at least one configurable $N_{RB}^{CORESET\ \#0}$ is quantized to an integer as a multiple of twelve. For example, $N_{RB}^{CORESET\ \#0} \leq 12 \cdot \lfloor N_{RB}^{960}/12 \rfloor$ for $SCS_{CORESET} = 960$ kHz, e.g., $N_{RB}^{CORESET\ \#0} \leq 168$ RB for $SCS_{CORESET} = 960$ kHz. For another example, $N_{RB}^{CORESET\ \#0} = 12 \cdot \lfloor N_{RB}^{480}/12 \rfloor$ for $SCS_{CORESET} = 480$ kHz, e.g., $N_{RB}^{CORESET\ \#0} \leq 264$ RB for $SCS_{CORESET} = 480$ kHz.

In one example, for Pattern 1, the BW of CORESET #0 in term of RBs and with respect to the SCS of Type0-PDCCH within the CORESET #0 (e.g., denoted as $N_{RB}^{CORESET\ \#0}$) is fixed as the maximum number of RBs from channelization of all supported carriers overlapping with a nominal channel. In one instance, $N_{RB}^{CORESET\ \#0}$ is determined as 174 (or 168) RBs when the SCS of Type0-PDCCH within the CORESET #0 is 960 kHz and configured with Pattern 1. In another instance, $N_{RB}^{CORESET\ \#0}$ is determined as 270 (or 264) RBs when the SCS of Type0-PDCCH within the CORESET #0 is 480 kHz and configured with Pattern 1.

In another example, for Pattern 1, the BW of CORESET #0 in term of RBs and with respect to the SCS of Type0-PDCCH within the CORESET #0 (e.g., denoted as $N_{RB}^{CORESET\ \#0}$) is fixed as the minimum requirement from regulation for operation with shared spectrum channel access. In one instance, $N_{RB}^{CORESET\ \#0}$ is determined as 132 RBs when the SCS of Type0-PDCCH within the CORESET #0 is 960 kHz and configured with Pattern 1. In another instance, $N_{RB}^{CORESET\ \#0}$ is determined as 264 RBs when the SCS of Type0-PDCCH within the CORESET #0 is 480 kHz and configured with Pattern 1.

In yet another example, for Pattern 1, the BW of CORESET #0 in term of RBs and with respect to the SCS of Type0-PDCCH within the CORESET #0 (e.g., denoted as $N_{RB}^{CORESET\ \#0}$) can be at least configurable as at least one integer between maximum number of RBs from channelization of all supported carriers overlapping with a nominal channel and the minimum requirement from regulation for operation with shared spectrum channel access. In one instance, $N_{RB}^{CORESET\ \#0}$ is configurable from a set of integers, wherein the integers are chosen from 132 to 174 (or 168) RBs when the SCS of Type0-PDCCH within the CORESET #0 is 960 kHz and configured with Pattern 1. In another instance, $N_{RB}^{CORESET\ \#0}$ is configurable from a set of integers, wherein the integers are chosen from 264 to 270 RBs when the SCS of Type0-PDCCH within the CORESET #0 is 480 kHz and configured with Pattern 1.

In yet another example, for Pattern 1, the BW of CORESET #0 in term of RBs and with respect to the SCS of Type0-PDCCH within the CORESET #0 (e.g., denoted as $N_{RB}^{CORESET\ \#0}$) can be at least configurable as $12 \cdot n$, where n is an integer such that $12 \cdot n$ is no larger than the maximum number of RBs per carrier. In one instance, $N_{RB}^{CORESET\ \#0}$ is configurable from a set of or a subset of $\{24, 48, 96, BW_{max}\}$ when the SCS of Type0-PDCCH within the CORESET #0 is 960 kHz, wherein $BW_{max}$ can be one integer from 132 to 174 (for example 174 or 168 or 132). In another instance, $N_{RB}^{CORESET\ \#0}$ is configurable from a set of or a subset of $\{24, 48, 96, 192, BW_{max}\}$ when both the SCS of SS/PBCH block and the SCS of Type0-PDCCH within the CORESET #0 are 480 kHz, wherein $BW_{max}$ can be one integer from 264 to 270 (for example 264 or 270). In yet another instance, $N_{RB}^{CORESET\ \#0}$ is configurable from a set of or a subset of $\{48, 96, 192, BW_{max}\}$ when the SCS of SS/PBCH block is 960 kHz and the SCS of Type0-PDCCH within the CORESET #0 is 480 kHz, wherein $BW_{max}$ can be one integer from 264 to 270 (for example 264 or 270).

Figure 10:
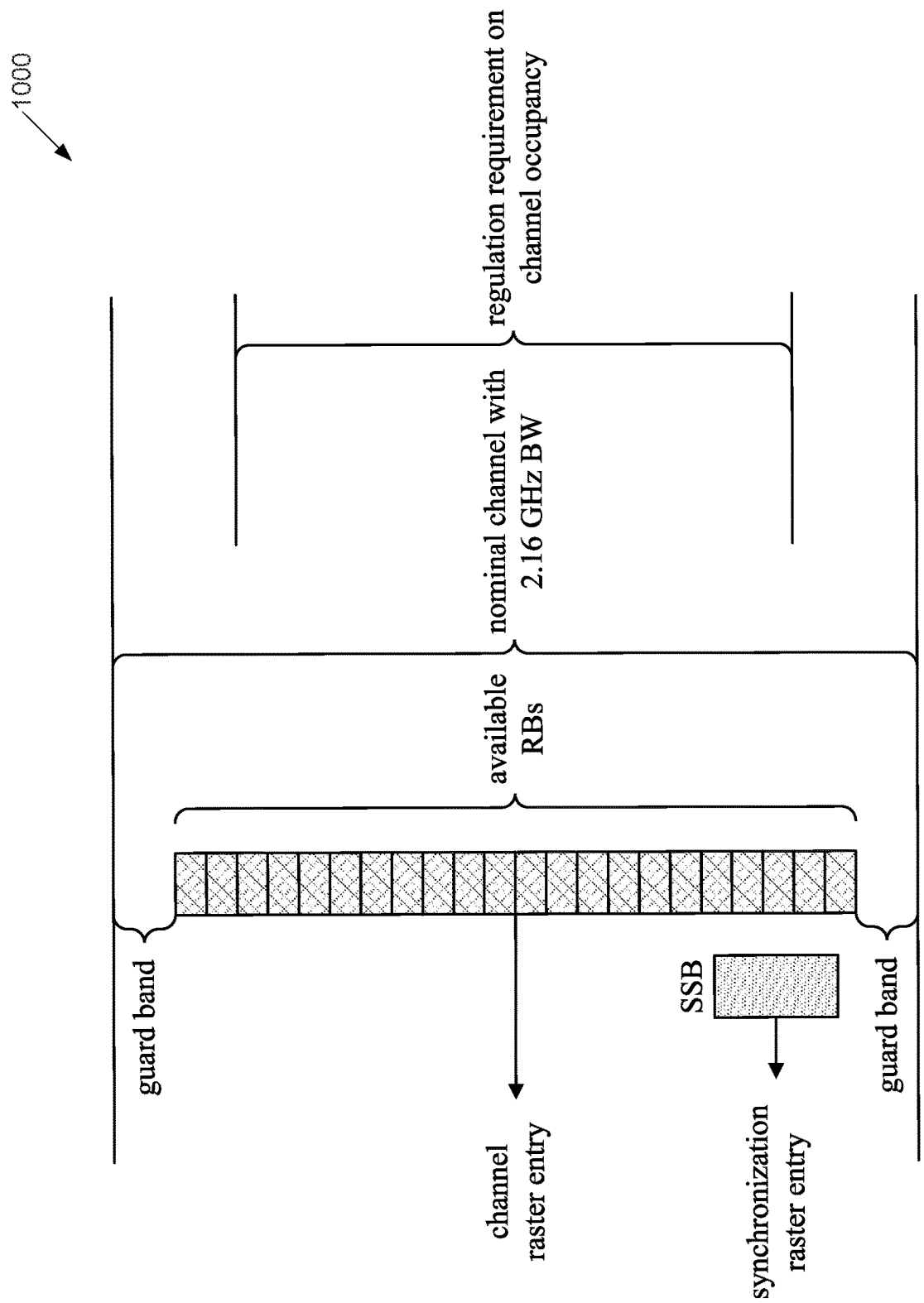
FIG. 10 illustrates an example CORESET #0 BW for pattern 1 according to embodiments of the present disclosure.

FIG. 10 illustrates an example CORESET #0 BW 1000 for pattern 1 according to embodiments of the present disclosure. An embodiment of the CORESET #0 BW 1000 shown in FIG. 10 is for illustration only.

In another embodiment, an RB offset from a smallest RB index of the CORESET for Type0-PDCCH CSS set to a smallest RB index of the common RB overlapping with a first RB of the SS/PBCH block can be associated with a supported CORESET #0 BW.

In one example, the RB offset from a smallest RB index of the CORESET for Type0-PDCCH CSS set to a smallest RB index of the common RB overlapping with a first RB of the SS/PBCH block can be fixed as 0 RB, for a given supported CORESET #0 BW. In one instance, this example can be applicable to the case where CORESET #0 BW is not $BW_{max}$.

In another example, the RB offset from a smallest RB index of the CORESET for Type0-PDCCH CSS set to a smallest RB index of the common RB overlapping with a first RB of the SS/PBCH block can be configurable, for a given supported CORESET #0 BW. In one instance, the RB offset can be configurable from the set or a subset of $\{0, 1, 2, 3\}$ if the CORESET #0 BW is $BW_{max}$ and the SCS of Type0-PDCCH within the CORESET #0 is same as the SCS of SS/PBCH block. In another instance, the RB offset can be configurable from the set or a subset of {0, 2} if the CORESET #0 BW is $BW_{max}$ and the SCS of Type0-PDCCH within the CORESET #0 is larger than the SCS of SS/PBCH block. In yet another instance, the RB offset can be configurable from the set or a subset of {0, 2, 4, 6} if the CORESET #0 BW is $BW_{max}$ and the SCS of Type0-PDCCH within the CORESET #0 is smaller than the SCS of SS/PBCH block.

In yet another embodiment, the number of symbols for CORESET #0 can be configurable between 1 and 2, for Pattern 1. In one additional example, the number of symbols for CORESET #0 can be further configurable as 3 if the BW of CORESET #0 is 48 RB or smaller. Example configurations for Pattern 1 with $\{SCS_{SSB}, SCS_{CORESET}\}=\{960$ kHz, 960 kHz$\}$ are shown in TABLE 12A, and at least a subset from the table can be supported, wherein $BW_{max}$ can be one integer from 132 to 174 (for example 174 or 168 or 132).

TABLE 12A

Example CORESET #0 configuration for $\{SCS_{SSB}, SCS_{CORESET}\} = \{960$ kHz, 960 kHz$\}$

| Index | Multiplexing pattern | CORESET#0 BW (RB) | No. of symbols for CORESET #0 | RB-level offset (RB) |
|---|---|---|---|---|
| 0 | 1 | $BW_{max}$ | 1 | 0 |
| 1 | 1 | $BW_{max}$ | 1 | 1 |
| 2 | 1 | $BW_{max}$ | 1 | 2 |
| 3 | 1 | $BW_{max}$ | 1 | 3 |
| 4 | 1 | $BW_{max}$ | 2 | 0 |
| 5 | 1 | $BW_{max}$ | 2 | 1 |
| 6 | 1 | $BW_{max}$ | 2 | 2 |
| 7 | 1 | $BW_{max}$ | 2 | 3 |
| 8 | 1 | 92 | 1 | 0 |
| 9 | 1 | 92 | 2 | 0 |
| 10 | 1 | 48 | 1 | 0 |
| 11 | 1 | 48 | 2 | 0 |
| 12 | 1 | 48 | 3 | 0 |
| 13 | 1 | 24 | 1 | 0 |
| 14 | 1 | 24 | 2 | 0 |
| 15 | 1 | 24 | 3 | 0 |

Example configurations for Pattern 1 with $\{SCS_{SSB}, SCS_{CORESET}\}=\{480$ kHz, 960 kHz$\}$ are shown in TABLE 12B, and at least a subset from the table can be supported, wherein $BW_{max}$ can be one integer from 132 to 174 (for example 174 or 168 or 132).

TABLE 12B

Example CORESET #0 configuration for $\{SCS_{SSB}, SCS_{CORESET}\} = \{480$ kHz, 960 kHz$\}$

| Index | Multiplexing pattern | CORESET#0 BW (RB) | No. of symbols for CORESET #0 | RB-level offset (RB) |
|---|---|---|---|---|
| 0 | 1 | $BW_{max}$ | 1 | 0 |
| 1 | 1 | $BW_{max}$ | 1 | 2 |
| 2 | 1 | $BW_{max}$ | 2 | 0 |
| 3 | 1 | $BW_{max}$ | 2 | 2 |
| 4 | 1 | 92 | 1 | 0 |
| 5 | 1 | 92 | 2 | 0 |
| 6 | 1 | 48 | 1 | 0 |
| 7 | 1 | 48 | 2 | 0 |
| 8 | 1 | 48 | 3 | 0 |
| 9 | 1 | 24 | 1 | 0 |
| 10 | 1 | 24 | 2 | 0 |
| 11 | 1 | 24 | 3 | 0 |

Example configurations for Pattern 1 with $\{SCS_{SSB}, SCS_{CORESET}\}=\{960$ kHz, 480 kHz$\}$ are shown in TABLE 12C, and at least a subset from the table can be supported, wherein $BW_{max}$ can be 270 or 264.

TABLE 12C

Example CORESET #0 configuration for $\{SCS_{SSB}, SCS_{CORESET}\} = \{960$ kHz, 480 kHz$\}$

| Index | Multiplexing pattern | CORESET#0 BW (RB) | No. of symbols for CORESET #0 | RB-level offset (RB) |
|---|---|---|---|---|
| 0 | 1 | $BW_{max}$ | 1 | 0 |
| 1 | 1 | $BW_{max}$ | 1 | 2 |
| 2 | 1 | $BW_{max}$ | 1 | 4 |
| 3 | 1 | $BW_{max}$ | 1 | 6 |
| 4 | 1 | $BW_{max}$ | 2 | 0 |
| 5 | 1 | $BW_{max}$ | 2 | 2 |
| 6 | 1 | $BW_{max}$ | 2 | 4 |
| 7 | 1 | $BW_{max}$ | 2 | 6 |
| 8 | 1 | 92 | 1 | 0 |
| 9 | 1 | 92 | 2 | 0 |
| 10 | 1 | 48 | 1 | 0 |
| 11 | 1 | 48 | 2 | 0 |
| 12 | 1 | 48 | 3 | 0 |

In one embodiment, Pattern 2 can be supported and configured as the multiplexing pattern between SS/PBCH block and CORESET #0, at least for some of the combinations of SCSs of SS/PBCH block and CORESET #0.

In one example, Pattern 2 can be configured at least for the case where the SCS of SS/PBCH block is not the same as the SCS of CORESET #0, e.g., the SCS of SS/PBCH block is twice of the SCS of CORESET #0 (1101) or the SCS of SS/PBCH block is half of the SCS of CORESET #0 (1102). An illustration of this example is shown in 1101 and 1102 of FIG. 11.

Figure 11:
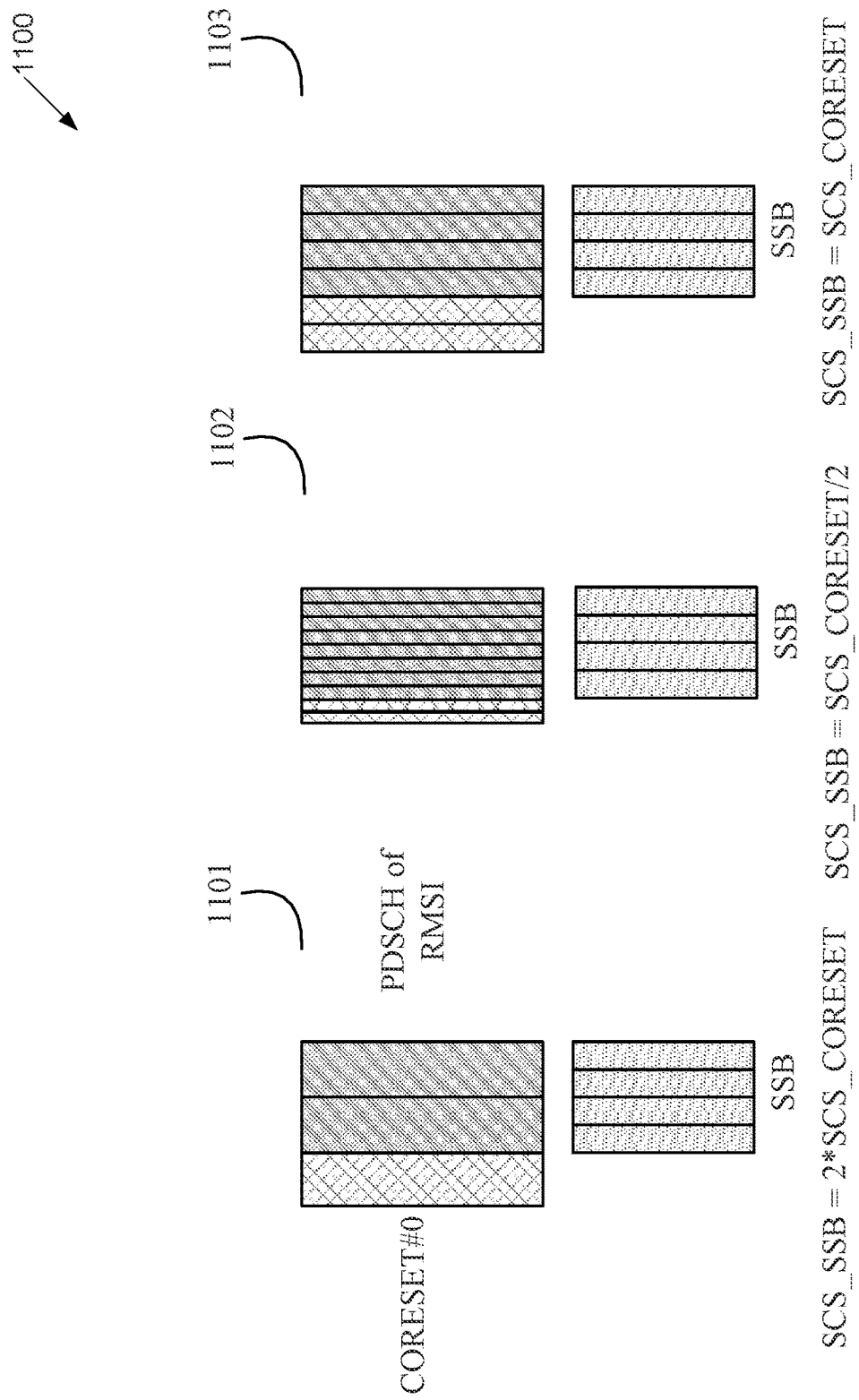
FIG. 11 illustrates an example pattern 2 according to embodiments of the present disclosure.

FIG. 11 illustrates an example pattern 2 1100 according to embodiments of the present disclosure. An embodiment of the pattern 2 1100 shown in FIG. 11 is for illustration only.

In another example, Pattern 2 can be configured at least for the case where the SCS of SS/PBCH block is the same as the SCS of CORESET #0. An illustration of this example is shown in 1103 of FIG. 11.

Figure 12:
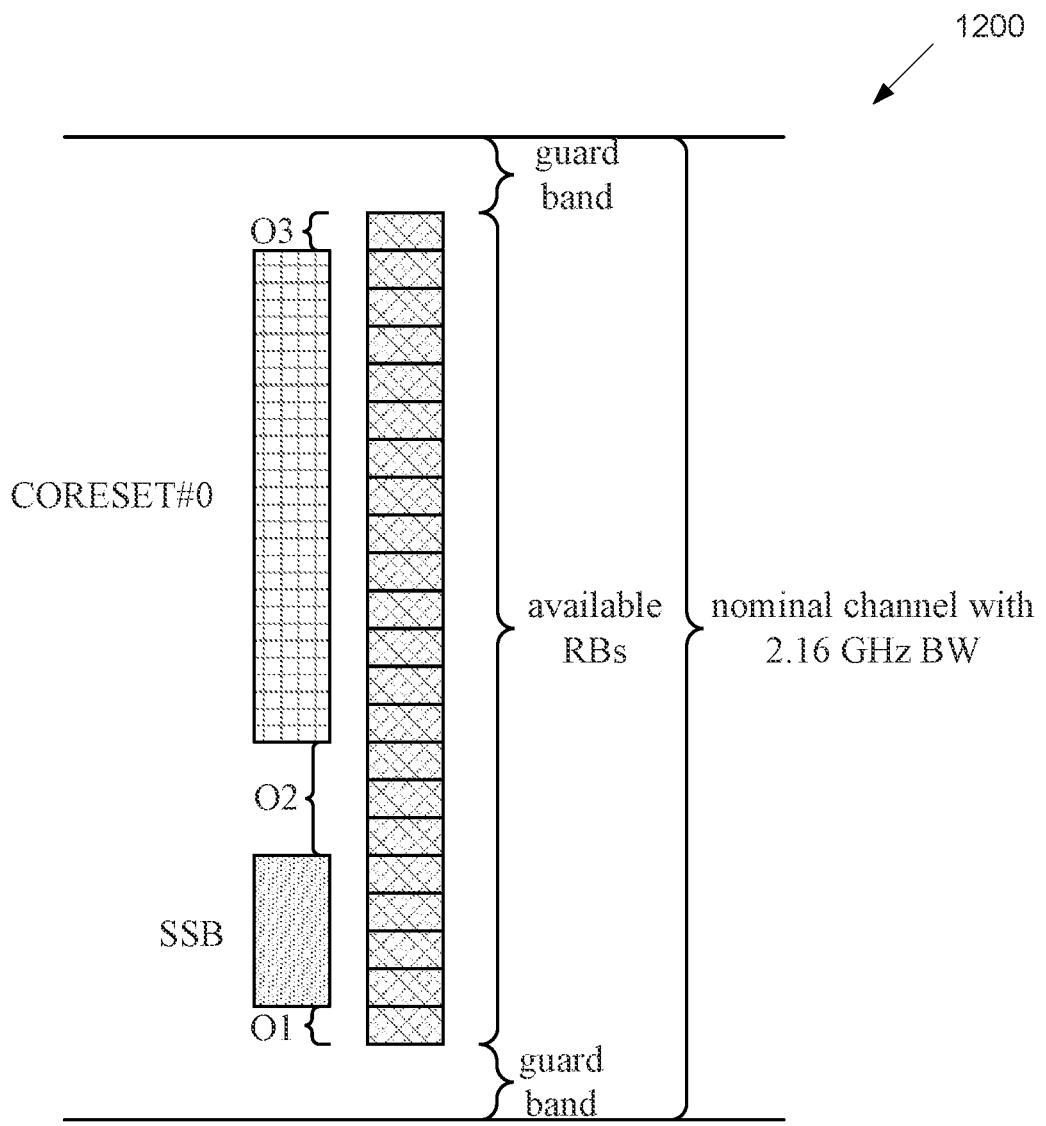
FIG. 12 illustrates an example CORESET #0 BW for pattern 2 or pattern 3 according to embodiments of the present disclosure.

In one embodiment, as shown in FIG. 12, the BW of CORESET #0 (e.g., $BW_{CORESET}$) and the BW of SSB (e.g., $BW_{SSB}$) can satisfy $BW_{CORESET}+BW_{SSB}+O_1+O_2+O_3=BW_{CH}$, where $BW_{CH}$ is the channel BW, and can be interpreted as $N_{RB}^{480}$ if the SCS of CORESET #0 is 480 kHz, or as $N_{RB}^{960}$ if the SCS of CORESET #0 is 960 kHz. $O_1$ is the offset between SSB and channel boundary according to the location of synchronization raster. $O_2$ is the offset between SSB and CORESET #0, which may be at least 1 RB if floating sync is supported (e.g., $k_{SSB}$ can be larger than 0), and may be at least one extra RB if the SCS of SS/PBCH block is not the same as the SCS of CORESET #0. For example, the value of $O_2$ depends on whether $k_{SSB}$ can be larger than 0 or not. $O_3$ is the offset between CORESET #0 and channel boundary, and for one example, $O_3$ can be set as 0 to achieve the maximum CORESET #0 bandwidth.

In such embodiment, as shown in FIG. 12, the RB offset from a smallest RB index of the CORESET for Type0-PDCCH CSS set to a smallest RB index of the common RB overlapping with a first RB of the SS/PBCH block can be determined as $-(BW_{SSB}+O_2)$, wherein the value of $BW_{SSB}$ and $O_2$ are both with respect to the SCS of CORESET #0.

FIG. 12 illustrates an example CORESET #0 BW 1200 for pattern 2 or pattern 3 according to embodiments of the present disclosure. An embodiment of the CORESET #0 BW 1200 shown in FIG. 12 is for illustration only.

In one example, for Pattern 2 with $\{SCS_{SSB}, SCS_{CORESET}\}=\{960$ kHz, 960 kHz$\}$, $O_1=0$, and $O_3=0$. For one example, the RB offset from the smallest RB index of the CORESET for Type0-PDCCH CSS set to the smallest RB index of the common RB overlapping with a first RB of the SS/PBCH block can be determined as −20. For another example, the RB offset from a smallest RB index of the CORESET for Type0-PDCCH CSS set to a smallest RB index of the common RB overlapping with a first RB of the SS/PBCH block can be determined as −25 if $k_{SSB}>0$, and determined as −26 if $k_{SSB}$ 0.

In another example, for Pattern 2 with {$SCS_{SSB}$, $SCS_{CORESET}$}={960 kHz, 960 kHz}, $O_3>0$. For one example, the RB offset from a smallest RB index of the CORESET for Type0-PDCCH CSS set to a smallest RB index of the common RB overlapping with a first RB of the SS/PBCH block can be determined as −21 if $k_{SSB}>0$, and determined as −20 if $k_{SSB}=0$. For another example, the RB offset from the smallest RB index of the CORESET for Type0-PDCCH CSS set to the smallest RB index of the common RB overlapping with a first RB of the SS/PBCH block can be determined as −21.

In yet another example, for Pattern 2 with {$SCS_{SSB}$, $SCS_{CORESET}$}={480 kHz, 960 kHz}, $O_3>0$. For one example, the RB offset from a smallest RB index of the CORESET for Type0-PDCCH CSS set to a smallest RB index of the common RB overlapping with a first RB of the SS/PBCH block can be determined as −12 if $k_{SSB}>0$, and determined as −11 if $k_{SSB}=0$. For another example, the RB offset from the smallest RB index of the CORESET for Type0-PDCCH CSS set to the smallest RB index of the common RB overlapping with a first RB of the SS/PBCH block can be determined as −12.

In yet another example, for Pattern 2 with {$SCS_{SSB}$, $SCS_{CORESET}$}={960 kHz, 480 kHz}, $O_3>0$. For one example, the RB offset from a smallest RB index of the CORESET for Type0-PDCCH CSS set to a smallest RB index of the common RB overlapping with a first RB of the SS/PBCH block can be determined as −42 if $k_{SSB}>0$, and determined as −41 if $k_{SSB}=0$. For another example, the RB offset from the smallest RB index of the CORESET for Type0-PDCCH CSS set to the smallest RB index of the common RB overlapping with a first RB of the SS/PBCH block can be determined as −42.

In another embodiment, the number of symbols for CORESET #0 can be dependent on relation between the SCS of CORESET #0 and the SCS of SS/PBCH block.

In one example, if the SCS of SS/PBCH block is twice of the SCS of CORESET #0 (e.g., 1101 in FIG. 11), the number of symbols for CORESET #0 can be determined as 1 for Pattern 2 (e.g., to leave the number of symbols for PDSCH of RMSI as 2).

In another example, if the SCS of SS/PBCH block is half of the SCS of CORESET #0 (e.g., 1102 in FIG. 11), the number of symbols for CORESET #0 can be configurable between 1 and 2 for Pattern 2 (e.g., to leave the number of symbols for PDSCH of RMSI as 4).

In yet another example, if the SCS of SS/PBCH block is same as the SCS of CORESET #0 (e.g., 1103 in FIG. 11), the number of symbols for CORESET #0 can be configurable between 1 and 2 for Pattern 2 (e.g., to leave the number of symbols for PDSCH of RMSI as 4 or 7).

Example configurations for Pattern 2 with {$SCS_{SSB}$, $SCS_{CORESET}$}={960 kHz, 960 kHz} are shown in TABLE 13A, and at least a subset from the table can be supported, wherein $BW_{max}$ can be either 150 or 144.

TABLE 13A

Example CORESET #0 configuration for {$SCS_{SSB}$, $SCS_{CORESET}$} = {960 KHz, 960 kHz}

| Index | Multi-plexing pattern | CORESET#0 BW (RB) | No. of symbols for CORESET #0 | RB-level offset (RB) |
|---|---|---|---|---|
| 0 | 2 | $BW_{max}$ | 1 | −26 if $k_{SSB}$ = 0, −25 if $k_{SSB}>0$ |
| 1 | 2 | $BW_{max}$ | 2 | −26 if $k_{SSB}$ = 0, −25 if $k_{SSB}>0$ |
| 2 | 2 | $BW_{max}$ | 1 | −20 if $k_{SSB}$ = 0, −21 if $k_{SSB}>0$ |
| 3 | 2 | $BW_{max}$ | 2 | −20 if $k_{SSB}$ = 0, −21 if $k_{SSB}>0$ |
| 4 | 2 | 96 | 1 | −20 if $k_{SSB}$ = 0, −21 if $k_{SSB}>0$ |
| 5 | 2 | 96 | 2 | −20 if $k_{SSB}$ = 0, −21 if $k_{SSB}>0$ |
| 6 | 2 | 48 | 1 | −20 if $k_{SSB}$ = 0, −21 if $k_{SSB}>0$ |
| 7 | 2 | 48 | 2 | −20 if $k_{SSB}$ = 0, −21 if $k_{SSB}>0$ |
| 8 | 2 | 24 | 1 | −20 if $k_{SSB}$ = 0, −21 if $k_{SSB}>0$ |
| 9 | 2 | 24 | 2 | −20 if $k_{SSB}$ = 0, −21 if $k_{SSB}>0$ |

Example configurations for Pattern 2 with {$SCS_{SSB}$, $SCS_{CORESET}$}={480 kHz, 960 kHz} are shown in TABLE 13B, and at least a subset from the table can be supported, wherein $BW_{max}$ can be either 162 or 156.

TABLE 13B

Example CORESET #0 configuration for {$SCS_{SSB}$, $SCS_{CORESET}$} = {480 kHz, 960 kHz}

| Index | Multi-plexing pattern | CORESET#0 BW (RB) | No. of symbols for CORESET #0 | RB-level offset (RB) |
|---|---|---|---|---|
| 0 | 2 | $BW_{max}$ | 1 | −16 if $k_{SSB}$ = 0, −15 if $k_{SSB}>0$ |
| 1 | 2 | $BW_{max}$ | 2 | −16 if $k_{SSB}$ = 0, −15 if $k_{SSB}>0$ |
| 2 | 2 | $BW_{max}$ | 1 | −11 if $k_{SSB}$ = 0, −12 if $k_{SSB}>0$ |
| 3 | 2 | $BW_{max}$ | 2 | −11 if $k_{SSB}$ = 0, −12 if $k_{SSB}>0$ |
| 4 | 2 | 96 | 1 | −11 if $k_{SSB}$ = 0, −12 if $k_{SSB}>0$ |
| 5 | 2 | 96 | 2 | −11 if $k_{SSB}$ = 0, −12 if $k_{SSB}>0$ |
| 6 | 2 | 48 | 1 | −11 if $k_{SSB}$ = 0, −12 if $k_{SSB}>0$ |
| 7 | 2 | 48 | 2 | −11 if $k_{SSB}$ = 0, −12 if $k_{SSB}>0$ |
| 8 | 2 | 24 | 1 | −11 if $k_{SSB}$ = 0, −12 if $k_{SSB}>0$ |
| 9 | 2 | 24 | 2 | −11 if $k_{SSB}$ = 0, −12 if $k_{SSB}>0$ |

Example configurations for Pattern 2 with {$SCS_{SSB}$, $SCS_{CORESET}$}={960 kHz, 480 kHz} are shown in TABLE 13C, and at least a subset from the table can be supported, wherein $BW_{max}$ can be either 264 or 270.

TABLE 13C

Example CORESET #0 configuration for {$SCS_{SSB}$, $SCS_{CORESET}$} = {960 kHz, 480 kHz}

| Index | Multi-plexing pattern | CORESET#0 BW (RB) | No. of symbols for CORESET #0 | RB-level offset (RB) |
|---|---|---|---|---|
| 0 | 2 | $BW_{max}$ | 1 | −77 if $k_{SSB}$ = 0, −76 if $k_{SSB}$ > 0 |
| 1 | 2 | $BW_{max}$ | 2 | −77 if $k_{SSB}$ = 0, −76 if $k_{SSB}$ > 0 |
| 2 | 2 | $BW_{max}$ | 1 | −41 if $k_{SSB}$ = 0, −42 if $k_{SSB}$ > 0 |
| 3 | 2 | $BW_{max}$ | 2 | −41 if $k_{SSB}$ = 0, −42 if $k_{SSB}$ > 0 |
| 4 | 2 | 192 | 1 | −41 if $k_{SSB}$ = 0, −42 if $k_{SSB}$ > 0 |
| 5 | 2 | 192 | 2 | −41 if $k_{SSB}$ = 0, −42 if $k_{SSB}$ > 0 |
| 6 | 2 | 96 | 1 | −41 if $k_{SSB}$ = 0, −42 if $k_{SSB}$ > 0 |
| 7 | 2 | 96 | 2 | −41 if $k_{SSB}$ = 0, −42 if $k_{SSB}$ > 0 |
| 8 | 2 | 48 | 1 | −41 if $k_{SSB}$ = 0, −42 if $k_{SSB}$ > 0 |
| 9 | 2 | 48 | 2 | −41 if $k_{SSB}$ = 0, −42 if $k_{SSB}$ > 0 |
| 10 | 2 | 24 | 1 | −41 if $k_{SSB}$ = 0, −42 if $k_{SSB}$ > 0 |
| 11 | 2 | 24 | 2 | −41 if $k_{SSB}$ = 0, −42 if $k_{SSB}$ > 0 |

Example configurations for Pattern 2 with {$SCS_{SSB}$, $SCS_{CORESET}$}={480 kHz, 480 kHz} are shown in TABLE 13D and at least a subset from the table can be supported, wherein $BW_{max}$ can be either 264 or 270.

TABLE 13D

Example CORESET #0 configuration for {$SCS_{SSB}$, $SCS_{CORESET}$} = {960 kHz, 480 kHz}

| Index | Multi-plexing pattern | CORESET#0 BW (RB) | No. of symbols for CORESET #0 | RB-level offset (RB) |
|---|---|---|---|---|
| 0 | 2 | $BW_{max}$ | 1 | −52 if $k_{SSB}$ = 0, −51 if $k_{SSB}$ > 0 |
| 1 | 2 | $BW_{max}$ | 2 | −52 if $k_{SSB}$ = 0, −51 if $k_{SSB}$ > 0 |
| 2 | 2 | $BW_{max}$ | 1 | −20 if $k_{SSB}$ = 0, −21 if $k_{SSB}$ > 0 |
| 3 | 2 | $BW_{max}$ | 2 | −20 if $k_{SSB}$ = 0, −21 if $k_{SSB}$ > 0 |
| 4 | 2 | 192 | 1 | −20 if $k_{SSB}$ = 0, −21 if $k_{SSB}$ > 0 |
| 5 | 2 | 192 | 2 | −20 if $k_{SSB}$ = 0, −21 if $k_{SSB}$ > 0 |
| 6 | 2 | 96 | 1 | −20 if $k_{SSB}$ = 0, −21 if $k_{SSB}$ > 0 |
| 7 | 2 | 96 | 2 | −20 if $k_{SSB}$ = 0, −21 if $k_{SSB}$ > 0 |
| 8 | 2 | 48 | 1 | −20 if $k_{SSB}$ = 0, −21 if $k_{SSB}$ > 0 |
| 9 | 2 | 48 | 2 | −20 if $k_{SSB}$ = 0, −21 if $k_{SSB}$ > 0 |
| 10 | 2 | 24 | 1 | −20 if $k_{SSB}$ = 0, −21 if $k_{SSB}$ > 0 |
| 11 | 2 | 24 | 2 | −20 if $k_{SSB}$ = 0, −21 if $k_{SSB}$ > 0 |

In one embodiment, Pattern 3 can be supported and configured as the multiplexing pattern between SS/PBCH block and CORESET #0, at least for some of the combinations of SCSs of SS/PBCH block and CORESET #0.

In one example, Pattern 3 can be configured at least for the case where the SCS of SS/PBCH block is not the same as the SCS of CORESET #0, e.g., the SCS of SS/PBCH block is half of the SCS of CORESET #0. An illustration of this example is shown in 1301 of FIG. 13.

Figure 13:
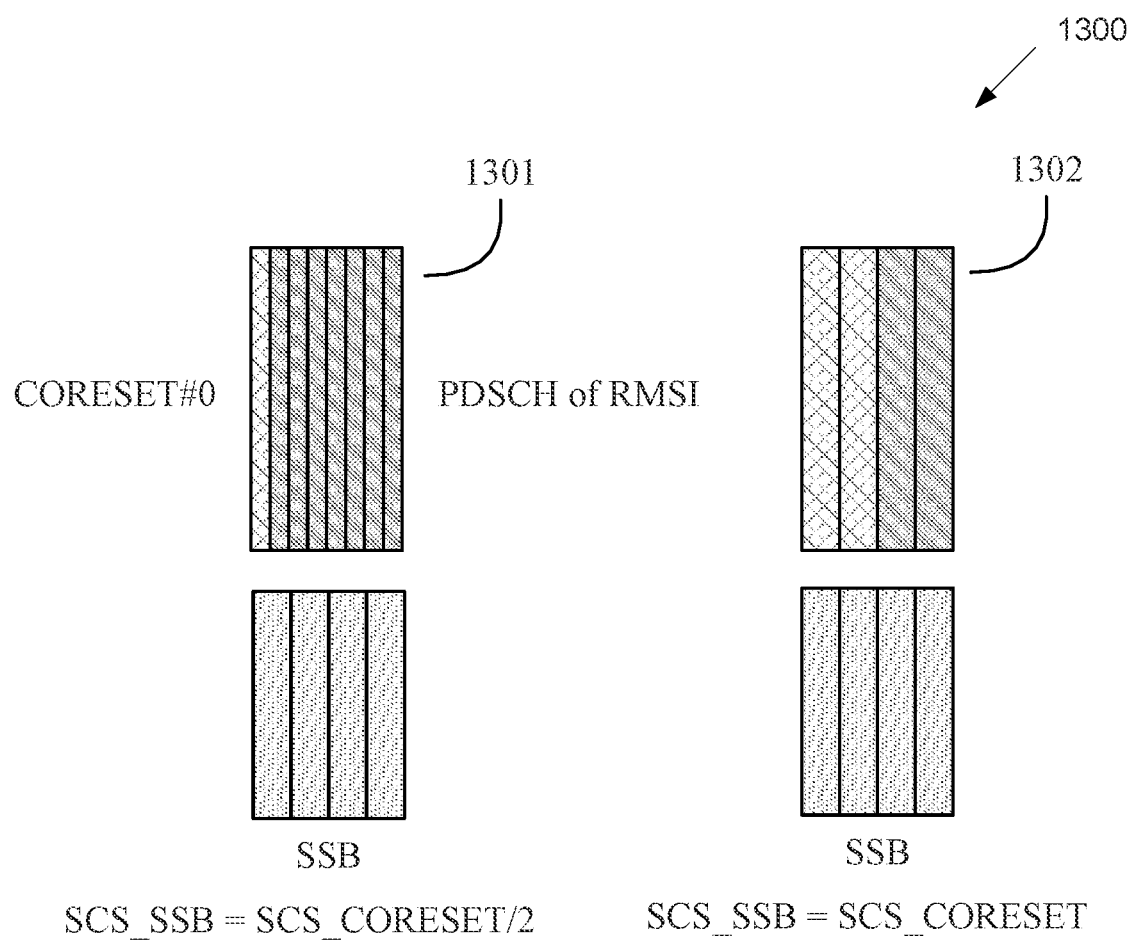
FIG. 13 illustrates an example pattern 3 according to embodiments of the present disclosure.

FIG. 13 illustrates an example pattern 3 1300 according to embodiments of the present disclosure. An embodiment of the pattern 3 1300 shown in FIG. 13 is for illustration only.

In another example, Pattern 3 can be configured at least for the case where the SCS of SS/PBCH block is the same as the SCS of CORESET #0. An illustration of this example is shown in 1302 of FIG. 13.

In one embodiment, the determination of the BW of CORESET #0 (e.g., $BW_{CORESET}$) can be similar to Pattern 2 in this disclosure, e.g., $BW_{CORESET}+BW_{SSB}+O_1+O_2+O_3=BW_{CH}$, and the RB offset from a smallest RB index of the CORESET for Type0-PDCCH CSS set to a smallest RB index of the common RB overlapping with a first RB of the SS/PBCH block can be determined as $-(BW_{SSB}+O_2)$, wherein the value of $BW_{SSB}$ and $O_2$ are both with respect to the SCS of CORESET #0. An example is shown in FIG. 12.

Example configurations for Pattern 3 with {$SCS_{SSB}$, $SCS_{CORESET}$}={960 kHz, 960 kHz} are shown in TABLE 14A, and at least a subset from the table can be supported, wherein $BW_{max}$ can be either 150 or 144.

TABLE 14A

Example CORESET #0 configuration for {$SCS_{SSB}$, $SCS_{CORESET}$} = {960 kHz, 960 kHz}

| Index | Multi-plexing pattern | CORESET#0 BW (RB) | No. of symbols for CORESET #0 | RB-level offset (RB) |
|---|---|---|---|---|
| 0 | 3 | $BW_{max}$ | 1 | −26 if $k_{SSB}$ = 0, −25 if $k_{SSB}$ > 0 |
| 1 | 3 | $BW_{max}$ | 2 | −26 if $k_{SSB}$ = 0, −25 if $k_{SSB}$ > 0 |
| 2 | 3 | $BW_{max}$ | 1 | −20 if $k_{SSB}$ = 0, −21 if $k_{SSB}$ > 0 |
| 3 | 3 | $BW_{max}$ | 2 | −20 if $k_{SSB}$ = 0, −21 if $k_{SSB}$ > 0 |
| 4 | 3 | 96 | 1 | −20 if $k_{SSB}$ = 0, −21 if $k_{SSB}$ > 0 |
| 5 | 3 | 96 | 2 | −20 if $k_{SSB}$ = 0, −21 if $k_{SSB}$ > 0 |
| 6 | 3 | 48 | 1 | −20 if $k_{SSB}$ = 0, −21 if $k_{SSB}$ > 0 |
| 7 | 3 | 48 | 2 | −20 if $k_{SSB}$ = 0, −21 if $k_{SSB}$ > 0 |
| 8 | 3 | 24 | 1 | −20 if $k_{SSB}$ = 0, −21 if $k_{SSB}$ > 0 |
| 9 | 3 | 24 | 2 | −20 if $k_{SSB}$ = 0, −21 if $k_{SSB}$ > 0 |

Example configurations for Pattern 3 with {$SCS_{SSB}$, $SCS_{CORESET}$}={480 kHz, 960 kHz} are shown in TABLE 14B, and at least a subset from the table can be supported, wherein $BW_{max}$ can be either 162 or 156.

TABLE 14B

Example CORESET #0 configuration for {$SCS_{SSB}$, $SCS_{CORESET}$} = {480 kHz, 960 kHz}

| Index | Multi-plexing pattern | CORESET#0 BW (RB) | No. of symbols for CORESET #0 | RB-level offset (RB) |
|---|---|---|---|---|
| 0 | 3 | $BW_{max}$ | 1 | −16 if $k_{SSB}$ = 0, −15 if $k_{SSB}$ > 0 |
| 1 | 3 | $BW_{max}$ | 2 | −16 if $k_{SSB}$ = 0, −15 if $k_{SSB}$ > 0 |
| 2 | 3 | $BW_{max}$ | 1 | −11 if $k_{SSB}$ = 0, −12 if $k_{SSB}$ > 0 |

TABLE 14B-continued

Example CORESET #0 configuration for {$SCS_{SSB}$, $SCS_{CORESET}$} = {480 kHz, 960 kHz}

| Index | Multi-plexing pattern | CORESET#0 BW (RB) | No. of symbols for CORESET #0 | RB-level offset (RB) |
|---|---|---|---|---|
| 3 | 3 | $BW_{max}$ | 2 | −11 if $k_{SSB}$ = 0, −12 if $k_{SSB}$ > 0 |
| 4 | 3 | 96 | 1 | −11 if $k_{SSB}$ = 0, −12 if $k_{SSB}$ > 0 |
| 5 | 3 | 96 | 2 | −11 if $k_{SSB}$ = 0, −12 if $k_{SSB}$ > 0 |
| 6 | 3 | 48 | 1 | −11 if $k_{SSB}$ = 0, −12 if $k_{SSB}$ > 0 |
| 7 | 3 | 48 | 2 | −11 if $k_{SSB}$ = 0, −12 if $k_{SSB}$ > 0 |
| 8 | 3 | 24 | 1 | −11 if $k_{SSB}$ = 0, −12 if $k_{SSB}$ > 0 |
| 9 | 3 | 24 | 2 | −11 if $k_{SSB}$ = 0, −12 if $k_{SSB}$ > 0 |

Example configurations for Pattern 2 with {$SCS_{SSB}$, $SCS_{CORESET}$}={960 kHz, 480 kHz} are shown in TABLE 14C, and at least a subset from the table can be supported, wherein $BW_{max}$ can be either 264 or 270.

TABLE 14C

Example CORESET #0 configuration for {$SCS_{SSB}$, $SCS_{CORESET}$} = {960 kHz, 480 kHz}

| Index | Multi-plexing pattern | CORESET#0 BW (RB) | No. of symbols for CORESET #0 | RB-level offset (RB) |
|---|---|---|---|---|
| 0 | 3 | $BW_{max}$ | 1 | −77 if $k_{SSB}$ = 0, −76 if $k_{SSB}$ > 0 |
| 1 | 3 | $BW_{max}$ | 2 | −77 if $k_{SSB}$ = 0, −76 if $k_{SSB}$ > 0 |
| 2 | 3 | $BW_{max}$ | 1 | −41 if $k_{SSB}$ = 0, −42 if $k_{SSB}$ > 0 |
| 3 | 3 | $BW_{max}$ | 2 | −41 if $k_{SSB}$ = 0, −42 if $k_{SSB}$ > 0 |
| 4 | 3 | 192 | 1 | −41 if $k_{SSB}$ = 0, −42 if $k_{SSB}$ > 0 |
| 5 | 3 | 192 | 2 | −41 if $k_{SSB}$ = 0, −42 if $k_{SSB}$ > 0 |
| 6 | 3 | 96 | 1 | −41 if $k_{SSB}$ = 0, −42 if $k_{SSB}$ > 0 |
| 7 | 3 | 96 | 2 | −41 if $k_{SSB}$ = 0, −42 if $k_{SSB}$ > 0 |
| 8 | 3 | 48 | 1 | −41 if $k_{SSB}$ = 0, −42 if $k_{SSB}$ > 0 |
| 9 | 3 | 48 | 2 | −41 if $k_{SSB}$ = 0, −42 if $k_{SSB}$ > 0 |
| 10 | 3 | 24 | 1 | −41 if $k_{SSB}$ = 0, −42 if $k_{SSB}$ > 0 |
| 11 | 3 | 24 | 2 | −41 if $k_{SSB}$ = 0, −42 if $k_{SSB}$ > 0 |

Example configurations for Pattern 3 with {$SCS_{SSB}$, $SCS_{CORESET}$}={480 kHz, 480 kHz} are shown in TABLE 14D and at least a subset from the table can be supported, wherein $BW_{max}$ can be either 264 or 270.

TABLE 14D

4 Example CORESET #0 configuration for {$SCS_{SSB}$, $SCS_{CORESET}$} = {480 kHz, 480 kHz}

| Index | Multi-plexing pattern | CORESET#0 BW (RB) | No. of symbols for CORESET #0 | RB-level offset (RB) |
|---|---|---|---|---|
| 0 | 3 | $BW_{max}$ | 1 | −52 if $k_{SSB}$ = 0, −51 if $k_{SSB}$ > 0 |
| 1 | 3 | $BW_{max}$ | 2 | −52 if $k_{SSB}$ = 0, −51 if $k_{SSB}$ > 0 |
| 2 | 3 | $BW_{max}$ | 1 | −20 if $k_{SSB}$ = 0, −21 if $k_{SSB}$ > 0 |
| 3 | 3 | $BW_{max}$ | 2 | −20 if $k_{SSB}$ = 0, −21 if $k_{SSB}$ > 0 |
| 4 | 3 | 192 | 1 | −20 if $k_{SSB}$ = 0, −21 if $k_{SSB}$ > 0 |
| 5 | 3 | 192 | 2 | −20 if $k_{SSB}$ = 0, −21 if $k_{SSB}$ > 0 |
| 6 | 3 | 96 | 1 | −20 if $k_{SSB}$ = 0, −21 if $k_{SSB}$ > 0 |
| 7 | 3 | 96 | 2 | −20 if $k_{SSB}$ = 0, −21 if $k_{SSB}$ > 0 |
| 8 | 3 | 48 | 1 | −20 if $k_{SSB}$ = 0, −21 if $k_{SSB}$ > 0 |
| 9 | 3 | 48 | 2 | −20 if $k_{SSB}$ = 0, −21 if $k_{SSB}$ > 0 |
| 10 | 3 | 24 | 1 | −20 if $k_{SSB}$ = 0, −21 if $k_{SSB}$ > 0 |
| 11 | 3 | 24 | 2 | −20 if $k_{SSB}$ = 0, −21 if $k_{SSB}$ > 0 |

The present disclosure focuses on an initial access in carrier aggregation scenario. In particular, the embodiments of this disclosure are at least applicable to operation with shared spectrum channel access. The present disclosure includes channelization of carriers, common resource grid, synchronization raster design, and cross-carrier CORESET #0 design.

For a new carrier frequency range between 52.6 GHz and 71 GHz, there is a need to support a large operating bandwidth, e.g., as large as at least 2.16 GHz, to coexist with Wi-Fi operating on the same carrier frequency range. In one example, the large bandwidth can be achieved by carrier aggregation from multiple carriers with smaller carrier bandwidth (e.g., 400 MHz). This disclosure specifies the details of design examples regarding the initial access procedure using carrier aggregation. An illustration of using carrier aggregation to achieve large operating bandwidth is shown in FIG. 14.

Figure 14:
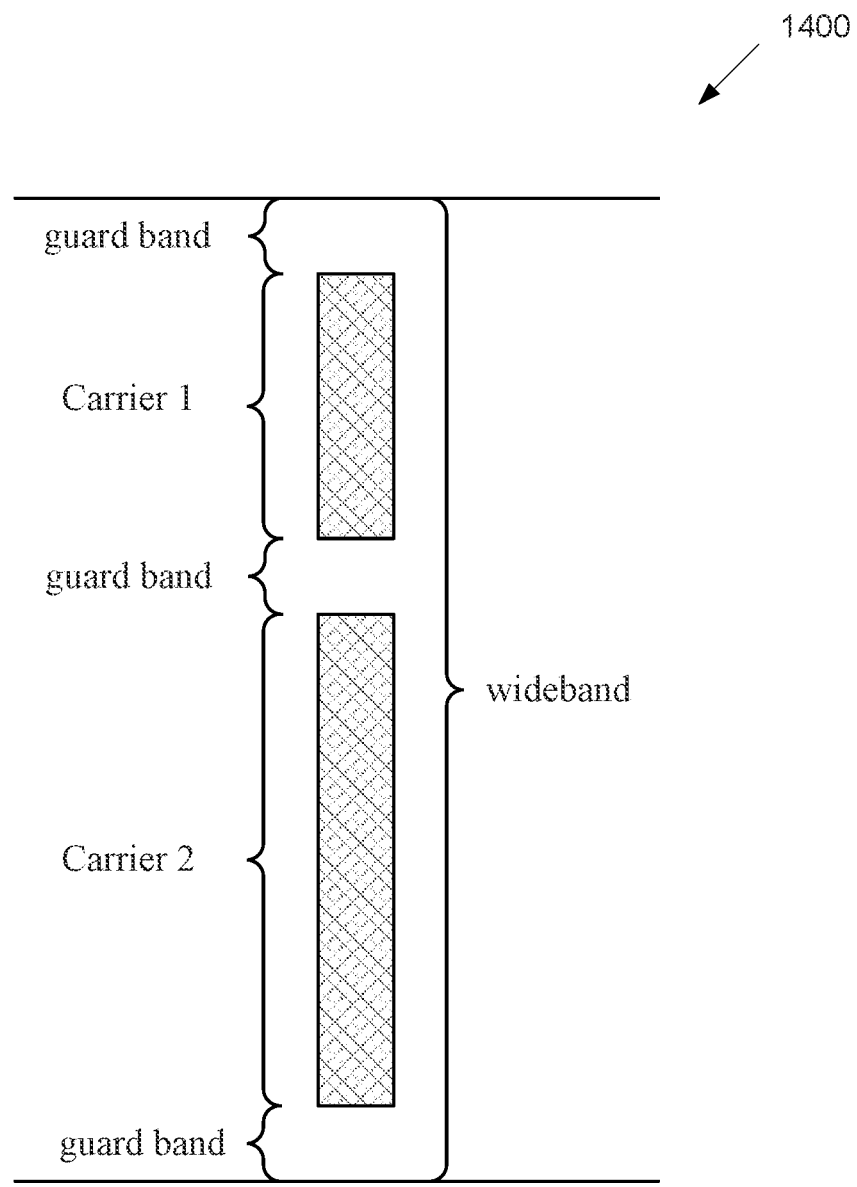
FIG. 14 illustrates an example carrier aggregation to achieve large bandwidth according to embodiments of the present disclosure.

FIG. 14 illustrates an example carrier aggregation 1400 to achieve large bandwidth according to embodiments of the present disclosure. An embodiment of the carrier aggregation 1400 shown in FIG. 14 is for illustration only.

In this disclosure, CORESET #0 refers to the control resource set (CORESET) of the Type0-PDCCH common search space set.

In one embodiment, a wideband (e.g., with a bandwidth of 2.16 GHz or more) can be operated with carrier aggregation from a set of narrow carriers (e.g., each narrow carrier with a bandwidth smaller than 2.16 GHz).

Figure 15:
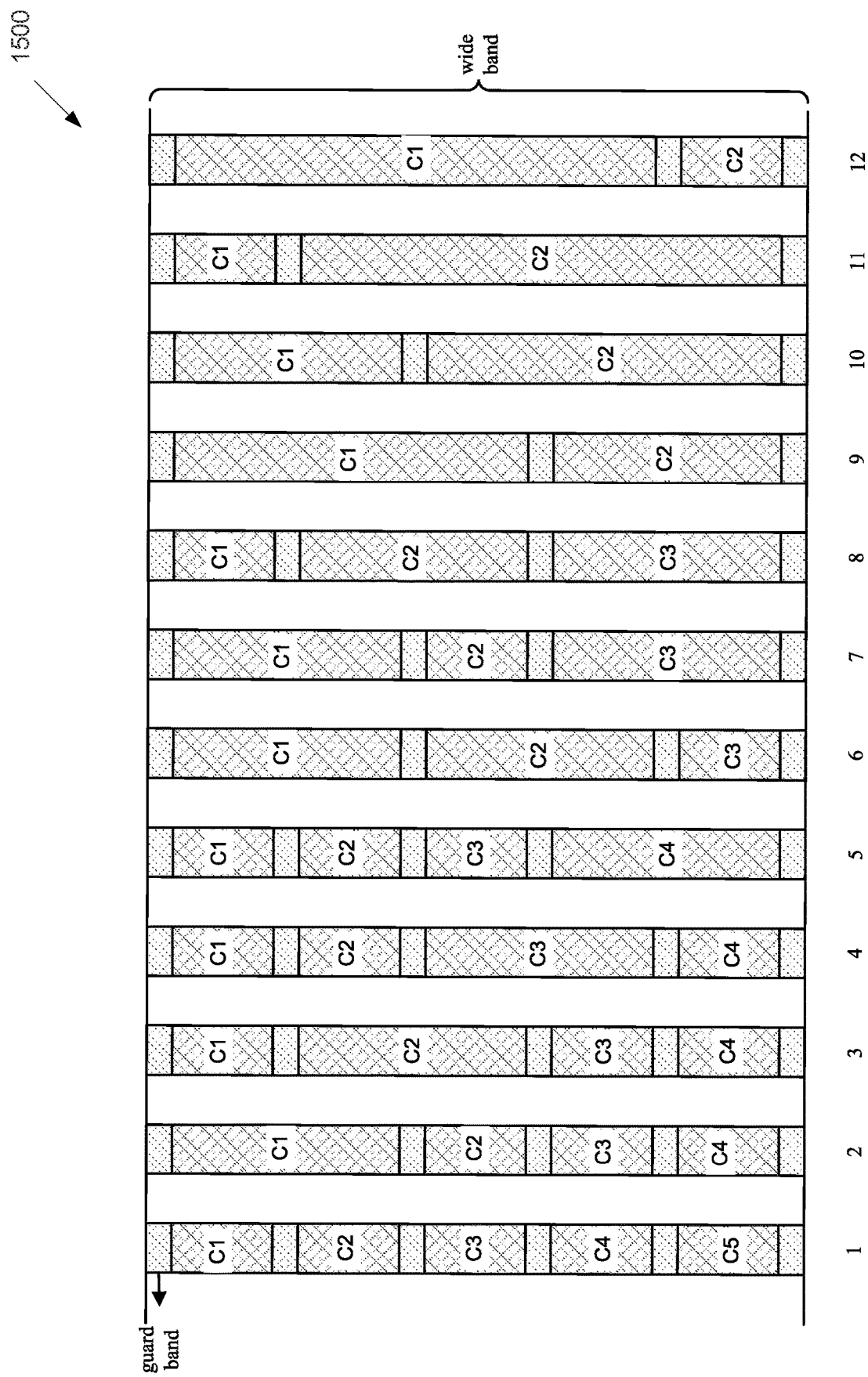
FIG. 15 illustrates an example set of narrow carriers to construct wideband using carrier aggregation according to embodiments of the present disclosure.

In one example, the set of narrow carriers can include at least one example from TABLE 15, and illustration of the examples is shown in FIG. 15. In one example, a narrow carrier with a given bandwidth is associated with a minimum subcarrier spacing. For one example, 400 MHz bandwidth is associated with a minimum subcarrier spacing of 120 kHz; for another example, 800 MHz bandwidth is associated with a minimum subcarrier spacing of 240 kHz; for yet another example, 1200 MHz or 1600 kHz is associated with a minimum subcarrier spacing of 480 kHz.

FIG. 15 illustrates an example set of narrow carriers 1500 to construct wideband using carrier aggregation according to embodiments of the present disclosure. An embodiment of the set of narrow carriers 1500 shown in FIG. 15 is for illustration only.

TABLE 15

Examples of the set of narrow carriers to construct wideband using carrier aggregation.

| Example # | Bandwidth of the set of narrow carriers (MHz) |
|---|---|
| 1 | {400, 400, 400, 400, 400} |
| 2 | {800, 400, 400, 400} |
| 3 | {400, 800, 400, 400} |
| 4 | {400, 400, 800, 400} |
| 5 | {400, 400, 400, 800} |
| 6 | {800, 800, 400} |
| 7 | {800, 400, 800} |
| 8 | {400, 800, 800} |
| 9 | {1200, 800} |
| 10 | {800, 1200} |
| 11 | {400, 1600} |
| 12 | {1600, 400} |

In one example, for a targeted wideband, the set of narrow carriers to construct the wideband using carrier aggregation can utilize a fixed channelization, in the sense that the center of the narrow carriers is fixed. For instance, each of the narrow carriers constructing the wideband in an example of TABLE 15 has a fixed carrier center specified.

In one example, the fixed channelization is applicable to operation with shared spectrum channel access.

In another embodiment, for a targeted wideband, the set of narrow carriers to construct the wideband using carrier aggregation can be configurable, and location of the narrow carriers are indicated to the UE.

In one example, the fixed channelization is applicable to operation without shared spectrum channel access.

In one example, the set of narrow carriers are using the same subcarrier spacing and same common resource grid. For example, the common resource grids of the set of narrow carriers are determined from the same Point A.

In one example, the guard bands for the set of narrow carriers are integer number of RBs in term of the SCS of the common resource grid. For one example, if the channelization of the set of narrow carriers is fixed, the guard bands for the set of narrow carriers are also fixed integer number of RBs. For another example, if the channelization of the set of narrow carriers is configured, the guard bands for the set of narrow carriers are also configurable as an integer number of RBs.

In one example, for operation with shared spectrum channel access, each carrier of the set of narrow bands has a single synchronization raster point.

In one example, the single synchronization raster point corresponds to a global synchronization channel number (GSCN).

In another example, for operation without shared spectrum channel access, each carrier of the set of narrow bands has at least one synchronization raster point.

In one example, the at least one synchronization raster point corresponds to GSCN(s).

In one example, the set of synchronization raster points for operation with shared spectrum channel access (e.g., unlicensed operation) is a subset of the set of synchronization raster points for operation without shared spectrum channel access (e.g., licensed operation).

Figure 16:
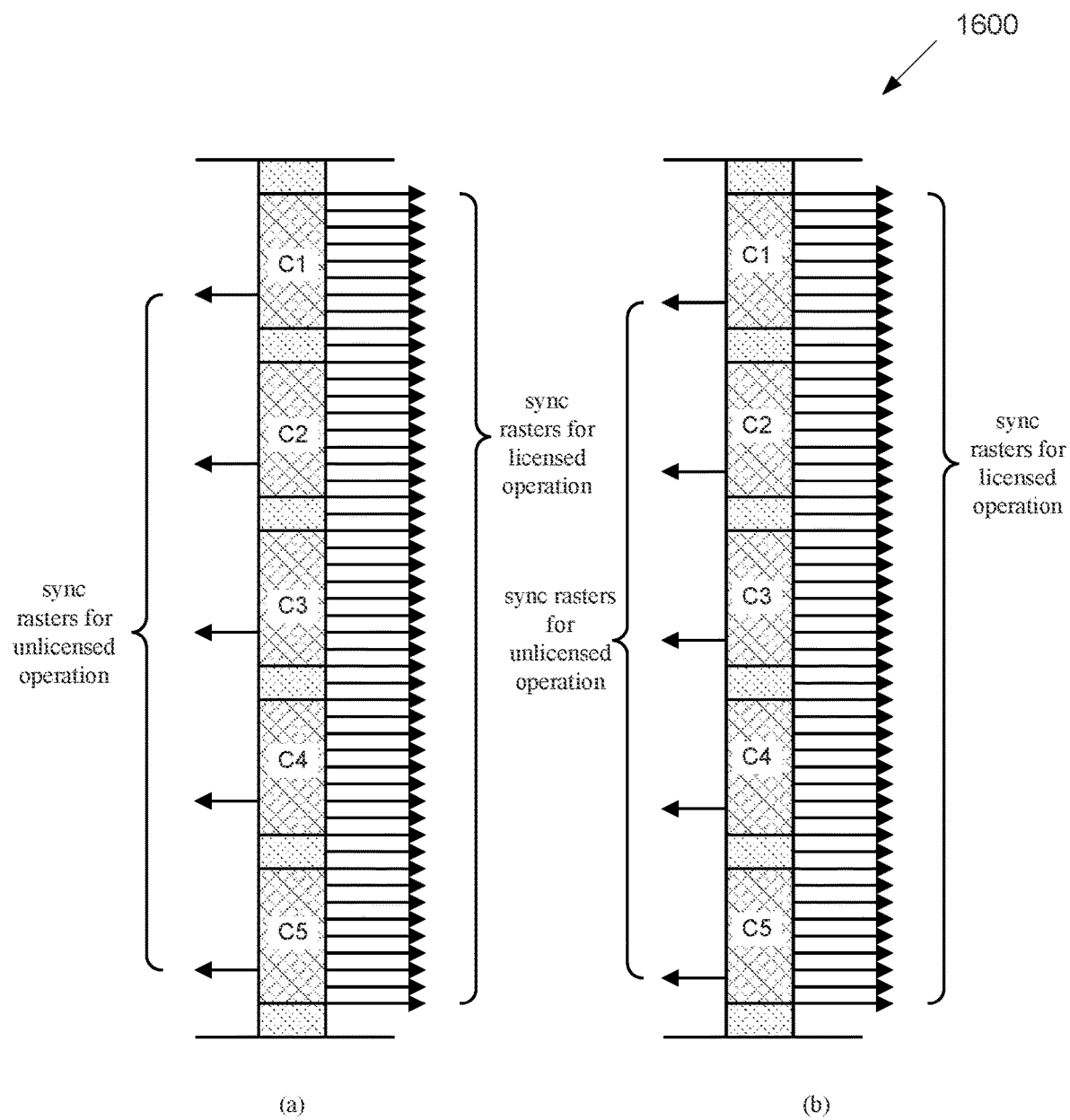
FIG. 16 illustrates an example synchronization raster design for unlicensed and licensed operations according to embodiments of the present disclosure.

An illustration of this example is shown in FIG. 16 (e.g., as illustrated in (a)). For this example, the total number of synchronization raster points for the wideband can be smaller, and a UE doesn't need to rely on the location of the synchronization raster points to distinguish licensed or unlicensed operations. If a UE detects a SS/PBCH block located on the synchronization raster point for both licensed and unlicensed operations, the UE can distinguish the SS/PBCH block is with licensed or unlicensed operations based on other indication.

FIG. 16 illustrates an example synchronization raster design 1600 for unlicensed and licensed operations according to embodiments of the present disclosure. An embodiment of the synchronization raster design 1600 shown in FIG. 16 is for illustration only.

In another example, the set of synchronization raster points for operation with shared spectrum channel access (e.g., unlicensed operation) does not overlap with the set of synchronization raster points for operation without shared spectrum channel access (e.g., licensed operation). The GSCN values corresponding to the set of synchronization raster points for operation with shared spectrum channel access are different from the GSCN values corresponding to the set of synchronization raster points for operation without shared spectrum channel access.

An illustration of this example is shown in FIG. 16 (e.g., as illustrated in (b)). For this example, the UE can distinguish the detected SS/PBCH is with licensed or unlicensed operation based on the synchronization raster value.

In one example, when a set of narrow carriers construct a wideband using carrier aggregation, and a SS/PBCH block is detected in one of the narrow carriers within the set of narrow carriers, the associated CORESET #0 of the SS/PBCH block can be configured to locate in another narrow carrier within the set of narrow carriers. For example, within the set of configurations for CORESET #0 by MIB, there is at least one configuration corresponding to a cross-carrier CORESET #0.

In one example, the initial DL BWP is not located within the same carrier as the detected SSB, wherein the BW of the initial DL BWP is same as the BW of CORESET #0.

In another example, the cross-carrier CORESET #0 is only applicable to the multiplexing pattern of CORESET #0 and SS/PBCH block as Pattern 2 or Pattern 3.

In yet another example, the offset from a smallest RB index of the CORESET for Type0-PDCCH CSS set (e.g., CORESET #0) to a smallest RB index of the common RB overlapping with a first RB of the detected SS/PBCH block can be indicated by MIB of the detected SS/PBCH block. An illustration of this example is shown in FIG. 17A and FIG. 17B.

Figure 17A:
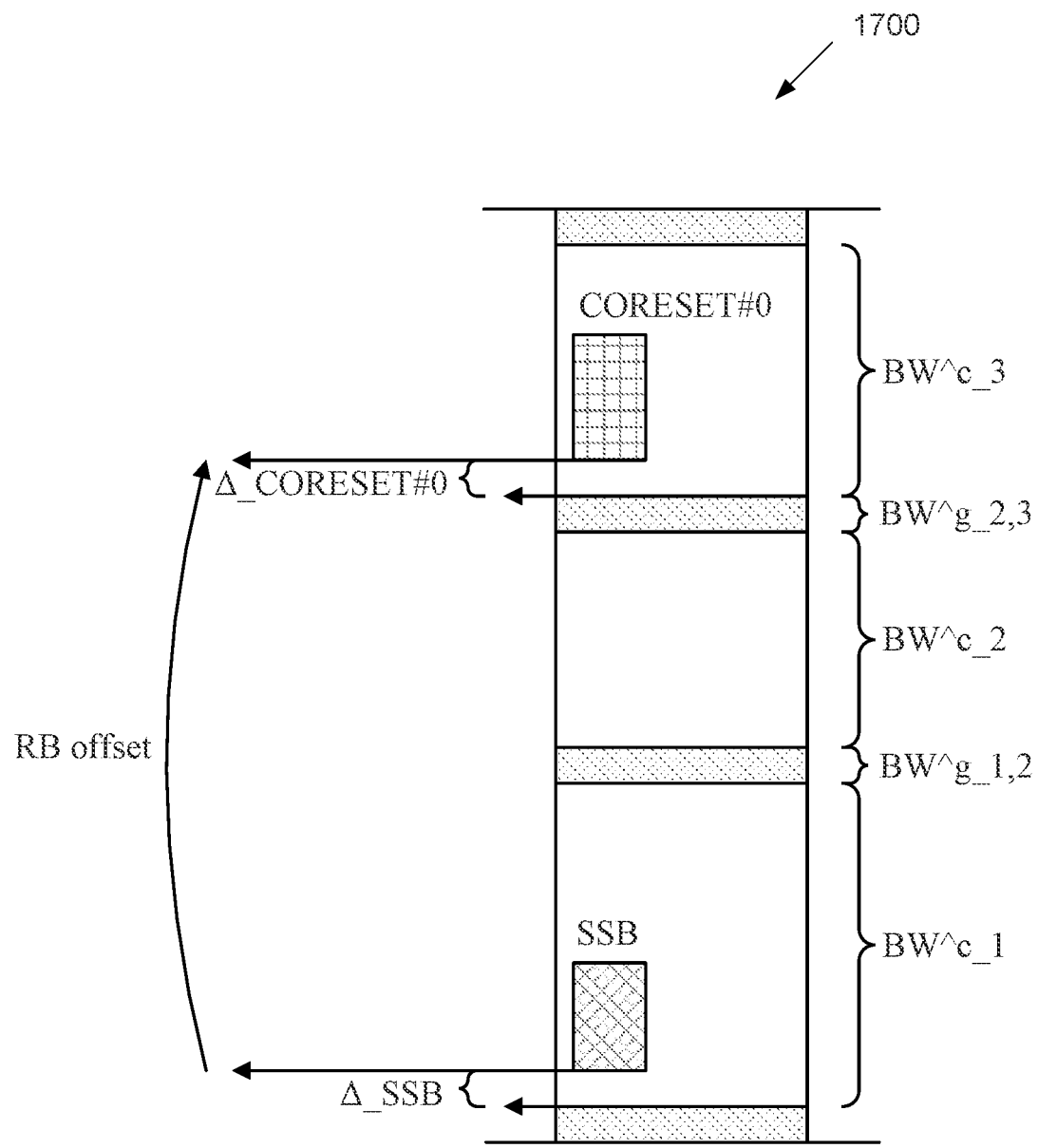
FIG. 17A illustrates an example cross-carrier indication for CORESET #0 according to embodiments of the present disclosure.

FIG. 17A illustrates an example cross-carrier indication 1700 for CORESET #0 according to embodiments of the present disclosure. An embodiment of the cross-carrier indication 1700 shown in FIG. 17A is for illustration only.

Figure 17B:
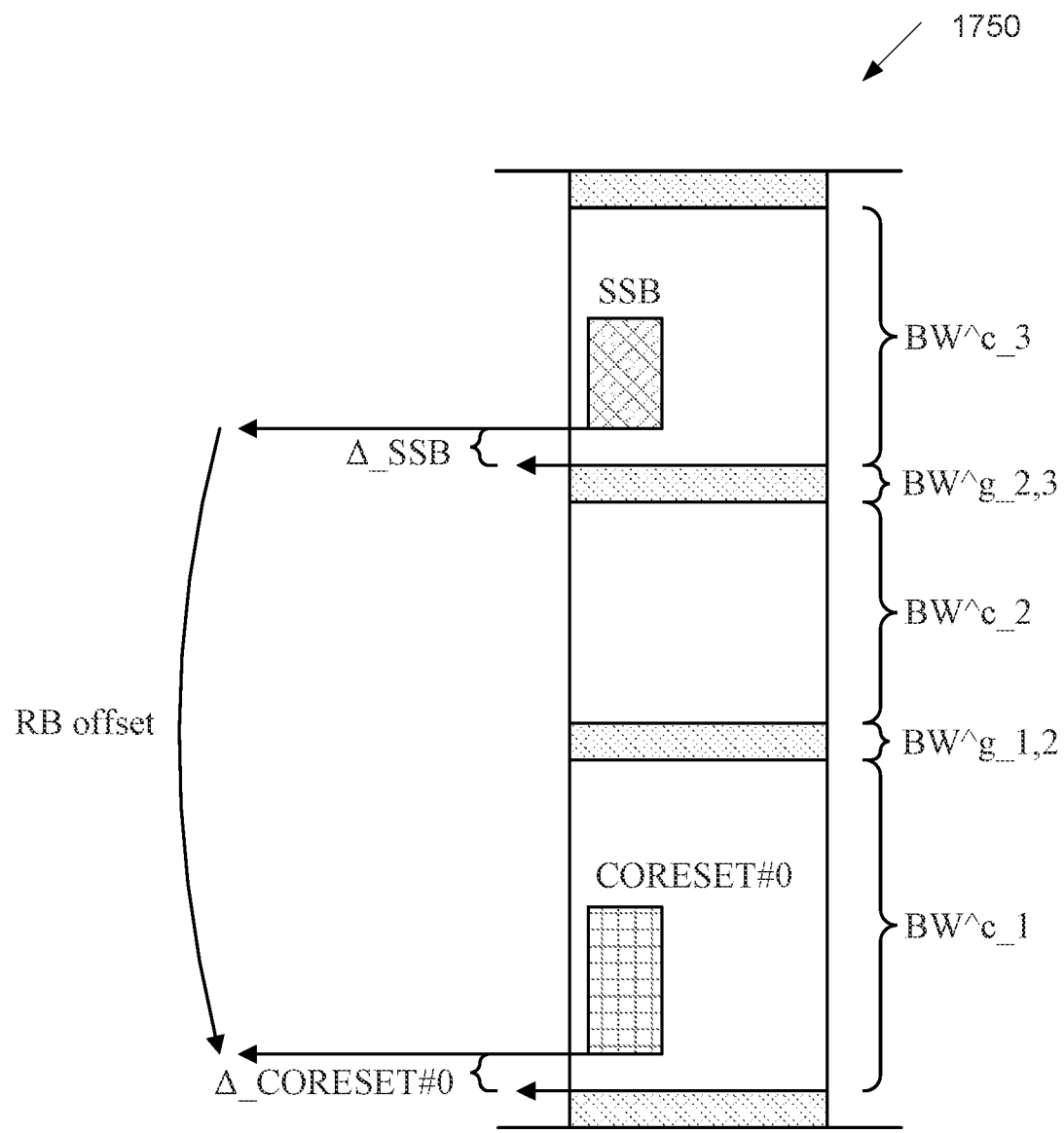
FIG. 17B illustrates another example cross-carrier indication for CORESET #0 according to embodiments of the present disclosure.

FIG. 17B illustrates another example cross-carrier indication 1750 for CORESET #0 according to embodiments of the present disclosure. An embodiment of the cross-carrier indication 1750 shown in FIG. 17B is for illustration only.

In one example, if the set of narrow carriers have the same common resource grid, the quantity $k_{SSB}$ is the subcarrier offset from subcarrier 0 in common resource block $N_{CRB}^{SSB}$ to subcarrier 0 of the SS/PBCH block, wherein the center of subcarrier 0 of resource block $N_{CRB}^{SSB}$ coincides with the center of subcarrier 0 of a common resource block.

In another example, if there is no requirement on the alignment of common resource grid, the quantity $k_{SSB}$ is the subcarrier offset from subcarrier 0 in common resource block $N_{CRB}^{SSB}$ to subcarrier 0 of the SS/PBCH block, wherein the center of subcarrier 0 of resource block $N_{CRB}^{SSB}$ coincides with the center of subcarrier 0 of a common resource block for the carrier containing CORESET #0.

In one example, as shown in FIG. 17A, CORESET #0 locates in a carrier with higher frequency than the carrier containing the detected SS/PBCH block. Denote the carriers in the lower to higher frequency indexed from 1 to n (e.g., n=3 in FIG. 17A), and the detected SS/PBCH block locates in carrier with index 1, while CORESET #0 locates in carrier with index n (e.g., n>1), then the frequency offset from a smallest RB index of the CORESET #0 to a smallest RB index of the common RB overlapping with a first RB of the detected SS/PBCH block can be given by Equation 1.

$$\Delta_{SSB-CORESET\,\#0} = \Sigma_{i=1}^{n-1}(BW_i^c + BW_{i,i+1}^g) + \Delta_{CORESET\,\#0} - \Delta_{SSB} \quad \text{equation 1}$$

In Equation 1, $BW_i^c$ is the bandwidth of carrier with index i in the unit of RB with respect to the SCS of CORESET #0, $BW_{i,i+1}^g$ is the bandwidth of guard bandwidth between neighboring carriers with indexes i and i+1 in the unit of RB with respect to the SCS of CORESET #0, $\Delta_{CORESET\,\#0}$ is the offset from the smallest RB index of the CORESET #0 to the smallest RB index of the carrier (e.g., carrier with index n) containing CORESET #0, and $\Delta_{SSB}$ is the offset from the smallest RB index of the common RB overlapping with a first RB of the detected SS/PBCH block to the smallest RB index of the carrier (e.g., carrier with index 1) containing SS/PBCH block.

In another example, as shown in FIG. 17B, CORESET #0 locates in a carrier with lower frequency than the carrier containing the detected SS/PBCH block. Denote the carriers in the lower to higher frequency indexed from 1 to n (e.g., n=3 in FIG. 17B), and the detected SS/PBCH block locates in carrier with index n (e.g., n>1), while CORESET #0 locates in carrier with index 1, then the frequency offset from a smallest RB index of the CORESET #0 to a smallest RB index of the common RB overlapping with a first RB of the detected SS/PBCH block can be given by Equation 2.

$$\Delta_{SSB-CORESET\,\#0} = -\Sigma_{i=1}^{n-1}(BW_i^c + BW_{i,i+1}^g) + \Delta_{CORESET\,\#0} - \Delta_{SSB} \quad \text{equation 2}$$

In Equation 2, $BW_i^c$ is the bandwidth of carrier with index i in the unit of RB with respect to the SCS of CORESET #0, $BW_{i,i+1}^g$ is the bandwidth of guard bandwidth between neighboring carriers with indexes i and i+1 in the unit of RB with respect to the SCS of CORESET #0, $\Delta_{CORESET\,\#0}$ is the offset from the smallest RB index of the CORESET #0 to the smallest RB index of the carrier (e.g., carrier with index 1) containing CORESET #0, and $\Delta_{SSB}$ is the offset from the smallest RB index of the common RB overlapping with a first RB of the detected SS/PBCH block to the smallest RB index of the carrier (e.g., carrier with index n) containing SS/PBCH block.

In one example, $\Delta_{SSB}$ can be determined as 0.

In one example, $\Delta_{CORESET\,\#0}$ can be determined as 0.

In one example, when the channelization of the set of narrow carriers is fixed, and the location of a CORESET #0 within a carrier is also fixed (e.g., $\Delta_{CORESET\,\#0}$ is fixed and known to the UE), the UE can derive the offset $\Delta_{SSB-CORESET\,\#0}$ according to Equation 1 or Equation 2 and there is no need for an explicit indication of the offset value.

In another example, when the channelization of the set of narrow carriers is fixed, the UE can be provided with an index of the carrier for CORESET #0, and the UE can derive the offset $\Delta_{SSB-CORESET\,\#0}$ according to Equation 1 or Equation 2 and there is no need for an explicit indication of the offset value. For one sub-example, Equation 1 or Equation 2 can be simplified as Equation 3, wherein $\Delta_1$ is the number of RB for the carrier with smallest bandwidth within the set of narrow carriers together with the guard band (e.g., $\Delta_1 = BW_i^c + BW_{i,i+1}^g$), $\Delta_2 = \Delta_{CORESET\,\#0} - \Delta_{SSB}$, and the index k is provided by the gNB and indicated to the UE (e.g., by PBCH payload). k can be either positive or negative, corresponding to Equation 1 or Equation 2 respectively.

$$\Delta_{SSB-CORESET\,\#0} = k \cdot \Delta_1 + \Delta_2 \quad \text{equation 3}$$

In yet another example, the UE is configured with an offset value explicitly by MIB, wherein the offset value can be jointly coded with other parameters for CORESET #0, e.g., multiplexing pattern with SS/PBCH block, number of symbols for CORESET #0, and/or bandwidth of CORESET #0. For instance, at least one example from TABLE 16, where $\Delta_1$ is the number of RB for the carrier with smallest bandwidth within the set of narrow carriers together with the guard band (e.g., $\Delta_1 = BW_i^c + BW_{i,i+1}^g$), and $\Delta_2 = \Delta_{CORESET\,\#0} - \Delta_{SSB}$.

TABLE 16

Example of cross-carrier CORESET#0 configuration provided by MIB.

| Index | Multi-plexing pattern | CORESET#0 BW (RB) | No. of symbols for CORESET #0 | RB offset $\Delta_{SSB-CORESET\#0}$ (RB) |
| --- | --- | --- | --- | --- |
| 0 | 2 or 3 | 24 or 48 or 96 | 1 or 2 | $\Delta_1 + \Delta_2$ |
| 1 | 2 or 3 | 24 or 48 or 96 | 1 or 2 | $2\Delta_1 + \Delta_2$ |
| 2 | 2 or 3 | 24 or 48 or 96 | 1 or 2 | $3\Delta_1 + \Delta_2$ |
| 3 | 2 or 3 | 24 or 48 or 96 | 1 or 2 | $4\Delta_1 + \Delta_2$ |
| 4 | 2 or 3 | 24 or 48 or 96 | 1 or 2 | $-\Delta_1 + \Delta_2$ |
| 5 | 2 or 3 | 24 or 48 or 96 | 1 or 2 | $-2\Delta_1 + \Delta_2$ |
| 6 | 2 or 3 | 24 or 48 or 96 | 1 or 2 | $-3\Delta_1 + \Delta_2$ |
| 7 | 2 or 3 | 24 or 48 or 96 | 1 or 2 | $-4\Delta_1 + \Delta_2$ |

In yet another example, the UE is configured with an offset provided by MIB of the detected SS/PBCH block, and the UE is further provided with information of the carrier containing the CORESET #0 (e.g., by PBCH payload), then the UE can derive the frequency offset from a smallest RB index of the CORESET #0 to a smallest RB index of the common RB overlapping with a first RB of the detected SS/PBCH block by own calculation based on the indicated offset from MIB and information of the carrier containing CORESET #0 (no need for explicit indication of the offset value). In this example, Equation 4 can be used, as a simplification of Equation 1 or Equation 2, wherein $\Delta_3$ is the offset provided by MIB, $\Delta_1$ is the number of RB for the carrier with smallest bandwidth within the set of narrow carriers together with the guard band (e.g., $\Delta_1 = BW_i^c + BW_{i,i+1}^g$), and k is the carrier index difference. k can be either positive or negative, corresponding to Equation 1 or Equation 2 respectively.

$$\Delta_{SSB-CORESET\,\#0} = k \cdot \Delta_1 + \Delta_3 \quad \text{equation 4}$$

In one example, $\Delta_1=284$ when the SCS of type0-PDCCH within CORESET #0 is 120 kHz, $\Delta_1=142$ when the SCS of type0-PDCCH within CORESET #0 is 240 kHz, $\Delta_1=71$ or 72 when the SCS of type0-PDCCH within CORESET #0 is 480 kHz.

In another example of above examples, $\Delta_2=0$.

In yet another example, $\Delta_2=0$ if the SCS of SS/PBCH block is the same as the SCS of type0-PDCCH within CORESET #0, and $\Delta_2=-10 \cdot SCS_{SSB}/SCS_{CORESET\,\#0}$, wherein $SCS_{SSB}$ is the SCS of SS/PBCH block, and $SCS_{CORESET\ \#0}$ is the SCS of the SCS of type0-PDCCH within CORESET #0.

In yet another example, k is directly indicated (e.g., by PBCH payload) as one value from k∈{−3, −2,−1, 0, 1, 2, 3}.

In yet another example of above examples, UE is provided with an index of the carrier containing CORESET #0 and determines the carrier index difference between the carrier containing CORESET #0 and the carrier containing the detected SS/PBCH block, e.g., to determine the value of k such that k∈{−3, −2, −1, 0, 1, 2, 3}.

Figure 18:
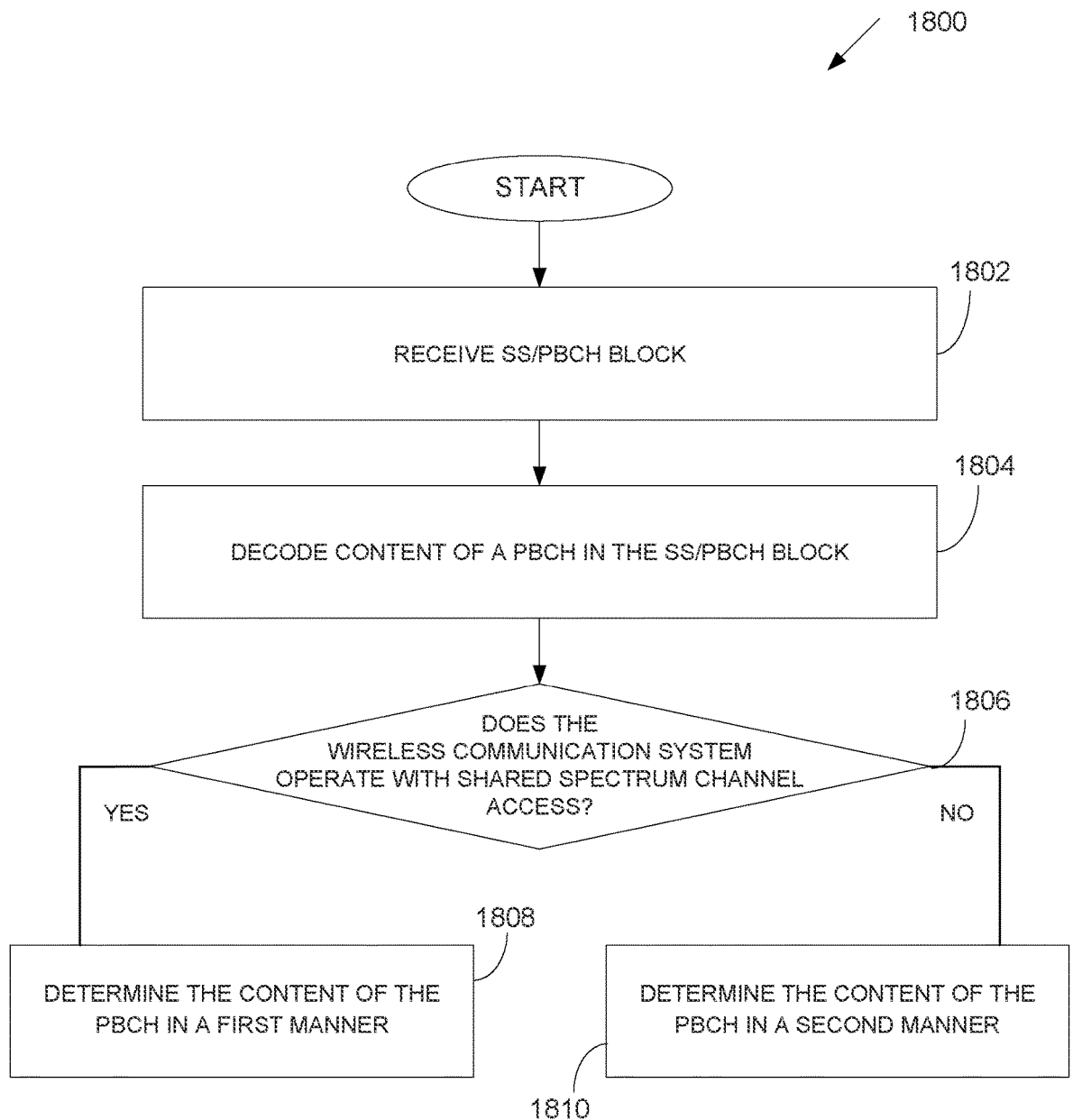
FIG. 18 illustrates a flow chart of a method for determining PBCH content according to embodiments of the present disclosure.

FIG. 18 illustrates a flow chart of a method 1800 for determining PBCH content according to embodiments of the present disclosure, as may be performed by UE (e.g., as 111-116 as illustrated in FIG. 1). A corresponding and complementary process may be performed by a BS, such as BS 102 in FIG. 1. An embodiment of the method 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

The method begins with the UE receiving SS/PBCH block (step 1802). For example, in step 1802, the UE SS/PBCH block may be received from the BS. The UE then decodes content of a PBCH in the SS/PBCH block (step 1804).

Thereafter, the UE determines whether the wireless communication system operates with shared spectrum channel access (step 1806). For example, in step 1806, the UE determines whether the wireless communication system operates with shared spectrum channel access based on the decoded content of the PBCH. In one example, the wireless communication system is determined as operating with shared spectrum channel access, if a QCL parameter ($N_{SSB}^{QCL}$) in the content of the PBCH is determined as a numerical value. In another example, the wireless communication system is determined as operating without shared spectrum channel access, if the QCL parameter ($N_{SSB}^{QCL}$) in the content of the PBCH is determined as a non-numerical value.

If the UE determines that wireless communication system operates with shared spectrum channel access, the UE determines the content of the PBCH in a first manner (step 1808). For example, in step 1808, for the first manner of determining the content of the PBCH, the UE determines a bit ($\bar{a}_{\bar{7}}$) in the content of the PBCH as a seventh LSB of a candidate SS/PBCH block index. In another example, for the first manner of determining the content of the PBCH, the UE determines a first field in MIB in the content of the PBCH as a fourth LSB of a SFN. In another example, for the first manner of determining the content of the PBCH, the UE determines a second field in MIB in the content of the PBCH as a configuration of a CORESET for monitoring a Type0-PDCCH. In one example, the configuration of the CORESET includes a multiplexing pattern between the CORESET and the SS/PBCH block and the multiplexing pattern is one from a first, a second, or a third pattern for a combination of a SCS of the CORESET and a SCS of the SS/PBCH block. In another example, wherein the configuration of the CORESET includes a frequency offset from a first resource block of the CORESET to a first resource block of the SS/PBCH block.

If, however, the UE determines that wireless communication system operates without shared spectrum channel access, the UE determines the content of the PBCH in a second manner (step 1810). For example, in step 1810, the UE may determine the content of the PBCH differently than the first manner discussed above.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system supporting a frequency range between 52.6 GHz and 71 GHz, the UE comprising:
    a transceiver configured to receive synchronization signal and physical broadcast channel (SS/PBCH) blocks, and
    a processor operably coupled to the transceiver, the processor configured to identify a parameter for quasi co-location (QCL) based on the SS/PBCH blocks,
    wherein the SS/PBCH blocks are QCLed within or across transmission windows when a value of ($\bar{I}$ mod $N_{SSB}^{QCL}$) is same among the SS/PBCH blocks,
    wherein $\bar{I}$ is a candidate SS/PBCH block index and $N_{SSB}^{QCL}$ is the parameter for QCL,
    wherein the SS/PBCH blocks include at least one PBCH, and
    wherein a part of information in the at least one PBCH is interpreted differently by the UE for operation with shared spectrum channel access and operation without shared spectrum channel access.

2. The UE of claim 1, wherein the part of information in the at least one PBCH comprises at least part of subCarrierSpacingCommon.

3. The UE of claim 1, wherein global synchronization channel number (GSCN) values are different for the operation with shared spectrum channel access and the operation without shared spectrum channel access.

4. A method of receiving synchronization signal and physical broadcast channel (SS/PBCH) blocks by a user equipment (UE) in a wireless communication system supporting a frequency range between 52.6 GHz and 71 GHz, the method comprising:
    receiving the SS/PBCH blocks; and
    identifying a parameter for quasi co-location (QCL) based on the SS/PBCH blocks,
    wherein the SS/PBCH blocks are QCLed within or across transmission windows when a value of ($\bar{I}$ mod $N_{SSB}^{QCL}$) is same among the SS/PBCH blocks,
    wherein $\bar{I}$ is a candidate SS/PBCH block index and $N_{SSB}^{QCL}$ is the parameter for QCL,
    wherein the SS/PBCH blocks include at least one PBCH, and
    wherein a part of information in the at least one PBCH is interpreted differently by the UE for operation with shared spectrum channel access and operation without shared spectrum channel access.

5. The method of claim 4, wherein the part of information in the at least one PBCH comprises at least part of subCarrierSpacingCommon.

6. The method of claim 4, wherein global synchronization channel number (GSCN) values are different for the operation with shared spectrum channel access and the operation without shared spectrum channel access.

7. A base station (BS) in a wireless communication system supporting a frequency range between 52.6 GHz and 71 GHz, the BS comprising:
- a processor configured to configure a parameter for quasi co-location (QCL); and
- a transceiver operably coupled to the processor, the transceiver configured to transmit synchronization signal and physical broadcast channel (SS/PBCH) blocks including the parameter for QCL, wherein the SS/PBCH blocks are QCLed within or across transmission windows when a value of ($\tilde{I}$ mod $N_{SSB}^{QCL}$) is same among the SS/PBCH blocks, wherein $\tilde{I}$ is a candidate SS/PBCH block index and $N_{SSB}^{QCL}$ is the parameter for QCL, the SS/PBCH blocks include at least one PBCH, and a part of information in the at least one PBCH is interpreted differently for operation with shared spectrum channel access and operation without shared spectrum channel access.

8. The BS of claim 7, wherein the part of information in the at least one PBCH comprises at least part of subCarrierSpacingCommon.

9. The BS of claim 7, wherein global synchronization channel number (GSCN) values are different for the operation with shared spectrum channel access and the operation without shared spectrum channel access.

* * * * *